United States Patent
Nakamura et al.

(10) Patent No.: US 8,637,633 B2
(45) Date of Patent: Jan. 28, 2014

(54) POLYMERIZABLE COMPOSITION, AND RESIN AND OPTICAL PART USING THE SAME

(75) Inventors: Mitsuo Nakamura, Chosei-gun (JP); Hiroshi Naruse, Ichihara (JP); Atsuo Otsuji, Chiba (JP); Shinichi Usugi, Ichihara (JP); Masao Imai, Yokohama (JP); Hidetoshi Hayashi, Omuta (JP); Osamu Kohgo, Omuta (JP); Hideki Yamamoto, Otake (JP); Seiichi Kobayashi, Omuta (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 13/611,773

(22) Filed: Sep. 12, 2012

(65) Prior Publication Data

US 2013/0005934 A1    Jan. 3, 2013

Related U.S. Application Data

(62) Division of application No. 12/294,683, filed as application No. PCT/JP2007/000331 on Mar. 29, 2007.

(30) Foreign Application Priority Data

| Mar. 31, 2006 | (JP) | 2006-101138 |
| Mar. 31, 2006 | (JP) | 2006-101143 |
| Mar. 31, 2006 | (JP) | 2006-101147 |
| Mar. 31, 2006 | (JP) | 2006-101156 |
| Dec. 27, 2006 | (JP) | 2006-351001 |
| Dec. 27, 2006 | (JP) | 2006-351002 |

(51) Int. Cl.
*C08G 75/04* (2006.01)

(52) U.S. Cl.
USPC .......................... 528/375; 528/380

(58) Field of Classification Search
CPC .................................... C08G 75/14
USPC ............................... 528/375, 380
See application file for complete search history.

(56) References Cited

U.S. PATENT DOCUMENTS

| 7,132,501 B2 | 11/2006 | Kobayashi et al. |
| 2002/0099167 A1 | 7/2002 | Okubo et al. |
| 2004/0122201 A1 | 6/2004 | Yoshimura et al. |
| 2004/0254258 A1 | 12/2004 | Horikoshi et al. |
| 2007/0191615 A1 | 8/2007 | Otsuji et al. |

FOREIGN PATENT DOCUMENTS

| CN | 1471645 A | 1/2004 |
| CN | 1351009 A | 5/2005 |
| EP | 1 731 547 A1 | 12/2006 |
| JP | 9-110979 A | 4/1997 |
| JP | 11-140046 A | 5/1999 |
| JP | 11-322930 A | 11/1999 |
| JP | 2002226453 * | 8/2002 .......... C07D 339/08 |
| JP | 2003-292624 A | 10/2003 |
| JP | 2003-327583 A | 11/2003 |
| JP | 2004-137481 A | 5/2004 |
| JP | 2005-298742 A | 10/2005 |
| JP | 2005-330352 A | 12/2005 |
| WO | WO 2005/095490 A1 | 10/2005 |

OTHER PUBLICATIONS

Form PCT/ISA/210 (International Search Report) dated Jul. 3, 2007.
Office Action from Chinese Patent Office issued in Applicant's corresponding Chinese Patent Application No. 200780008468.3 date Jun. 29, 2010.
Office Action from Korean Patent Office issued in corresponding Korean Patent Application No. 10-2010-7018808 dated Nov. 24, 2010.

\* cited by examiner

*Primary Examiner* — Shane Fang
(74) *Attorney, Agent, or Firm* — Buchanan Ingersoll & Rooney PC

(57) ABSTRACT

A polymerizable composition including a compound represented by following General Formula (1):

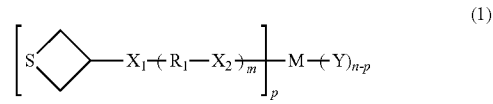

(in Formula (1), M represents a metal atom; $X_1$ and $X_2$ each independently represents a sulfur atom or an oxygen atom; $R_1$ represents a divalent organic group; m represents an integer of 0 or 1 or greater; p represents an integer of 1 to n; n represents a valence of a metal atom M; and Y's each independently represents an inorganic or organic residue, where when n–p is 2 or greater, Y's may be bonded to each other to form a ring containing a metal atom M), a thiol compound and an episulfide compound.

13 Claims, No Drawings

POLYMERIZABLE COMPOSITION, AND RESIN AND OPTICAL PART USING THE SAME

TECHNICAL FIELD

The present invention relates to a polymerizable composition, a resin obtained by polymerization of the polymerizable composition, and an optical part composed of the resin.

BACKGROUND ART

Since an inorganic glass has excellent general properties such as excellent transparency and low optical anisotropy, the inorganic glass has been widely used in many fields as a transparent material. However, the inorganic glass has drawbacks such that it is heavy and easily breaks, and has bad productivity when producing a product by molding and processing. As a result, a transparent organic polymer material (optical resin) has been used as a material in place of the inorganic glass. As the optical part obtained from such an optical resin, there are, for example, a plastic lens such as a spectacle lens for vision correction or a camera lens of a digital camera, and the like. The optical parts have been put to practical use and have come into use. In particular, for the purpose of use in a spectacle lens for vision correction, the plastic lens is light-weight and hardly broken, and can be tinted for granting great fashionability, as compared to the lens made of an inorganic glass. Making good use of such merits, the plastic lens has been widely used.

In the past, a crosslinking type resin obtained by casting polymerization of diethylene glycol bis(allyl carbonate) hereinafter, referred to as a DAC resin) as an optical resin used for a spectacle lens under heating has been put to practical use. It has merits such that transparency and heat resistance are excellent, and the chromatic aberration is low. Due to such merits, it has been used the most for a general-purpose plastic spectacle lens for vision correction. However, there are problems like poor wearing comfort and fashionability because the central or edge thickness of the plastic lens becomes large due to the low refractive index (nd=1.50). Therefore, a resin for a plastic lens with a high refractive index capable of solving these problems has been demanded and developed accordingly.

During such a trend, since polythiourethane containing a sulfur atom obtained by casting polymerization of a diisocyanate compound with a polythiol compound is excellent in its transparency and impact resistance, while achieving highly superior characteristics such as attaining a high refractive index (nd=1.6 to 1.7) and having relatively low chromatic aberration, and the like, polythiourethane has been used for the purpose of a high-quality plastic spectacle lens for vision correction in which the thickness is thin and its weight is light.

On the other hand, in a trend to pursue an optical resin having a much higher refractive index, there have been proposed several resins such as a transparent resin obtained by polymerization of a compound having an episulfide group (Patent Documents 1 and 2) or a resin obtained by polymerization of a compound having a thietane group (Patent Document 3), or a resin obtained by polymerization of a Se-containing compound (Patent Document 4). However, the transparent resin obtained by polymerization of a compound having an episulfide group has a problem in mechanical properties; the compound having a thietane group has a problem in polymerizability; and the resin obtained by polymerization of a Se-containing metal compound has a problem in safety. Therefore, they have been demanded for further improvement. In recent years, there has been demanded and developed an optical resin with a high refractive index, having required general properties (transparency, thermal properties, mechanical properties, and the like) as a plastic lens, while attaining a much higher refractive index (nd) exceeding 1.7, for example. Under these circumstances, there has been newly developed a metal-containing thietane compound, and there has been proposed an optical resin having a high refractive index (nd) exceeding 1.7 (Patent Document 5).

[Patent Document 1] Japanese Patent Laid-Open No. 9-110979
[Patent Document 2] Japanese Patent Laid-Open No. 11-322930
[Patent Document 3] Japanese Patent Laid-Open No. 2003-327583
[Patent Document 4] Japanese Patent Laid-Open No. 11-140046
[Patent Document 5] Pamphlet of International Patent Publication WO 2005-095490

DISCLOSURE OF THE INVENTION

Problems to be Solved by the Invention

The present invention provides a polymerizable composition, which has general properties (transparency, thermal properties, mechanical properties, and the like) required for optical parts such as plastic lenses, while attaining a very high refractive index (nd) exceeding 1.7, a resin obtained by polymerization of the composition, and an optical part and a lens, each composed of the resin.

Means for Solving the Problems

In order to solve the above problems, the present inventors have conducted an extensive study on a metal-containing thietane compound, and as a result, they have found out that a resin obtained by copolymerization of a metal-containing thietane compound and a thiol compound is well-balanced in a refractive index, mechanical properties, and color of the resin. Thus, the present invention has been completed.

That is, the present invention includes:

[1] a polymerizable composition including a compound represented by following General Formula (1):

[Chemical Formula 1]

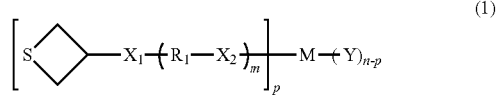

(in General Formula (1), M represents a metal atom; $X_1$ and $X_2$ each independently represents a sulfur atom or an oxygen atom; $R_1$ represents a divalent organic group; m represents an integer of 0 or 1 or greater; p represents an integer of 1 to n; n represents a valence of a metal atom M; Y's each independently represents an inorganic or organic residue, where when n−p is 2 or greater, Y's may be bonded to each other to form a ring containing a metal atom M),
and a thiol compound;

[2] the polymerizable composition as set forth in [1], wherein in the compound represented by said General Formula (1), m is 0;

[3] the polymerizable composition as set forth in [1], wherein in the compound represented by said General Formula (1), m is 0; and $X_1$ is a sulfur atom;

[4] the polymerizable composition as set forth in [3], wherein said thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

[5] the polymerizable composition as set forth in [3], wherein the compound represented by said General Formula (1) is a compound represented by following General Formula (13):

[Chemical Formula 2]

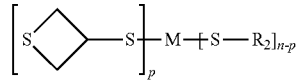

(13)

(in General Formula (13), M is a Group 14 element in a long form of the Periodic Table, n's are each the same as in General Formula (1), and p is an integer of 2 to (n−1) where if n−p is 1, $R_2$ represents an optionally substituted, linear or branched alkyl group having 1 to 3 carbon atom(s); and if n−p is 2 or greater, a plurality of $R_2$'s each independently represents an optionally substituted, linear or branched alkyl group having 1 to 3 carbon atom(s), further, a plurality of $R_2$'s may be bonded to each other to form a M-containing ring, in which the alkyl chain forming the ring has 1 to 3 carbon atom(s), and the moiety constituting the ring contains no sulfur atom);

[6] the polymerizable composition as set forth in [5], wherein said thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

[7] the polymerizable composition as set forth in [5], wherein in the compound represented by General Formula (13), said metal atom is a Sn atom;

[8] the polymerizable composition as set forth in [3], further including an episulfide compound;

[9] the polymerizable composition as set forth in [8], wherein said episulfide compound is either bis(2,3-epithiopropyl)sulfide or bis(2,3-epithiopropyl)disulfide;

[10] the polymerizable composition as set forth in [3], further including sulfur as a monomer;

[11] the polymerizable composition as set forth in [3], further including a thietane compound containing no metal atom in the molecular structure;

[12] the polymerizable composition as set forth in [11], wherein the thietane compound containing no metal atom in said molecular structure is bis(3-thietanyl)disulfide;

[13] the polymerizable composition as set forth in [3], further including an epoxy compound;

[14] the polymerizable composition as set forth in [13], wherein said epoxy compound is any of cyclohexanedimethanol diglycidyl ether and bisphenol F/glycidyl ether;

[15] the polymerizable composition as set forth in [3], further including an iso(thio)cyanate compound;

[16] the polymerizable composition as set forth in [15], wherein said iso(thio)cyanate compound is 2,5-bis(isocyanatomethyl)bicyclo[2.2.1]heptane, 2,6-bis(isocyanatomethyl)bicyclo[2.2.1]heptane, or a mixture thereof;

[17] the polymerizable composition as set forth in [3], further including a compound having a carbon-carbon double bond;

[18] the polymerizable composition as set forth in [17], wherein said compound having a carbon-carbon double bond is triallyl isocyanurate;

[19] the polymerizable composition as set forth in [1], wherein in the compound represented by General Formula (1), n=p, m=0, and $X_1$ is a sulfur atom;

[20] the polymerizable composition as set forth in [19], wherein in the compound represented by General Formula (1), said metal atom is a Sn atom;

[21] the polymerizable composition as set forth in [19], wherein said thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

[22] the polymerizable composition as set forth in [1], wherein in the compound represented by General Formula (1), said metal atom is any one of Groups 4, 12, 13, 14 and 15 elements in a long form of the Periodic Table;

[23] the polymerizable composition as set forth in [22], wherein in the compound represented by General Formula (1), said metal atom is a Sn atom;

[24] the polymerizable composition as set forth in [23], wherein said thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

[25] the polymerizable composition as set forth in [1], wherein said thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

[26] the polymerizable composition as set forth in [1], wherein the content of the compound represented by General Formula (1) is 50% by weight or more;

[27] the polymerizable composition as set forth in [1], wherein the molar ratio of thiol groups in the polymerizable composition is 0.7 or more with respect to the total amount of the iso(thio)cyanate groups, the epoxy groups, the episulfide groups, the carbon-carbon double bonds, and the thietanyl groups in the thietane compound containing no metal atoms;

[28] a method for preparing a resin, the method including a step of casting polymerization of the polymerizable composition as set forth in [1];

[29] a resin obtained by polymerization of the polymerizable composition as set forth in [1]; and

[30] an optical part composed of the resin as set forth in [29].

Effects of the Invention

The resin obtained by polymerization of the polymerizable composition according to the present invention has high transparency, and good heat resistance and mechanical strength, while attaining a high refractive index (nd) exceeding 1.7. Therefore, the resin of the present invention is useful as a resin used in an optical part such as a plastic lenses.

BEST MODE FOR CARRYING OUT THE INVENTION

Hereinbelow, the present invention will be described in more detail.

Furthermore, in the following description, the priority order of the functional group when the component of the polymerizable composition contains a plurality of functional groups is as follows:
(i) a thiol group,
(ii) an isocyanate group,
(iii) an epoxy group,
(iv) an episulfide group,
(v) a carbon-carbon double bond, and
(vi) a thietanyl group.

For example, as used in the following description, the compound having a thiol group and a thietanyl group is explained in the section of a thiol compound. Further, for example, the compound having an epoxy group and a carbon-carbon double bond is explained in the section of an epoxy compound.

The polymerizable composition according to the present invention includes a metal-containing thietane compound represented by the following General Formula (1), and a thiol compound.

Hereinafter, the specific examples of each component are described, but the present invention is not limited to the exemplary compounds as below. Further, in the present invention, for each component, the exemplary compounds may be used alone, or in a combination of two or more kinds thereof.

First, the metal-containing thietane compound will be described. This compound is represented by the following General Formula (1).

[Chemical Formula 3]

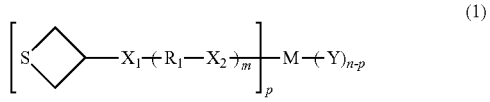

(1)

(in General Formula (1), M represents a metal atom, $X_1$ and $X_2$ each independently represents a sulfur atom or an oxygen atom, $R_1$ represents a divalent organic group, m represents an integer of 0 or 1 or greater, p represents an integer of 1 to n, n represents a valence of a metal atom M, Y's each independently represents an inorganic or organic residue, and when n–p is 2 or greater, Y's may be bonded to each other to form a ring containing a metal atom M).

First, M in General Formula (1) will be described. In General Formula (1), M represents a metal atom. Examples of M include:
a Group 11 element in a long form of the Periodic Table, such as a Cu atom, an Au atom, and an Ag atom (the same will be applied in the below description);
a Group 12 element, such as a Zn atom;
a Group 13 element, such as an Al atom;
a Group 4 element, such as a Zr atom and a Ti atom;
a Group 14 element, such as a Sn atom, a Si atom, a Ge atom, and a Pb atom;
a Group 15 element, such as a Bi atom; and
a Group 8 or 10 element, such as a Fe atom and a Pt atom.
M is preferably
a Group 14 element, such as a Sn atom, a Si atom, a Ge atom, and a Pb atom;
a Group 4 element, such as a Zr atom and a Ti atom;
a Group 13 element, such as an Al atom; or
a Group 12 element, such as a Zn atom;
more preferably,
a Group 14 element, such as a Sn atom, a Si atom, and a Ge atom; or a Group 4 element, such as a Zr atom and a Ti atom;
and even more preferably,
a Sn atom.

Next, the group which bonds to M, including a thietanyl group, in General Formula (1), will be described. In General Formula (1), $X_1$ and $X_2$ each independently represents a sulfur atom or an oxygen atom. In consideration of a high refractive index as a desired effect of the present invention, $X_1$ and $X_2$ are each preferably a sulfur atom.

In General Formula (1), $R_1$ represents a divalent organic group.

Examples of such the divalent organic group include a chained or alicyclic group, an aromatic group or an aromatic-aliphatic group, preferably a chained aliphatic group having 1 to 20 carbon atom(s), an alicyclic group having 3 to 20 carbon atoms, an aromatic group having 5 to 20 carbon atoms and an aromatic-aliphatic group having 6 to 20 carbon atoms.

More specifically, as $R_1$, this divalent organic group is a chained or alicyclic group, an aromatic group or an aromatic-aliphatic group, preferably a substituted or unsubstituted chained or alicyclic group having 1 to 20 carbon atom(s) such as a methylene group, an ethylene group, a 1,2-dichloroethylene group, a trimethylene group, a tetramethylene group, a pentamethylene group, a cyclopentylene group, a hexamethylene group, a cyclohexylene group, a heptamethylene group, an octamethylene group, a nonamethylene group, a decamethylene group, an undecamethylene group, a dodecamethylene group, a tridecamethylene group, a tetradecamethylene group, and a pentadecamethylene group;
a substituted or unsubstituted aromatic group having 5 to 20 carbon atoms such as a phenylene group, a chlorophenylene group, a naphthylene group, an indenylene group, an anthracenylene group, and a fluorenylene group; and
a substituted or unsubstituted aromatic-aliphatic group having 6 to 20 carbon atoms such as a —$C_6H_4$—$CH_2$— group, a —$CH_2$—$C_6H_4$—$CH_2$— group, a —$CH_2$—$C_6H_3$(Cl)—$CH_2$— group, a —$C_{10}H_6$—$CH_2$— group, a —$CH_2$—$C_{10}H_6$—$CH_2$— group, and a —$CH_2CH_2$—$C_6H_4$—$CH_2CH_2$— group.

$R_1$ is more preferably a substituted or unsubstituted chained or alicyclic group having 1 to 6 carbon atom(s) such as a methylene group, an ethylene group, a 1,2-dichloroethylene group, a trimethylene group, a cyclopentylene group, and a cyclohexylene group;
a substituted or unsubstituted aromatic group having 5 to 15 carbon atoms such as a phenylene group, a chlorophenylene group, a naphthylene group, an indenylene group, an anthracenylene group, and a fluorenylene group; or
a substituted or unsubstituted aromatic-aliphatic group having 6 to 15 carbon atoms such as a —$C_6H_4$—$CH_2$— group, a —$CH_2$—$C_6H_4$—$CH_2$— group, a —$CH_2$—$C_6H_3$(Cl)—$CH_2$— group, a —$C_{10}H_6$—$CH_2$— group, a —$CH_2$—$C_{10}H_6$—$CH_2$— group, and a —$CH_2CH_2$—$C_6H_4$—$CH_2CH_2$— group.

This divalent organic group may contain a heteroatom except for a carbon atom or a hydrogen atom in the group. Examples of the heteroatom include an oxygen atom or a sulfur atom. Considering the desired effect of the present invention, a sulfur atom is preferable.

In General Formula (1), m represents an integer of 0 or 1 or greater. Examples of this m are preferably an integer of 0 to 4, more preferably an integer of 0 to 2, and further more preferably an integer of 0 or 1.

Furthermore, for the group containing a thietanyl group and bonding to M in General Formula (1), it is more preferable that m is 0, and $X_1$ is a sulfur atom. Herein, General Formula (1) is represented by the following General Formula (12).

[Chemical Formula 4]

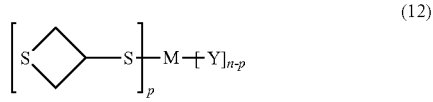

(12)

(in General Formula (12), M, Y, p and n are each the same as M, Y, p and n, respectively, in General Formula (1)).

Furthermore, in General Formula (12), preferably n is p, and more preferably n is p, and M is Sn.

Next, in General Formula (1), the $—(Y)_{n-p}$ group bonding to M will be described.

In General Formula (1), n represents a valence of a metal atom M.

Furthermore, p represents an integer of 1 to n. This p is preferably n, n−1, or n−2, and more preferably n or n−1.

In General Formula (1), Y's each independently represents an inorganic or organic residue.

If the compound represented by General Formula (1) contains a plurality of Y's, the plurality of Y's each independently represents an inorganic or organic residue. That is, the plurality of Y's may be the same as or different from each other. More specifically, the plurality of Y's may be different from each other, some of the plurality of Y's may be the same as each other, or all of the plurality of Y's may be the same.

Examples of the inorganic or organic residue that constitutes Y include, without any particular limitation, a hydrogen atom, a halogen atom, a hydroxyl group, a thiol group, a substituted or unsubstituted alkyl group, a substituted or unsubstituted aryl group, a substituted or unsubstituted aralkyl group, a substituted or unsubstituted alkoxy group, a substituted or unsubstituted alkylthio group, a substituted or unsubstituted aryloxy group, and a substituted or unsubstituted arylthio group.

Among these, the halogen atom, the substituted or unsubstituted alkyl group, the substituted or unsubstituted aryl group, the substituted or unsubstituted aralkyl group, the substituted or unsubstituted alkoxy(alkyloxy) group, the substituted or unsubstituted alkylthio group, the substituted or unsubstituted aryloxy group, and the substituted or unsubstituted arylthio group will be each described.

Specific examples of the halogen atom include a fluorine atom, a chlorine atom, a bromine atom, and an iodine atom.

Specific examples of the substituted or unsubstituted alkyl group include a linear alkyl group having 1 to 10 carbon atom(s) in total such as a methyl group, an ethyl group, an n-propyl group, an n-butyl group, an n-pentyl group, and an n-hexyl group; a branched alkyl group having 3 to 10 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 1-n-propylbutyl group, a 1-iso-propylbutyl group, a 1-iso-propyl-2-methylpropyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexyl group, a 3-ethylhexyl group, a 4-ethylhexyl group, a 1-n-propylpentyl group, a 2-n-propylpentyl group, a 1-iso-propylpentyl group, a 2-iso-propylpentyl group, a 1-n-butylbutyl group, a 1-iso-butylbutyl group, a 1-sec-butylbutyl group, a 1-tert-butylbutyl group, a 2-tert-butylbutyl group, a tert-butyl group, a tert-pentyl group, a 1,1-dimethylbutyl group, a 1,2-dimethylbutyl group, a 1,3-dimethylbutyl group, a 2,3-dimethylbutyl group, a 1-ethyl-2-methylpropyl group, a 1,1-dimethylpentyl group, a 1,2-dimethylpentyl group, a 1,3-dimethylpentyl group, a 1,4-dimethylpentyl group, a 2,2-dimethylpentyl group, a 2,3-dimethylpentyl group, a 2,4-dimethylpentyl group, a 3,3-dimethylpentyl group, a 3,4-dimethylpentyl group, a 1-ethyl-1-methylbutyl group, a 1-ethyl-2-methylbutyl group, a 1-ethyl-3-methylbutyl group, a 2-ethyl-1-methylbutyl group, a 2-ethyl-3-methylbutyl group, a 1,1-dimethylhexyl group, a 1,2-dimethylhexyl group, a 1,3-dimethylhexyl group, a 1,4-dimethylhexyl group, a 1,5-dimethylhexyl group, a 2,2-dimethylhexyl group, a 2,3-dimethylhexyl group, a 2,4-dimethylhexyl group, a 2,5-dimethylhexyl group, a 3,3-dimethylhexyl group, a 3,4-dimethylhexyl group, a 3,5-dimethylhexyl group, a 4,4-dimethylhexyl group, a 4,5-dimethylhexyl group, a 1-ethyl-2-methylpentyl group, a 1-ethyl-3-methylpentyl group, a 1-ethyl-4-methylpentyl group, a 2-ethyl-1-methylpentyl group, a 2-ethyl-2-methylpentyl group, a 2-ethyl-3-methylpentyl group, a 2-ethyl-4-methylpentyl group, a 3-ethyl-1-methylpentyl group, a 3-ethyl-2-methylpentyl group, a 3-ethyl-3-methylpentyl group, a 3-ethyl-4-methylpentyl group, a 1-n-propyl-1-methylbutyl group, a 1-n-propyl-2-methylbutyl group, a 1-n-propyl-3-methylbutyl group, a 1-iso-propyl-1-methylbutyl group, a 1-iso-propyl-2-methylbutyl group, a 1-iso-propyl-3-methylbutyl group, a 1,1-diethylbutyl group, a 1,2-diethylbutyl group, a 1,1,2-trimethylpropyl group, a 1,2,2-trimethylpropyl group, a 1,1,2-trimethylbutyl group, a 1,1,3-trimethylbutyl group, a 1,2,3-trimethylbutyl group, a 1,2,2-trimethylbutyl group, a 1,3,3-trimethyl-butyl group, a 2,3,3-trimethylbutyl group, a 1,1,2-trimethylpentyl group, a 1,1,3-trimethylpentyl group, a 1,1,4-trimethylpentyl group, a 1,2,2-trimethylpentyl group, a 1,2,3-trimethylpentyl group, a 1,2,4-trimethylpentyl group, a 1,3,4-trimethylpentyl group, a 2,2,3-trimethylpentyl group, a 2,2,4-trimethylpentyl group, a 2,3,4-trimethylpentyl group, a 1,3,3-trimethylpentyl group, a 2,3,3-trimethylpentyl group, a 3,3,4-trimethylpentyl group, a 1,4,4-trimethylpentyl group, a 2,4,4-trimethylpentyl group, a 3,4,4-trimethylpentyl group, a 1-ethyl-1,2-dimethylbutyl group, a 1-ethyl-1,3-dimethylbutyl group, a 1-ethyl-2,3-dimethylbutyl group, a 2-ethyl-1,1-dimethylbutyl group, a 2-ethyl-1,2-dimethylbutyl group, a 2-ethyl-1,3-dimethylbutyl group, and a 2-ethyl-2,3-dimethylbutyl group; and a saturated cyclic alkyl group having 5 to 10 carbon atoms in total such as a cyclopentyl group, a cyclohexyl group, a methylcyclopentyl group, a methoxycyclopentyl group, a methoxycyclohexyl group, a methylcyclohexyl group, a 1,2-dimethylcyclohexyl group, a 1,3-dimethylcyclohexyl group, a 1,4-dimethylcyclohexyl group, and an ethylcyclohexyl group.

Specific examples of the substituted or unsubstituted aryl group include aromatic hydrocarbons having not more than 20 carbon atoms in total such as a phenyl group, a naphthyl group, an anthranyl group, and a cyclopentadienyl group;

an alkyl-substituted aryl group having not more than 20 carbon atoms in total such as a 2-methylphenyl group, a 3-methylphenyl group, a 4-methylphenyl group, a 2-ethylphenyl group, a propylphenyl group, a butylphenyl group, a hexylphenyl group, a cyclohexylphenyl group, an octylphenyl group, a 2-methyl-1-naphthyl group, a 3-methyl-1-naphthyl group, a 4-methyl-1-naphthyl group, a 5-methyl-1-naphthyl group, a 6-methyl-1-naphthyl group, a 7-methyl-1-naphthyl group, a 8-methyl-1-naphthyl group, a 1-methyl-2-naphthyl group, a 3-methyl-2-naphthyl group, a 4-methyl-2-naphthyl group, a 5-methyl-2-naphthyl group, a 6-methyl-2-naphthyl group, a 7-methyl-2-naphthyl group, a 8-methyl-2-naphthyl group, a 2-ethyl-1-naphthyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, and a 3,4,5-trimethylphenyl group;

a monoalkoxyaryl group having not more than 20 carbon atoms in total wherein a substituted or unsubstituted alkyloxy group having not more than 10 carbon atoms is substituted, such as a 2-methoxyphenyl group, a 3-methoxyphenyl group, a 4-methoxyphenyl group, a 2-ethoxyphenyl group, a propoxyphenyl group, a butoxyphenyl group, a hexyloxyphenyl group, a cyclohexyloxyphenyl group, an octyloxyphenyl group, a 2-methoxy-1-naphthyl group, a 3-methoxy-1-naphthyl group, a 4-methoxy-1-naphthyl group, a 5-methoxy-1-naphthyl group, a 6-methoxy-1-naphthyl group, a 7-methoxy-1-naphthyl group, a 8-methoxy-1-naphthyl group, a 1-methoxy-2-naphthyl group, a 3-methoxy-2-naphthyl group, a 4-methoxy-2-naphthyl group, a 5-methoxy-2-naphthyl group, a 6-methoxy-2-naphthyl group, a 7-methoxy-2-naphthyl group, a 8-methoxy-2-naphthyl group, and a 2-ethoxy-1-naphthyl group;

a dialkoxyaryl group having not more than 20 carbon atoms in total wherein a substituted or unsubstituted alkyloxy group having not more than 10 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, a 3,6-dimethoxyphenyl group, a 4,5-dimethoxy-1-naphthyl group, a 4,7-dimethoxy-1-naphthyl group, a 4,8-dimethoxy-1-naphthyl group, a 5,8-dimethoxy-1-naphthyl group, and a 5,8-dimethoxy-2-naphthyl group;

a trialkoxyaryl group having not more than 20 carbon atoms in total wherein a substituted or unsubstituted alkyloxy group having not more than 10 carbon atoms is substituted, such as a 2,3,4-trimethoxyphenyl group, a 2,3,5-trimethoxyphenyl group, a 2,3,6-trimethoxyphenyl group, a 2,4,5-trimethoxyphenyl group, a 2,4,6-trimethoxyphenyl group, and a 3,4,5-trimethoxyphenyl group; and an aryl group having not more than 20 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, and a pentafluorophenyl group.

Specific examples of the substituted or unsubstituted aralkyl group include a benzyl group, a phenethyl group, a phenylpropyl group, a naphthylethyl group, or a methyl group, an ethyl group and a propyl group having an aryl group specifically mentioned as examples of the substituted or unsubstituted aryl group beforehand in a side chain.

Specific examples of the substituted or unsubstituted alkyloxy group include a linear or branched alkoxy group having 1 to 10 carbon atom(s) in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, an iso-hexyloxy group, a 2-ethylhexyloxy group, a 3,5,5-trimethylhexyloxy group, an n-heptyloxy group, an n-octyloxy group, and an n-nonyloxy group;

a cycloalkoxy group having 5 to 10 carbon atoms in total such as a cyclopentyloxy group, and a cyclohexyloxy group;

an alkoxyalkoxy group having 2 to 10 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, a tert-butoxyethoxy group, an n-pentyloxyethoxy group, an iso-pentyloxyethoxy group, an n-hexyloxyethoxy group, an iso-hexyloxyethoxy group, and an n-heptyloxyethoxy group; and an aralkyloxy group such as a benzyloxy group.

Specific examples of the substituted or unsubstituted alkylthio group include a linear or branched alkylthio group having 1 to 10 carbon atom(s) in total such as a methylthio group, an ethylthio group, an n-propylthio group, an iso-propylthio group, an n-butylthio group, an iso-butylthio group, a sec-butylthio group, a t-butylthio group, an n-pentylthio group, an iso-pentylthio group, an n-hexylthio group, an iso-hexylthio group, a 2-ethylhexylthio group, a 3,5,5-trimethylhexylthio group, an n-heptylthio group, an n-octylthio group, and an n-nonylthio group;

a cycloalkylthio group having 5 to 10 carbon atoms in total such as a cyclopentylthio group, and a cyclohexylthio group;

an alkoxyalkylthio group having 2 to 10 carbon atoms in total such as a methoxyethylthio group, an ethoxyethylthio group, an n-propoxyethylthio group, an iso-propoxyethylthio group, an n-butoxyethylthio group, an iso-butoxyethylthio group, a tert-butoxyethylthio group, an n-pentyloxyethylthio group, an iso-pentyloxyethylthio group, an n-hexyloxyethylthio group, an iso-hexyloxyethylthio group, and an n-heptyloxyethylthio group;

an aralkylthio group such as a benzylthio group; and an alkylthioalkylthio group having 2 to 10 carbon atoms in total such as a methylthioethylthio group, an ethylthioethylthio group, an n-propylthioethylthio group, an iso-propylthioethylthio group, an n-butylthioethylthio group, an iso-butylthioethylthio group, a tert-butylthioethylthio group, an n-pentylthioethylthio group, an iso-pentylthioethylthio group, an n-hexylthioethylthio group, an iso-hexylthioethylthio group, and an n-heptylthioethylthio group.

Specific examples of the substituted or unsubstituted aryloxy group include an unsubstituted or alkyl-substituted aryloxy group having not more than 20 carbon atoms in total such as a phenyloxy group, a naphthyloxy group, an anthranyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, an octylphenyloxy group, a 2-methyl-1-naphthyloxy group, a 3-methyl-1-naphthyloxy group, a 4-methyl-1-naphthyloxy group, a 5-methyl-1-naphthyloxy group, a 6-methyl-1-naphthyloxy group, a 7-methyl-1-naphthyloxy group, a 8-methyl-1-naphthyloxy group, a 1-methyl-2-naphthyloxy group, a 3-methyl-2-naphthyloxy group, a 4-methyl-2-naphthyloxy group, a 5-methyl-2-naphthyloxy group, a 6-methyl-2-naphthyloxy group, a 7-methyl-2-naphthyloxy group, a 8-methyl-2-naphthyloxy group, a 2-ethyl-1-naphthyloxy group, a 2,3-dimethylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, and a 3,4,5-trimethylphenyloxy group;

a monoalkoxyaryloxy group having not more than 20 carbon atoms in total wherein a substituted or unsubstituted alkyloxy group having not more than 10 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group, an octyloxyphenyloxy group, a 2-methoxy-1-naphthyloxy group, a 3-methoxy-1-naphthyloxy group, a 4-methoxy-1-naphthyloxy group, a 5-methoxy-1-naphthyloxy group, a 6-methoxy-1-naphthyloxy group, a 7-methoxy-1-naphthyloxy group, a 8-methoxy-1-naphthyloxy group, a 1-methoxy-2-naphthyloxy group, a 3-methoxy-2-naphthyloxy group, a 4-methoxy-2-naphthyloxy group, a 5-methoxy-2-naphthyloxy group, a 6-methoxy-2-naphthyloxy group, a 7-methoxy-2-naphthyloxy group, a 8-methoxy-2-naphthyloxy group, and a 2-ethoxy-1-naphthyloxy group;

a dialkoxyaryloxy group having not more than 20 carbon atoms in total wherein a substituted or unsubstituted alkyloxy group having not more than 10 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, a 3,6-dimethoxyphenyloxy group, a 4,5-dimethoxy-1-naphthyloxy group, a 4,7-dimethoxy-1-naphthyloxy group, a 4,8-dimethoxy-1-naphthyloxy group, a 5,8-dimethoxy-1-naphthyloxy group, and a 5,8-dimethoxy-2-naphthyloxy group;

a trialkoxyaryloxy group having not more than 20 carbon atoms in total wherein a substituted or unsubstituted alkyloxy group having not more than 10 carbon atoms is substituted, such as a 2,3,4-trimethoxyphenyloxy group, a 2,3,5-trimethoxyphenyloxy group, a 2,3,6-trimethoxyphenyloxy group, a 2,4,5-trimethoxyphenyloxy group, a 2,4,6-trimethoxyphenyloxy group, and a 3,4,5-trimethoxyphenyloxy group; and an aryloxy group having not more than 20 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, and a pentafluorophenyloxy group.

Specific examples of the substituted or unsubstituted arylthio group include an unsubstituted or alkyl-substituted arylthio group having not more than 20 carbon atoms in total such as a phenylthio group, a naphthylthio group, an anthranylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, an octylphenylthio group, a 2-methyl-1-naphthylthio group, a 3-methyl-1-naphthylthio group, a 4-methyl-1-naphthylthio group, a 5-methyl-1-naphthylthio group, a 6-methyl-1-naphthylthio group, a 7-methyl-1-naphthylthio group, a 8-methyl-1-naphthylthio group, a 1-methyl-2-naphthylthio group, a 3-methyl-2-naphthylthio group, a 4-methyl-2-naphthylthio group, a 5-methyl-2-naphthylthio group, a 6-methyl-2-naphthylthio group, a 7-methyl-2-naphthylthio group, a 8-methyl-2-naphthylthio group, a 2-ethyl-1-naphthylthio group, a 2,3-dimethylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, and a 3,4,5-trimethylphenylthio group;

a monoalkoxyarylthio group having not more than 20 carbon atoms in total wherein a substituted or unsubstituted alkyloxy group having not more than 10 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, a cyclohexyloxyphenylthio group, an octyloxyphenylthio group, a 2-methoxy-1-naphthylthio group, a 3-methoxy-1-naphthylthio group, a 4-methoxy-1-naphthylthio group, a 5-methoxy-1-naphthylthio group, a 6-methoxy-1-naphthylthio group, a 7-methoxy-1-naphthylthio group, a 8-methoxy-1-naphthylthio group, a 1-methoxy-2-naphthylthio group, a 3-methoxy-2-naphthylthio group, a 4-methoxy-2-naphthylthio group, a 5-methoxy-2-naphthylthio group, a 6-methoxy-2-naphthylthio group, a 7-methoxy-2-naphthylthio group, a 8-methoxy-2-naphthylthio group, and a 2-ethoxy-1-naphthylthio group;

a dialkoxyarylthio group having not more than 20 carbon atoms in total wherein a substituted or unsubstituted alkyloxy group having not more than 10 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, and a 5,8-dimethoxy-2-naphthylthio group;

a trialkoxyarylthio group having not more than 20 carbon atoms in total wherein a substituted or unsubstituted alkyloxy group having not more than 10 carbon atoms is substituted, such as a 2,3,4-trimethoxyphenylthio group, a 2,3,5-trimethoxyphenylthio group, a 2,3,6-trimethoxyphenylthio group, a 2,4,5-trimethoxyphenylthio group, a 2,4,6-trimethoxyphenylthio group, and a 3,4,5-trimethoxyphenylthio group; and an arylthio group having not more than 20 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, and a pentafluorophenylthio group. However, Y is not restricted thereto.

Preferred examples of Y are as follows.

A preferred example thereof includes a hydrogen atom.

Furthermore, preferred examples of Y include a chlorine atom, a bromine atom, and an iodine atom as a halogen atom.

Preferred examples of the substituted or unsubstituted alkyl group include a linear alkyl group having 1 to 6 carbon atom(s) in total such as a methyl group, an ethyl group, an n-propyl group, an n-butyl group, an n-pentyl group, and an n-hexyl group;

a branched alkyl group having 3 to 6 carbon atoms in total such as an isopropyl group, an isobutyl group, a sec-butyl group, an isopentyl group, a sec-pentyl group, a 1-methylpentyl group, a 2-methylpentyl group, a 3-methylpentyl group, a 4-methylpentyl group, a 1-ethylbutyl group, a 2-ethylbutyl group, a tert-butyl group, a tert-pentyl group, a 1,1-dimethylbutyl group, a 1,2-dimethylbutyl group, a 1,3-dimethylbutyl group, and a 2,3-dimethylbutyl group; and a saturated cyclic alkyl group having 5 to 6 carbon atoms in total such as a cyclopentyl group, and a cyclohexyl group.

Preferred examples of the substituted or unsubstituted aryl group include aromatic hydrocarbons having not more than 12 carbon atoms in total such as a phenyl group, a naphthyl group, and a cyclopentadienyl group;

an alkyl-substituted aryl group having not more than 12 carbon atoms in total such as a 2-methylphenyl group, a 3-methylphenyl group, a 4-methylphenyl group, a 2-ethylphenyl group, a propylphenyl group, a butylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,6-dimethylphenyl group, a 2,3,4-trimethylphenyl group, a 2,3,5-trimethylphenyl group, a 2,3,6-trimethylphenyl group, a 2,4,5-trimethylphenyl group, a 2,4,6-trimethylphenyl group, and a 3,4,5-trimethylphenyl group;

a monoalkoxyaryl group having not more than 12 carbon atoms in total wherein a substituted or unsubstituted alkyloxy group having not more than 6 carbon atoms is substituted, such as a 2-methoxyphenyl group, a 3-methoxyphenyl group, a 4-methoxyphenyl group, a 2-ethoxyphenyl group, a propoxyphenyl group, and a butoxyphenyl group;

a dialkoxyaryl group having not more than 12 carbon atoms in total wherein a substituted or unsubstituted alkyloxy group having not more than 6 carbon atoms is substituted, such as a 2,3-dimethoxyphenyl group, a 2,4-dimethoxyphenyl group, a 2,5-dimethoxyphenyl group, a 2,6-dimethoxyphenyl group, a 3,4-dimethoxyphenyl group, a 3,5-dimethoxyphenyl group, and a 3,6-dimethoxyphenyl group; and an aryl group having not more than 12 carbon atoms in total wherein a halogen atom is substituted, such as a chlorophenyl group, a dichlorophenyl group, a trichlorophenyl group, a bromophenyl group, a dibromophenyl group, an iodophenyl group, a fluorophenyl group, a chloronaphthyl group, a bromonaphthyl group, a difluorophenyl group, a trifluorophenyl group, a tetrafluorophenyl group, and a pentafluorophenyl group.

Preferred examples of the substituted or unsubstituted aralkyl group include an aralkyl group having not more than 12 carbon atoms in total such as a benzyl group, a phenethyl group, and a phenylpropyl group.

Preferred examples of the substituted or unsubstituted alkyloxy group include a linear or branched alkoxy group having 1 to 6 carbon atom(s) in total such as a methoxy group, an ethoxy group, an n-propoxy group, an iso-propoxy group, an n-butoxy group, an iso-butoxy group, a tert-butoxy group, an n-pentyloxy group, an iso-pentyloxy group, an n-hexyloxy group, and an iso-hexyloxy group;

a cycloalkoxy group having 5 to 6 carbon atoms in total such as a cyclopentyloxy group, and a cyclohexyloxy group; and an alkoxyalkoxy group having 2 to 6 carbon atoms in total such as a methoxymethoxy group, an ethoxymethoxy group, an ethoxyethoxy group, an n-propoxymethoxy group, an iso-propoxymethoxy group, an n-propoxyethoxy group, an iso-propoxyethoxy group, an n-butoxyethoxy group, an iso-butoxyethoxy group, and a tert-butoxyethoxy group.

Preferred examples of the substituted or unsubstituted alkylthio group include a linear or branched alkylthio group having 1 to 6 carbon atom(s) in total such as a methylthio group, an ethylthio group, an n-propylthio group, an iso-propylthio group, an n-butylthio group, an iso-butylthio group, a sec-butylthio group, a t-butylthio group, an n-pentylthio group, an iso-pentylthio group, an n-hexylthio group, and an iso-hexylthio group;

a cycloalkylthio group having 5 to 6 carbon atoms in total such as a cyclopentylthio group and a cyclohexylthio group;

an alkoxyalkylthio group having 2 to 6 carbon atoms in total such as a methoxyethylthio group, an ethoxyethylthio group, an n-propoxyethylthio group, an iso-propoxyethylthio group, an n-butoxyethylthio group, an iso-butoxyethylthio group, and a tert-butoxyethylthio group; and an alkylthioalkylthio group having 2 to 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, and a tert-butylthioethylthio group.

Preferred examples of the substituted or unsubstituted aryloxy group include an unsubstituted or alkyl-substituted aryloxy group having not more than 12 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a butylphenyloxy group, a hexylphenyloxy group, a cyclohexylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, a 3,6-dimethylphenyloxy group, a 2,3,4-trimethylphenyloxy group, a 2,3,5-trimethylphenyloxy group, a 2,3,6-trimethylphenyloxy group, a 2,4,5-trimethylphenyloxy group, a 2,4,6-trimethylphenyloxy group, and a 3,4,5-trimethylphenyloxy group;

a monoalkoxyaryloxy group having not more than 12 carbon atoms in total wherein a substituted or unsubstituted alkyloxy group having not more than 6 carbon atoms is substituted, such as a 2-methoxyphenyloxy group, a 3-methoxyphenyloxy group, a 4-methoxyphenyloxy group, a 2-ethoxyphenyloxy group, a propoxyphenyloxy group, a butoxyphenyloxy group, a hexyloxyphenyloxy group, a cyclohexyloxyphenyloxy group;

a dialkoxyaryloxy group having not more than 12 carbon atoms in total wherein a substituted or unsubstituted alkyloxy group having not more than 6 carbon atoms is substituted, such as a 2,3-dimethoxyphenyloxy group, a 2,4-dimethoxyphenyloxy group, a 2,5-dimethoxyphenyloxy group, a 2,6-dimethoxyphenyloxy group, a 3,4-dimethoxyphenyloxy group, a 3,5-dimethoxyphenyloxy group, and a 3,6-dimethoxyphenyloxy group; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, an iodophenyloxy group, a fluorophenyloxy group, a chloronaphthyloxy group, a bromonaphthyloxy group, a difluorophenyloxy group, a trifluorophenyloxy group, a tetrafluorophenyloxy group, and a pentafluorophenyloxy group.

Preferred examples of the substituted or unsubstituted arylthio group include an unsubstituted or alkyl-substituted arylthio group having not more than 12 carbon atoms in total such as a phenylthio group, a naphthylthio group, a 2-methylphenylthio group, a 3-methylphenylthio group, a 4-methylphenylthio group, a 2-ethylphenylthio group, a propylphenylthio group, a butylphenylthio group, a hexylphenylthio group, a cyclohexylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, a 3,6-dimethylphenylthio group, a 2,3,4-trimethylphenylthio group, a 2,3,5-trimethylphenylthio group, a 2,3,6-trimethylphenylthio group, a 2,4,5-trimethylphenylthio group, a 2,4,6-trimethylphenylthio group, and a 3,4,5-trimethylphenylthio group;

a monoalkoxyarylthio group having not more than 12 carbon atoms in total wherein a substituted or unsubstituted alkyloxy group having not more than 6 carbon atoms is substituted, such as a 2-methoxyphenylthio group, a 3-methoxyphenylthio group, a 4-methoxyphenylthio group, a 2-ethoxyphenylthio group, a propoxyphenylthio group, a butoxyphenylthio group, a hexyloxyphenylthio group, and a cyclohexyloxyphenylthio group;

a dialkoxyarylthio group having not more than 12 carbon atoms in total wherein a substituted or unsubstituted alkyloxy group having not more than 6 carbon atoms is substituted, such as a 2,3-dimethoxyphenylthio group, a 2,4-dimethoxyphenylthio group, a 2,5-dimethoxyphenylthio group, a 2,6-dimethoxyphenylthio group, a 3,4-dimethoxyphenylthio group, a 3,5-dimethoxyphenylthio group, a 3,6-dimethoxyphenylthio group, a 4,5-dimethoxy-1-naphthylthio group, a 4,7-dimethoxy-1-naphthylthio group, a 4,8-dimethoxy-1-naphthylthio group, a 5,8-dimethoxy-1-naphthylthio group, and a 5,8-dimethoxy-2-naphthylthio group; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, an iodophenylthio group, a fluorophenylthio group, a chloronaphthylthio group, a bromonaphthylthio group, a difluorophenylthio group, a trifluorophenylthio group, a tetrafluorophenylthio group, and a pentafluorophenylthio group.

More preferred examples of Y are as follows.

More preferred example includes a hydrogen atom.

Further, examples of the halogen atom include a chlorine atom and a bromine atom.

More preferred examples of the substituted or unsubstituted alkyl group include a linear or branched alkyl group having 1 to 3 carbon atom(s) in total such as a methyl group, an ethyl group, and an iso-propyl group.

More preferred examples of the substituted or unsubstituted aryl group include aromatic hydrocarbons having not more than 12 carbon atoms in total such as a phenyl group, a naphthyl group, and a cyclopentadienyl group;

an alkyl-substituted aryl group having not more than 9 carbon atoms in total such as a 2-methylphenyl group, a 3-methylphenyl group, a 4-methylphenyl group, a 2-ethylphenyl group, a propylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, and a 3,6-dimethylphenyl group;

a monoalkoxyaryl group having not more than 9 carbon atoms in total wherein a substituted or unsubstituted alkyloxy group having not more than 3 carbon atoms is substituted, such as a 2-methoxyphenyl group, a 3-methoxyphenyl group, a 4-methoxyphenyl group, a 2-ethoxyphenyl group, and a propoxyphenyl group; and an aryl group having not more than 12 carbon atoms in total wherein a halogen atom is substituted, such as a chlorophenyl group, a dichlorophenyl group, a trichlorophenyl group, a bromophenyl group, a dibromophenyl group, a chloronaphthyl group, and a bromonaphthyl group.

More preferred examples of the substituted or unsubstituted aralkyl group include an aralkyl group having not more than 9 carbon atoms in total such as a benzyl group, a phenethyl group, and a phenylpropyl group.

More preferred examples of the substituted or unsubstituted alkyloxy group include a linear or branched alkoxy group having 1 to 3 carbon atom(s) in total such as a methoxy group, an ethoxy group, and an iso-propoxy group; and a cycloalkoxy group having 5 to 6 carbon atoms in total such as a cyclopentyloxy group, and a cyclohexyloxy group.

More preferred examples of the substituted or unsubstituted alkylthio group include a linear or branched alkylthio group having 1 to 3 carbon atom(s) in total such as a methylthio group, an ethylthio group, an n-propylthio group, and an iso-propylthio group;

a cycloalkylthio group having 5 to 6 carbon atoms in total such as a cyclopentylthio group, and a cyclohexylthio group; and an alkylthioalkylthio group having 2 to 6 carbon atoms in total such as a methylthioethylthio group, an ethylthioethylthio group, an n-propylthioethylthio group, an iso-propylthioethylthio group, an n-butylthioethylthio group, an iso-butylthioethylthio group, and a tert-butylthioethylthio group.

More preferred examples of the substituted or unsubstituted aryloxy group include an unsubstituted or alkyl-substituted aryloxy group having not more than 9 carbon atoms in total such as a phenyloxy group, a naphthyloxy group, a 2-methylphenyloxy group, a 3-methylphenyloxy group, a 4-methylphenyloxy group, a 2-ethylphenyloxy group, a propylphenyloxy group, a 2,4-dimethylphenyloxy group, a 2,5-dimethylphenyloxy group, a 2,6-dimethylphenyloxy group, a 3,4-dimethylphenyloxy group, a 3,5-dimethylphenyloxy group, and a 3,6-dimethylphenyloxy group;

a monoalkoxyaryloxy group having not more than 9 carbon atoms in total wherein a substituted or unsubstituted alkyloxy group having not more than 3 carbon atoms is substituted, such as a 2-methoxyphenyloxy group, a 3-methoxyphenyloxy group, a 4-methoxyphenyloxy group, a 2-ethoxyphenyloxy group, and a propoxyphenyloxy group; and an aryloxy group having not more than 12 carbon atoms in total wherein a halogen atom is substituted, such as a chlorophenyloxy group, a dichlorophenyloxy group, a trichlorophenyloxy group, a bromophenyloxy group, a dibromophenyloxy group, a chloronaphthyloxy group, and a bromonaphthyloxy group.

More preferred examples of the substituted or unsubstituted arylthio group include an unsubstituted or alkyl-substituted arylthio group having not more than 9 carbon atoms in total such as a phenylthio group, a 2-methylphenylthio group, a 3-methylphenylthio group, a 4-methylphenylthio group, a 2-ethylphenylthio group, a propylphenylthio group, a 2,4-dimethylphenylthio group, a 2,5-dimethylphenylthio group, a 2,6-dimethylphenylthio group, a 3,4-dimethylphenylthio group, a 3,5-dimethylphenylthio group, and a 3,6-dimethylphenylthio group;

a monoalkoxyarylthio group having not more than 9 carbon atoms in total wherein a substituted or unsubstituted alkyloxy group having not more than 3 carbon atoms is substituted, such as a 2-methoxyphenylthio group, a 3-methoxyphenylthio group, a 4-methoxyphenylthio group, a 2-ethoxyphenylthio group, and a propoxyphenylthio group; and an arylthio group having not more than 12 carbon atoms in total wherein a halogen atom is substituted, such as a chlorophenylthio group, a dichlorophenylthio group, a trichlorophenylthio group, a bromophenylthio group, a dibromophenylthio group, a chloronaphthylthio group, and a bromonaphthylthio group.

Furthermore, if n−p is an integer of 2 or greater, Y's may be bonded to each other to form a ring structure with the intermediary of a metal atom M. That is, a plurality of Y's may be bonded to each other to form a ring containing a metal atom M.

In General Formula (1), Y in the —(Y)$_{n-p}$ group bonding to M is preferably (S—R$_2$) (wherein S is a sulfur atom, and R$_2$ is the same as R$_2$ in the following General Formula (5)), and p is an integer of 2 to (n–1). In this constitution, it is preferable that m=0 and X$_1$ is a sulfur atom. Furthermore, in this constitution, it is more preferable that m=0, X$_1$ is sulfur atom, and M is a Group 14 element. Thus, the compound of General Formula (1) is a compound represented by the following General Formula (13).

Furthermore, preferred examples of the thietane compound wherein Y is (S—R$_2$) in General Formula (1) include a compound represented by the following General Formula (5).

[Chemical Formula 5]

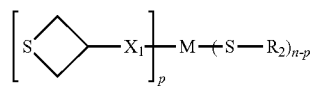
(5)

(in General Formula (5), M is a Group 14 element in a long form of the Periodic Table. X$_1$ and n are each the same as X$_1$ and n, respectively, in General Formula (1). P is an integer of 2 to (n–1).

If n–p is 1, R$_2$ represents an optionally substituted, linear or branched alkyl group having 1 to 3 carbon atom(s).

If n–p is 2 or greater, a plurality of R$_2$'s each independently represents an optionally substituted, linear or branched alkyl group having 1 to 3 carbon atom(s). Furthermore, a plurality of R$_2$'s may be bonded to each other to form an M-containing ring, and in this case, the alkyl chain forming the ring has 1 to 3 carbon atom(s), and the moiety constituting the ring contains no sulfur atom).

In General Formula (5), M represents a Group 14 element such as a Sn atom, a Si atom, a Ge atom, and a Pb atom. M is preferably a higher-periodic Group 14 metal element such as a Sn atom and a Pb atom, more preferably a Sn atom.

In General Formula (5), from the viewpoint of improvement in the refractive index of the resin, X$_1$ is preferably a sulfur atom. Here, General Formula (5) would be the following General Formula (13).

[Chemical Formula 6]

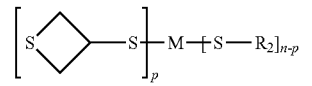
(13)

(in General Formula (13), M, p, n and R$_2$ are each the same as M, p, n and R$_2$, respectively, in General Formula (5)).

In General Formula (13), M is preferably a Sn atom as in General Formula (5).

In General Formula (5), n represents a valence of a metal atom M. Furthermore, in General Formula (5), p is a positive integer of (the valence of M–1) or less. That is, p is an integer of 2 to (n–1)

In General Formula (5), R$_2$ represents an optionally substituted, linear or branched alkyl group having 1 to 3 carbon atom(s).

If n–p is 2 or greater, R$_2$'s each independently represents an optionally substituted, linear or branched alkyl group having 1 to 3 carbon atom(s). A plurality of R$_2$'s may be the same group, or all or a part thereof may be different. Furthermore, a plurality of R$_2$'s may be bonded to each other to form a ring containing M. In this case, the alkyl chain forming the ring has 1 to 3 carbon atom(s), and any sulfur atom is directed bonded to M. That is, in R$_2$, the moiety constituting the ring contains no sulfur atom.

One preferred example of the compound represented by General Formula (5) includes the following embodiment. That is, if R$_2$'s do not form a ring, specific examples of R$_2$ include an alkyl group having 1 to 3 carbon atom(s), such as a methyl group, an ethyl group, a propyl group, and an isopropyl group. Further, if they form a ring, examples of the alkyl chain forming a ring include an alkylene group having 1 to 3 carbon atom(s), such as a methylene group, an ethylene group, and a propylene group. The ring containing M is specifically a 4- to 6-membered ring. Furthermore, if the ring containing M is a 4-membered ring, one of two R$_2$'s is specifically a single bond.

More specifically, if they do not form a ring, R$_2$ is a methyl group, and if they do form ring, the alkyl chain forming a ring is an ethylene group.

Next, specific examples of the compound represented by General Formula (1) will be described. Specific examples of the compound represented by General Formula (1) are presented in the following Tables 1 to 17, but not limited thereto. Tables 1 to 17 show specific examples of the compound represented by General Formula (1). Furthermore, in Tables 1 to 17, "CMPD. No." refers to Compound No.

Furthermore, in Tables 1 to 17, Y$_1$, Y$_2$, and Y$_3$ each represent Y in the case where the total number of Y's bonding to M is 3 or less, that is, the value of n–p is 3 or less. Specifically, in the case of n–p=1, Y is only Y$_1$. In the case of n–p=2, the compound contains Y$_1$ and Y$_2$ as Y, which may be the same as or different from each other. Furthermore, in the case of n–p=3, the compound contains Y$_1$, Y$_2$, and Y$_3$ as Y, which may be the same as or different from each other.

Furthermore, in Tables, in the case where n–p is 2, two Y's, in the compound in which one group is depicted in Y$_1$ through Y$_2$, may be bonded to each other to form a ring containing metal atom M.

TABLE 1

| CMPD. No. | M | n | p | n–p | m | X$_1$ | X$_2$ | R$_1$ | Y$_1$ | Y$_2$ | Y$_3$ |
|---|---|---|---|---|---|---|---|---|---|---|---|
| 1-1 | Sn | 4 | 4 | 0 | 0 | S | — | — | — | — | — |
| 1-2 | Sn | 4 | 4 | 0 | 0 | O | — | — | — | — | — |
| 1-3 | Sn | 4 | 4 | 0 | 1 | S | S | CH$_2$ | — | — | — |
| 1-4 | Sn | 4 | 4 | 0 | 1 | O | S | CH$_2$ | — | — | — |
| 1-5 | Sn | 4 | 4 | 0 | 1 | S | O | CH$_2$ | — | — | — |
| 1-6 | Sn | 4 | 4 | 0 | 1 | O | O | CH$_2$ | — | — | — |
| 1-7 | Sn | 4 | 4 | 0 | 1 | S | S | C$_2$H$_4$ | — | — | — |
| 1-8 | Sn | 4 | 4 | 0 | 1 | O | S | C$_2$H$_4$ | — | — | — |
| 1-9 | Sn | 4 | 4 | 0 | 1 | S | O | C$_2$H$_4$ | — | — | — |
| 1-10 | Sn | 4 | 4 | 0 | 1 | O | O | C$_2$H$_4$ | — | — | — |
| 1-11 | Sn | 4 | 4 | 0 | 1 | S | S | 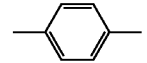 | — | — | — |
| 1-12 | Sn | 4 | 4 | 0 | 1 | O | S | 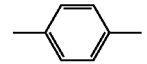 | — | — | — |
| 1-13 | Sn | 4 | 4 | 0 | 1 | S | O | 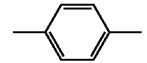 | — | — | — |

TABLE 1-continued

| CMPD. No. | M | n | p | n−p | m | $X_1$ | $X_2$ | $R_1$ | $Y_1$ | $Y_2$ | $Y_3$ |
|---|---|---|---|---|---|---|---|---|---|---|---|
| 1-14 | Sn | 4 | 4 | 0 | 1 | O | O | 1,4-phenylene | — | — | — |
| 1-15 | Sn | 4 | 4 | 0 | 1 | S | S | 1,3-phenylene | — | — | — |
| 1-16 | Sn | 4 | 4 | 0 | 1 | O | S | 1,3-phenylene | — | — | — |
| 1-17 | Sn | 4 | 4 | 0 | 1 | S | O | 1,3-phenylene | — | — | — |

TABLE 2

| CMPD. No. | M | n | p | n−p | m | $X_1$ | $X_2$ | $R_1$ | $Y_1$ | $Y_2$ | $Y_3$ |
|---|---|---|---|---|---|---|---|---|---|---|---|
| 1-18 | Sn | 4 | 4 | 0 | 1 | O | O | 1,3-phenylene | — | — | — |
| 1-19 | Sn | 4 | 4 | 0 | 1 | S | S | 1,2-phenylene | — | — | — |
| 1-20 | Sn | 4 | 4 | 0 | 1 | O | S | 1,2-phenylene | — | — | — |
| 1-21 | Sn | 4 | 4 | 0 | 1 | S | O | 1,2-phenylene | — | — | — |
| 1-22 | Sn | 4 | 4 | 0 | 1 | O | O | 1,2-phenylene | — | — | — |
| 1-23 | Sn | 4 | 4 | 0 | 1 | S | S | —CH$_2$—(1,4-phenylene)—CH$_2$— | — | — | — |
| 1-24 | Sn | 4 | 4 | 0 | 1 | O | S | —CH$_2$—(1,4-phenylene)—CH$_2$— | — | — | — |
| 1-25 | Sn | 4 | 4 | 0 | 1 | S | O | —CH$_2$—(1,4-phenylene)—CH$_2$— | — | — | — |
| 1-26 | Sn | 4 | 4 | 0 | 1 | O | O | —CH$_2$—(1,4-phenylene)—CH$_2$— | — | — | — |

TABLE 2-continued
| CMPD. No. | M | n | p | n-p | m | X₁ | X₂ | R₁ | Y₁ | Y₂ | Y₃ |
|---|---|---|---|---|---|---|---|---|---|---|---|
| 1-27 | Sn | 4 | 4 | 0 | 1 | S | S | 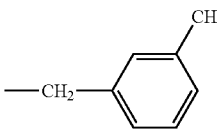 | — | — | — |
| 1-28 | Sn | 4 | 4 | 0 | 1 | O | S | 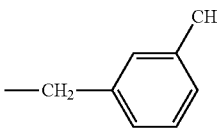 | — | — | — |
| 1-29 | Sn | 4 | 4 | 0 | 1 | S | O | 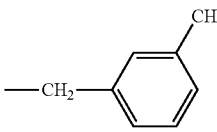 | — | — | — |
| 1-30 | Sn | 4 | 4 | 0 | 1 | O | O | 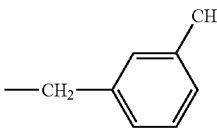 | — | — | — |
TABLE 3
| CMPD. No. | M | n | p | n-p | m | X₁ | X₂ | R₁ | Y₁ | Y₂ | Y₃ |
|---|---|---|---|---|---|---|---|---|---|---|---|
| 1-31 | Sn | 4 | 4 | 0 | 1 | S | S | 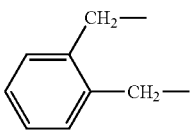 | — | — | — |
| 1-32 | Sn | 4 | 4 | 0 | 1 | O | S | 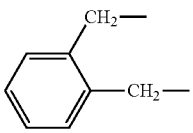 | — | — | — |
| 1-33 | Sn | 4 | 4 | 0 | 1 | S | O | 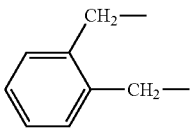 | — | — | — |
| 1-34 | Sn | 4 | 4 | 0 | 1 | O | O | 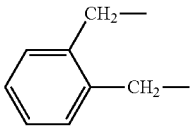 | — | — | — |
| 1-35 | Sn | 4 | 3 | 1 | 0 | S | — | — | CH₃ | — | — |
| 1-36 | Sn | 4 | 3 | 1 | 0 | O | — | — | CH₃ | — | — |
| 1-37 | Sn | 4 | 3 | 1 | 0 | S | — | — | C₂H₅ | — | — |
| 1-38 | Sn | 4 | 3 | 1 | 0 | O | — | — | C₂H₅ | — | — |
| 1-39 | Sn | 4 | 3 | 1 | 0 | S | — | — | C₃H₇ | — | — |
| 1-40 | Sn | 4 | 3 | 1 | 0 | O | — | — | C₃H₇ | — | — |
| 1-41 | Sn | 4 | 3 | 1 | 0 | S | — | — | C₄H₉ | — | — |
| 1-42 | Sn | 4 | 3 | 1 | 0 | O | — | — | C₄H₉ | — | — |
| 1-43 | Sn | 4 | 3 | 1 | 0 | S | — | — | C₆H₅ | — | — |
| 1-44 | Sn | 4 | 3 | 1 | 0 | O | — | — | C₆H₅ | — | — |
| 1-45 | Sn | 4 | 2 | 2 | 0 | S | — | — | CH₃ | CH₃ | — |
| 1-46 | Sn | 4 | 2 | 2 | 0 | O | — | — | CH₃ | CH₃ | — |
| 1-47 | Sn | 4 | 2 | 2 | 0 | S | — | — | C₂H₅ | C₂H₅ | — |
| 1-48 | Sn | 4 | 2 | 2 | 0 | O | — | — | C₂H₅ | C₂H₅ | — |

TABLE 3-continued

| CMPD. No. | M | n | p | n-p | m | X₁ | X₂ | R₁ | Y₁ | Y₂ | Y₃ |
|---|---|---|---|---|---|---|---|---|---|---|---|
| 1-49 | Sn | 4 | 2 | 2 | 0 | S | — | — | C₃H₇ | C₃H₇ | — |
| 1-50 | Sn | 4 | 2 | 2 | 0 | O | — | — | C₃H₇ | C₃H₇ | — |

TABLE 4

| CMPD. No. | M | n | p | n-p | m | X₁ | X₂ | R₁ | Y₁ | Y₂ | Y₃ |
|---|---|---|---|---|---|---|---|---|---|---|---|
| 1-51 | Sn | 4 | 2 | 2 | 0 | S | — | — | C₄H₉ | C₄H₉ | — |
| 1-52 | Sn | 4 | 2 | 2 | 0 | O | — | — | C₄H₉ | C₄H₉ | — |
| 1-53 | Sn | 4 | 2 | 2 | 0 | S | — | — | C₆H₅ | C₆H₅ | — |
| 1-54 | Sn | 4 | 2 | 2 | 0 | O | — | — | C₆H₅ | C₆H₅ | — |
| 1-55 | Sn | 4 | 1 | 3 | 0 | S | — | — | CH₃ | CH₃ | CH₃ |
| 1-56 | Sn | 4 | 1 | 3 | 0 | O | — | — | CH₃ | CH₃ | CH₃ |
| 1-57 | Sn | 4 | 1 | 3 | 0 | S | — | — | C₂H₅ | C₂H₅ | C₂H₅ |
| 1-58 | Sn | 4 | 1 | 3 | 0 | O | — | — | C₂H₅ | C₂H₅ | C₂H₅ |
| 1-59 | Sn | 4 | 1 | 3 | 0 | S | — | — | C₃H₇ | C₃H₇ | C₃H₇ |
| 1-60 | Sn | 4 | 1 | 3 | 0 | O | — | — | C₃H₇ | C₃H₇ | C₃H₇ |
| 1-61 | Sn | 4 | 1 | 3 | 0 | S | — | — | C₄H₉ | C₄H₉ | C₄H₉ |
| 1-62 | Sn | 4 | 1 | 3 | 0 | O | — | — | C₄H₉ | C₄H₉ | C₄H₉ |
| 1-63 | Sn | 4 | 1 | 3 | 0 | S | — | — | C₆H₅ | C₆H₅ | C₆H₅ |
| 1-64 | Sn | 4 | 1 | 3 | 0 | O | — | — | C₆H₅ | C₆H₅ | C₆H₅ |
| 1-65 | Sn | 4 | 3 | 1 | 0 | S | — | — | SCH₃ | — | — |
| 1-66 | Sn | 4 | 3 | 1 | 0 | O | — | — | SCH₃ | — | — |
| 1-67 | Sn | 4 | 3 | 1 | 0 | S | — | — | SC₂H₅ | — | — |
| 1-68 | Sn | 4 | 3 | 1 | 0 | O | — | — | SC₂H₅ | — | — |
| 1-69 | Sn | 4 | 3 | 1 | 0 | S | — | — | SC₆H₅ | — | — |
| 1-70 | Sn | 4 | 3 | 1 | 0 | O | — | — | SC₆H₅ | — | — |
| 1-71 | Sn | 4 | 2 | 2 | 0 | S | — | — | SC₂H₄S | — | — |
| 1-72 | Sn | 4 | 2 | 2 | 0 | O | — | — | SC₂H₄S | — | — |
| 1-73 | Sn | 4 | 2 | 2 | 0 | S | — | — | SC₃H₆S | — | — |

TABLE 5

| CMPD. No. | M | n | p | n-p | m | X₁ | X₂ | R₁ | Y₁ | Y₂ | Y₃ |
|---|---|---|---|---|---|---|---|---|---|---|---|
| 1-74 | Sn | 4 | 2 | 2 | 0 | O | — | — | SC₃H₆S | — | — |
| 1-75 | Sn | 4 | 2 | 2 | 0 | S | — | — | SC₂H₄SC₂H₄S | — | — |
| 1-76 | Sn | 4 | 2 | 2 | 0 | O | — | — | SC₂H₄SC₂H₄S | — | — |
| 1-77 | Sn | 4 | 3 | 1 | 1 | S | S | CH₂ | CH₃ | — | — |
| 1-78 | Sn | 4 | 3 | 1 | 1 | O | S | CH₂ | CH₃ | — | — |
| 1-79 | Sn | 4 | 3 | 1 | 1 | S | O | CH₂ | CH₃ | — | — |
| 1-80 | Sn | 4 | 3 | 1 | 1 | O | O | C₂H₄ | CH₃ | — | — |
| 1-81 | Sn | 4 | 3 | 1 | 1 | S | S | C₂H₄ | CH₃ | — | — |
| 1-82 | Sn | 4 | 3 | 1 | 1 | O | S | C₂H₄ | CH₃ | — | — |
| 1-83 | Sn | 4 | 3 | 1 | 1 | S | O | C₂H₄ | CH₃ | — | — |
| 1-84 | Sn | 4 | 3 | 1 | 1 | O | O | C₂H₄ | CH₃ | — | — |
| 1-85 | Sn | 4 | 3 | 1 | 1 | S | S | 1,4-phenylene | CH₃ | — | — |
| 1-86 | Sn | 4 | 3 | 1 | 1 | O | S | 1,4-phenylene | CH₃ | — | — |
| 1-87 | Sn | 4 | 3 | 1 | 1 | S | O | 1,4-phenylene | CH₃ | — | — |
| 1-88 | Sn | 4 | 3 | 1 | 1 | O | O | 1,4-phenylene | CH₃ | — | — |
| 1-89 | Sn | 4 | 3 | 1 | 1 | S | S | 1,3-phenylene | CH₃ | — | — |
| 1-90 | Sn | 4 | 3 | 1 | 1 | O | S | 1,3-phenylene | CH₃ | — | — |

TABLE 5-continued
| CMPD. No. | M | n | p | n−p | m | X₁ | X₂ | R₁ | Y₁ | Y₂ | Y₃ |
|---|---|---|---|---|---|---|---|---|---|---|---|
| 1-91 | Sn | 4 | 3 | 1 | 1 | S | O | 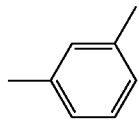 | CH₃ | — | — |
TABLE 6
| CMPD. No. | M | n | p | n−p | m | X₁ | X₂ | R₁ | Y₁ | Y₂ | Y₃ |
|---|---|---|---|---|---|---|---|---|---|---|---|
| 1-92 | Sn | 4 | 3 | 1 | 1 | O | O | *m-dimethylbenzene* | CH₃ | — | — |
| 1-93 | Sn | 4 | 3 | 1 | 1 | S | S | *o-dimethylbenzene* | CH₃ | — | — |
| 1-94 | Sn | 4 | 3 | 1 | 1 | O | S | *o-dimethylbenzene* | CH₃ | — | — |
| 1-95 | Sn | 4 | 3 | 1 | 1 | S | O | *o-dimethylbenzene* | CH₃ | — | — |
| 1-96 | Sn | 4 | 3 | 1 | 1 | O | O | *o-dimethylbenzene* | CH₃ | — | — |
| 1-97 | Sn | 4 | 3 | 1 | 1 | S | S | —CH₂—C₆H₄—CH₂— (para) | CH₃ | — | — |
| 1-98 | Sn | 4 | 3 | 1 | 1 | O | S | —CH₂—C₆H₄—CH₂— (para) | CH₃ | — | — |
| 1-99 | Sn | 4 | 3 | 1 | 1 | S | O | —CH₂—C₆H₄—CH₂— (para) | CH₃ | — | — |
| 1-100 | Sn | 4 | 3 | 1 | 1 | O | O | —CH₂—C₆H₄—CH₂— (para) | CH₃ | — | — |
| 1-101 | Sn | 4 | 3 | 1 | 1 | S | S | —CH₂—C₆H₄—CH₂— (meta) | CH₃ | — | — |

TABLE 6-continued

| CMPD. No. | M | n | p | n-p | m | X₁ | X₂ | R₁ | Y₁ | Y₂ | Y₃ |
|---|---|---|---|---|---|---|---|---|---|---|---|
| 1-102 | Sn | 4 | 3 | 1 | 1 | O | S | —CH₂-(m-C₆H₄)-CH₂— | CH₃ | — | — |
| 1-103 | Sn | 4 | 3 | 1 | 1 | S | O | —CH₂-(m-C₆H₄)-CH₂— | CH₃ | — | — |
| 1-104 | Sn | 4 | 3 | 1 | 1 | O | O | —CH₂-(m-C₆H₄)-CH₂— | CH₃ | — | — |

TABLE 7

| CMPD. No. | M | n | p | n-p | m | X₁ | X₂ | R₁ | Y₁ | Y₂ | Y₃ |
|---|---|---|---|---|---|---|---|---|---|---|---|
| 1-105 | Sn | 4 | 3 | 1 | 1 | S | S | —CH₂-(o-C₆H₄)-CH₂— | CH₃ | — | — |
| 1-106 | Sn | 4 | 3 | 1 | 1 | O | S | —CH₂-(o-C₆H₄)-CH₂— | CH₃ | — | — |
| 1-107 | Sn | 4 | 3 | 1 | 1 | S | O | —CH₂-(o-C₆H₄)-CH₂— | CH₃ | — | — |
| 1-108 | Sn | 4 | 3 | 1 | 1 | O | O | —CH₂-(o-C₆H₄)-CH₂— | CH₃ | — | — |
| 1-109 | Sn | 4 | 3 | 1 | 1 | S | S | CH₂ | CH₃ | — | — |
| 1-110 | Sn | 4 | 3 | 1 | 1 | O | S | CH₂ | C₆H₅ | — | — |
| 1-111 | Sn | 4 | 3 | 1 | 1 | S | O | CH₂ | C₆H₅ | — | — |
| 1-112 | Sn | 4 | 3 | 1 | 1 | O | O | CH₂ | C₆H₅ | — | — |
| 1-113 | Sn | 4 | 3 | 1 | 1 | S | S | C₂H₄ | C₆H₅ | — | — |
| 1-114 | Sn | 4 | 3 | 1 | 1 | O | S | C₂H₄ | C₆H₅ | — | — |
| 1-115 | Sn | 4 | 3 | 1 | 1 | S | O | C₂H₄ | C₆H₅ | — | — |
| 1-116 | Sn | 4 | 3 | 1 | 1 | O | O | C₂H₄ | C₆H₅ | — | — |
| 1-117 | Sn | 4 | 3 | 1 | 1 | S | S | —(p-C₆H₄)— | C₆H₅ | — | — |
| 1-118 | Sn | 4 | 3 | 1 | 1 | O | S | —(p-C₆H₄)— | C₆H₅ | — | — |

TABLE 7-continued
| CMPD. No. | M | n | p | n–p | m | X₁ | X₂ | R₁ | Y₁ | Y₂ | Y₃ |
|---|---|---|---|---|---|---|---|---|---|---|---|
| 1-119 | Sn | 4 | 3 | 1 | 1 | S | O |  | C₆H₅ | — | — |
| 1-120 | Sn | 4 | 3 | 1 | 1 | O | O |  | C₆H₅ | — | — |
TABLE 8
| CMPD. No. | M | n | p | n–p | m | X₁ | X₂ | R₁ | Y₁ | Y₂ | Y₃ |
|---|---|---|---|---|---|---|---|---|---|---|---|
| 1-121 | Sn | 4 | 3 | 1 | 1 | S | S | 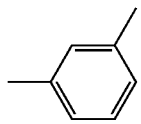 | C₆H₅ | — | — |
| 1-122 | Sn | 4 | 3 | 1 | 1 | O | S | 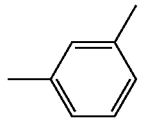 | C₆H₅ | — | — |
| 1-123 | Sn | 4 | 3 | 1 | 1 | S | O | 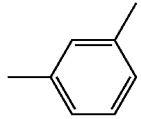 | C₆H₅ | — | — |
| 1-124 | Sn | 4 | 3 | 1 | 1 | O | O | 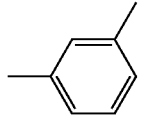 | C₆H₅ | — | — |
| 1-125 | Sn | 4 | 3 | 1 | 1 | S | S | 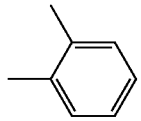 | C₆H₅ | — | — |
| 1-126 | Sn | 4 | 3 | 1 | 1 | O | S | 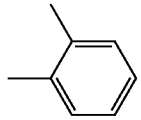 | C₆H₅ | — | — |
| 1-127 | Sn | 4 | 3 | 1 | 1 | S | O | 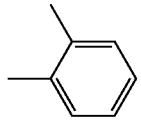 | C₆H₅ | — | — |
| 1-128 | Sn | 4 | 3 | 1 | 1 | O | O | 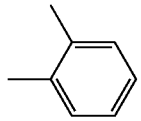 | C₆H₅ | — | — |
| 1-129 | Sn | 4 | 3 | 1 | 1 | S | S | 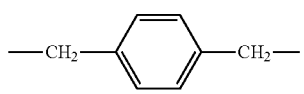 | C₆H₅ | — | — |

TABLE 8-continued
| CMPD. No. | M | n | p | n-p | m | X₁ | X₂ | R₁ | Y₁ | Y₂ | Y₃ |
|---|---|---|---|---|---|---|---|---|---|---|---|
| 1-130 | Sn | 4 | 3 | 1 | 1 | O | S |  | C₆H₅ | — | — |
| 1-131 | Sn | 4 | 3 | 1 | 1 | S | O |  | C₆H₅ | — | — |
| 1-132 | Sn | 4 | 3 | 1 | 1 | O | O |  | C₆H₅ | — | — |
| 1-133 | Sn | 4 | 3 | 1 | 1 | S | S | 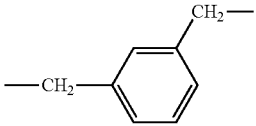 | C₆H₅ | — | — |
TABLE 9
| CMPD. No. | M | n | p | n-p | m | X₁ | X₂ | R₁ | Y₁ | Y₂ | Y₃ |
|---|---|---|---|---|---|---|---|---|---|---|---|
| 1-134 | Sn | 4 | 3 | 1 | 1 | O | S | 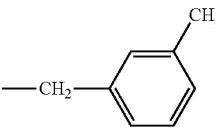 | C₆H₅ | — | — |
| 1-135 | Sn | 4 | 3 | 1 | 1 | S | O | 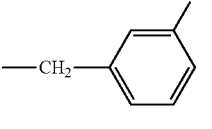 | C₆H₅ | — | — |
| 1-136 | Sn | 4 | 3 | 1 | 1 | O | O | 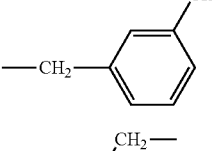 | C₆H₅ | — | — |
| 1-137 | Sn | 4 | 3 | 1 | 1 | S | S | 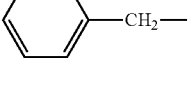 | C₆H₅ | — | — |
| 1-138 | Sn | 4 | 3 | 1 | 1 | O | S | 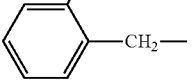 | C₆H₅ | — | — |
| 1-139 | Sn | 4 | 3 | 1 | 1 | S | O | 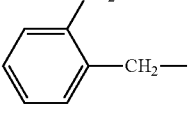 | C₆H₅ | — | — |
| 1-140 | Sn | 4 | 3 | 1 | 1 | O | O | 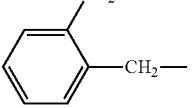 | C₆H₅ | — | — |

TABLE 9-continued
| CMPD. No. | M | n | p | n – p | m | X₁ | X₂ | R₁ | Y₁ | Y₂ | Y₃ |
|---|---|---|---|---|---|---|---|---|---|---|---|
| 1-141 | Si | 4 | 4 | 0 | 0 | S | — | — | — | — | — |
| 1-142 | Si | 4 | 4 | 0 | 0 | O | — | — | — | — | — |
| 1-143 | Si | 4 | 4 | 0 | 1 | S | S | — | — | — | — |
| 1-144 | Si | 4 | 4 | 0 | 1 | O | S | — | — | — | — |
| 1-145 | Si | 4 | 4 | 0 | 1 | S | O | — | — | — | — |
| 1-146 | Si | 4 | 4 | 0 | 1 | O | O | — | — | — | — |
| 1-147 | Si | 4 | 4 | 0 | 1 | S | S | — | — | — | — |
| 1-148 | Si | 4 | 4 | 0 | 1 | O | S | — | — | — | — |
| 1-149 | Si | 4 | 4 | 0 | 1 | S | O | — | — | — | — |
| 1-150 | Si | 4 | 4 | 0 | 1 | O | O | — | — | — | — |
TABLE 10
| CMPD. No. | M | n | p | n – p | m | X₁ | X₂ | R₁ | Y₁ | Y₂ | Y₃ |
|---|---|---|---|---|---|---|---|---|---|---|---|
| 1-151 | Si | 4 | 4 | 0 | 1 | S | S |  | — | — | — |
| 1-152 | Si | 4 | 4 | 0 | 1 | O | S |  | — | — | — |
| 1-153 | Si | 4 | 4 | 0 | 1 | S | O | 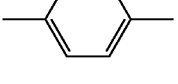 | — | — | — |
| 1-154 | Si | 4 | 4 | 0 | 1 | O | O | 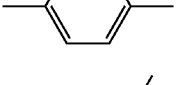 | — | — | — |
| 1-155 | Si | 4 | 4 | 0 | 1 | S | S | 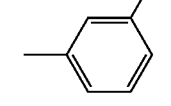 | — | — | — |
| 1-156 | Si | 4 | 4 | 0 | 1 | O | S | 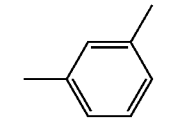 | — | — | — |
| 1-157 | Si | 4 | 4 | 0 | 1 | S | O | 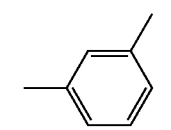 | — | — | — |
| 1-158 | Si | 4 | 4 | 0 | 1 | O | O | 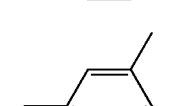 | — | — | — |
| 1-159 | Si | 4 | 4 | 0 | 1 | S | S | 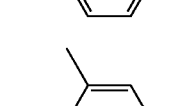 | — | — | — |
| 1-160 | Si | 4 | 4 | 0 | 1 | O | S | 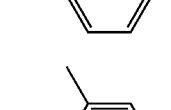 | — | — | — |

TABLE 10-continued
| CMPD. No. | M | n | p | n−p | m | X₁ | X₂ | R₁ | Y₁ | Y₂ | Y₃ |
|---|---|---|---|---|---|---|---|---|---|---|---|
| 1-161 | Si | 4 | 4 | 0 | 1 | S | O | 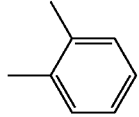 | — | — | — |
| 1-162 | Si | 4 | 4 | 0 | 1 | O | O | 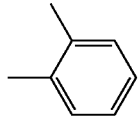 | — | — | — |
| 1-163 | Si | 4 | 4 | 0 | 1 | S | S |  | — | — | — |
TABLE 11
| CMPD. No. | M | n | p | n−p | m | X₁ | X₂ | R₁ | Y₁ | Y₂ | Y₃ |
|---|---|---|---|---|---|---|---|---|---|---|---|
| 1-164 | Si | 4 | 4 | 0 | 1 | O | S | 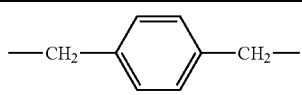 | — | — | — |
| 1-165 | Si | 4 | 4 | 0 | 1 | S | O | 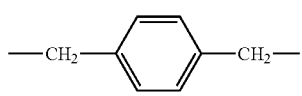 | — | — | — |
| 1-166 | Si | 4 | 4 | 0 | 1 | O | O | 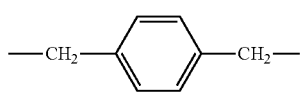 | — | — | — |
| 1-167 | Si | 4 | 4 | 0 | 1 | S | S | 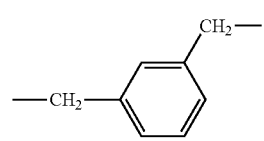 | — | — | — |
| 1-168 | Si | 4 | 4 | 0 | 1 | O | S | 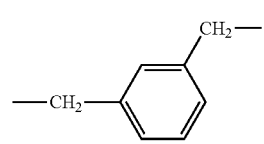 | — | — | — |
| 1-169 | Si | 4 | 4 | 0 | 1 | S | O | 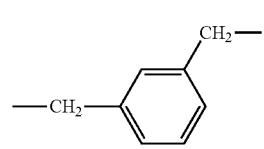 | — | — | — |
| 1-170 | Si | 4 | 4 | 0 | 1 | O | O | 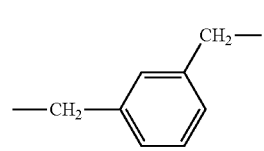 | — | — | — |
| 1-171 | Si | 4 | 4 | 0 | 1 | S | S | 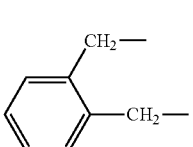 | — | — | — |

TABLE 11-continued

| CMPD. No. | M | n | p | n−p | m | X₁ | X₂ | R₁ | Y₁ | Y₂ | Y₃ |
|---|---|---|---|---|---|---|---|---|---|---|---|
| 1-172 | Si | 4 | 4 | 0 | 1 | O | S | o-C₆H₄(CH₂—)₂ | — | — | — |
| 1-173 | Si | 4 | 4 | 0 | 1 | S | O | o-C₆H₄(CH₂—)₂ | — | — | — |
| 1-174 | Si | 4 | 4 | 0 | 1 | O | O | o-C₆H₄(CH₂—)₂ | — | — | — |
| 1-175 | Si | 4 | 3 | 1 | 0 | S | — | — | CH₃ | — | — |
| 1-176 | Si | 4 | 3 | 1 | 0 | O | — | — | CH₃ | — | — |
| 1-177 | Si | 4 | 3 | 1 | 0 | S | — | — | C₂H₅ | — | — |

TABLE 12

| CMPD. No. | M | n | p | n−p | m | X₁ | X₂ | R₁ | Y₁ | Y₂ | Y₃ |
|---|---|---|---|---|---|---|---|---|---|---|---|
| 1-178 | Si | 4 | 3 | 1 | 0 | O | — | — | C₂H₅ | — | — |
| 1-179 | Si | 4 | 3 | 1 | 0 | S | — | — | C₆H₅ | — | — |
| 1-180 | Si | 4 | 3 | 1 | 0 | O | — | — | C₆H₅ | — | — |
| 1-181 | Si | 4 | 2 | 2 | 0 | S | — | — | CH₃ | CH₃ | — |
| 1-182 | Si | 4 | 2 | 2 | 0 | O | — | — | CH₃ | CH₃ | — |
| 1-183 | Si | 4 | 2 | 2 | 0 | S | — | — | C₆H₅ | C₆H₅ | — |
| 1-184 | Si | 4 | 2 | 2 | 0 | O | — | — | C₆H₅ | C₆H₅ | — |
| 1-185 | Si | 4 | 1 | 3 | 0 | S | — | — | C₆H₅ | C₆H₅ | C₆H₅ |
| 1-186 | Si | 4 | 1 | 3 | 0 | O | — | — | C₆H₅ | C₆H₅ | C₆H₅ |
| 1-187 | Si | 4 | 2 | 2 | 0 | S | — | — | SC₂H₄S | — | — |
| 1-188 | Si | 4 | 2 | 2 | 0 | O | — | — | SC₂H₄S | — | — |
| 1-189 | Si | 4 | 2 | 2 | 0 | S | — | — | SC₃H₆S | — | — |
| 1-190 | Si | 4 | 2 | 2 | 0 | O | — | — | SC₃H₆S | — | — |
| 1-191 | Si | 4 | 2 | 2 | 0 | S | — | — | SC₂H₄SC₂H₄S | — | — |
| 1-192 | Si | 4 | 2 | 2 | 0 | O | — | — | SC₂H₄SC₂H₄S | — | — |
| 1-193 | Ge | 4 | 4 | 0 | 0 | S | — | — | — | — | — |
| 1-194 | Ge | 4 | 4 | 0 | 0 | O | — | — | — | — | — |
| 1-195 | Ge | 4 | 4 | 0 | 1 | S | S | CH₂ | — | — | — |
| 1-196 | Ge | 4 | 4 | 0 | 1 | O | S | CH₂ | — | — | — |
| 1-197 | Ge | 4 | 4 | 0 | 1 | S | O | CH₂ | — | — | — |
| 1-198 | Ge | 4 | 4 | 0 | 1 | O | O | CH₂ | — | — | — |
| 1-199 | Ge | 4 | 4 | 0 | 1 | S | S | C₂H₄ | — | — | — |
| 1-200 | Ge | 4 | 4 | 0 | 1 | O | S | C₂H₄ | — | — | — |

TABLE 13

| CMPD. No. | M | n | p | n−p | m | X₁ | X₂ | R₁ | Y₁ | Y₂ | Y₃ |
|---|---|---|---|---|---|---|---|---|---|---|---|
| 1-201 | Ge | 4 | 4 | 0 | 1 | S | O | C₂H₄ | — | — | — |
| 1-202 | Ge | 4 | 4 | 0 | 1 | O | O | C₂H₄ | — | — | — |
| 1-203 | Ge | 4 | 4 | 0 | 1 | S | S | p-C₆H₄ | — | — | — |
| 1-204 | Ge | 4 | 4 | 0 | 1 | O | S | p-C₆H₄ | — | — | — |
| 1-205 | Ge | 4 | 4 | 0 | 1 | S | O | p-C₆H₄ | — | — | — |
| 1-206 | Ge | 4 | 4 | 0 | 1 | O | O | p-C₆H₄ | — | — | — |
| 1-207 | Ge | 4 | 4 | 0 | 1 | S | S | m-C₆H₄ | — | — | — |
| 1-208 | Ge | 4 | 4 | 0 | 1 | O | S | m-C₆H₄ | — | — | — |
| 1-209 | Ge | 4 | 4 | 0 | 1 | S | O | m-C₆H₄ | — | — | — |
| 1-210 | Ge | 4 | 4 | 0 | 1 | O | O | m-C₆H₄ | — | — | — |
| 1-211 | Ge | 4 | 4 | 0 | 1 | S | S | o-C₆H₄ | — | — | — |
| 1-212 | Ge | 4 | 4 | 0 | 1 | O | S | o-C₆H₄ | — | — | — |

TABLE 13-continued

| CMPD. No. | M | n | p | n−p | m | X₁ | X₂ | R₁ | Y₁ | Y₂ | Y₃ |
|---|---|---|---|---|---|---|---|---|---|---|---|
| 1-213 | Ge | 4 | 4 | 0 | 1 | S | O | 2,3-dimethylphenyl | — | — | — |
| 1-214 | Ge | 4 | 4 | 0 | 1 | O | O | 2,3-dimethylphenyl | — | — | — |

TABLE 14

| CMPD. No. | M | n | p | n−p | m | X₁ | X₂ | R₁ | Y₁ | Y₂ | Y₃ |
|---|---|---|---|---|---|---|---|---|---|---|---|
| 1-215 | Ge | 4 | 4 | 0 | 1 | S | S | —CH₂—(1,4-phenylene)—CH₂— | — | — | — |
| 1-216 | Ge | 4 | 4 | 0 | 1 | O | S | —CH₂—(1,4-phenylene)—CH₂— | — | — | — |
| 1-217 | Ge | 4 | 4 | 0 | 1 | S | O | —CH₂—(1,4-phenylene)—CH₂— | — | — | — |
| 1-218 | Ge | 4 | 4 | 0 | 1 | O | O | —CH₂—(1,4-phenylene)—CH₂— | — | — | — |
| 1-219 | Ge | 4 | 4 | 0 | 1 | S | S | —CH₂—(1,3-phenylene)—CH₂— | — | — | — |
| 1-220 | Ge | 4 | 4 | 0 | 1 | O | S | —CH₂—(1,3-phenylene)—CH₂— | — | — | — |
| 1-221 | Ge | 4 | 4 | 0 | 1 | S | O | —CH₂—(1,3-phenylene)—CH₂— | — | — | — |
| 1-222 | Ge | 4 | 4 | 0 | 1 | O | O | —CH₂—(1,3-phenylene)—CH₂— | — | — | — |
| 1-223 | Ge | 4 | 4 | 0 | 1 | S | S | —CH₂—(1,2-phenylene)—CH₂— | — | — | — |
| 1-224 | Ge | 4 | 4 | 0 | 1 | O | S | —CH₂—(1,2-phenylene)—CH₂— | — | — | — |

TABLE 14-continued

| CMPD. No. | M | n | p | n−p | m | X₁ | X₂ | R₁ | Y₁ | Y₂ | Y₃ |
|---|---|---|---|---|---|---|---|---|---|---|---|
| 1-225 | Ge | 4 | 4 | 0 | 1 | S | O | 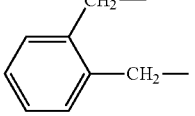 | — | — | — |
| 1-226 | Ge | 4 | 4 | 0 | 1 | O | O | 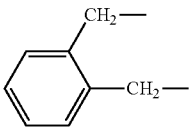 | — | — | — |
| 1-227 | Ge | 4 | 3 | 1 | 0 | S | — | — | CH₃ | — | — |
| 1-228 | Ge | 4 | 3 | 1 | 0 | O | — | — | CH₃ | — | — |

TABLE 15

| CMPD. No. | M | n | p | n−p | m | X₁ | X₂ | R₁ | Y₁ | Y₂ | Y₃ |
|---|---|---|---|---|---|---|---|---|---|---|---|
| 1-229 | Ge | 4 | 3 | 1 | 0 | S | — | — | $C_2H_5$ | — | — |
| 1-230 | Ge | 4 | 3 | 1 | 0 | O | — | — | $C_2H_5$ | — | — |
| 1-231 | Ge | 4 | 3 | 1 | 0 | S | — | — | $C_6H_5$ | — | — |
| 1-232 | Ge | 4 | 3 | 1 | 0 | O | — | — | $C_6H_5$ | — | — |
| 1-233 | Ge | 4 | 2 | 2 | 0 | S | — | — | $CH_3$ | $CH_3$ | — |
| 1-234 | Ge | 4 | 2 | 2 | 0 | O | — | — | $CH_3$ | $CH_3$ | — |
| 1-235 | Ge | 4 | 2 | 2 | 0 | S | — | — | $C_6H_5$ | $C_6H_5$ | — |
| 1-236 | Ge | 4 | 2 | 2 | 0 | O | — | — | $C_6H_5$ | $C_6H_5$ | — |
| 1-237 | Ge | 4 | 1 | 3 | 0 | S | — | — | $C_6H_5$ | $C_6H_5$ | $C_6H_5$ |
| 1-238 | Ge | 4 | 1 | 3 | 0 | O | — | — | $C_6H_5$ | $C_6H_5$ | $C_6H_5$ |
| 1-239 | Ge | 4 | 2 | 2 | 0 | S | — | — | — | $SC_2H_4S$ | — |
| 1-240 | Ge | 4 | 2 | 2 | 0 | O | — | — | — | $SC_2H_4S$ | — |
| 1-241 | Ge | 4 | 2 | 2 | 0 | S | — | — | — | $SC_3H_6S$ | — |
| 1-242 | Ge | 4 | 2 | 2 | 0 | O | — | — | — | $SC_3H_6S$ | — |
| 1-243 | Ge | 4 | 2 | 2 | 0 | S | — | — | — | $SC_2H_4SC_2H_4S$ | — |
| 1-244 | Ge | 4 | 2 | 2 | 0 | O | — | — | — | $SC_2H_4SC_2H_4S$ | — |
| 1-245 | Zn | 2 | 2 | 0 | 0 | S | — | — | — | — | — |
| 1-246 | Zn | 2 | 2 | 0 | 0 | O | — | — | — | — | — |
| 1-247 | Zr | 4 | 4 | 0 | 0 | S | — | — | — | — | — |
| 1-248 | Zr | 4 | 4 | 0 | 0 | O | — | — | — | — | — |
| 1-249 | Zr | 4 | 2 | 2 | 0 | S | — | — | CYCLOPENTADIENYL | CYCLOPENTADIENYL | — |
| 1-250 | Zr | 4 | 2 | 2 | 0 | O | — | — | CYCLOPENTADIENYL | CYCLOPENTADIENYL | — |
| 1-251 | Zr | 4 | 4 | 0 | 1 | S | S | $CH_2$ | — | — | — |

TABLE 16

| CMPD. No. | M | n | p | n−p | m | X₁ | X₂ | R₁ | Y₁ | Y₂ | Y₃ |
|---|---|---|---|---|---|---|---|---|---|---|---|
| 1-252 | Zr | 4 | 4 | 0 | 1 | O | S | $CH_2$ | — | — | — |
| 1-253 | Zr | 4 | 4 | 0 | 1 | S | O | $CH_2$ | — | — | — |
| 1-254 | Zr | 4 | 4 | 0 | 1 | O | O | $CH_2$ | — | — | — |
| 1-255 | Zr | 4 | 4 | 0 | 1 | S | S | $C_2H_4$ | — | — | — |
| 1-256 | Zr | 4 | 4 | 0 | 1 | O | S | $C_2H_4$ | — | — | — |
| 1-257 | Zr | 4 | 4 | 0 | 1 | S | O | $C_2H_4$ | — | — | — |
| 1-258 | Zr | 4 | 4 | 0 | 1 | O | O | $C_2H_4$ | — | — | — |
| 1-259 | Zr | 4 | 2 | 2 | 1 | S | S | $CH_2$ | CYCLOPENTADIENYL | CYCLOPENTADIENYL | — |
| 1-260 | Zr | 4 | 2 | 2 | 1 | O | S | $CH_2$ | CYCLOPENTADIENYL | CYCLOPENTADIENYL | — |
| 1-261 | Zr | 4 | 2 | 2 | 1 | S | O | $CH_2$ | CYCLOPENTADIENYL | CYCLOPENTADIENYL | — |
| 1-262 | Zr | 4 | 2 | 2 | 1 | O | O | $CH_2$ | CYCLOPENTADIENYL | CYCLOPENTADIENYL | — |
| 1-263 | Zr | 4 | 2 | 2 | 1 | S | S | $C_2H_4$ | CYCLOPENTADIENYL | CYCLOPENTADIENYL | — |
| 1-264 | Zr | 4 | 2 | 2 | 1 | O | S | $C_2H_4$ | CYCLOPENTADIENYL | CYCLOPENTADIENYL | — |
| 1-265 | Zr | 4 | 2 | 2 | 1 | S | O | $C_2H_4$ | CYCLOPENTADIENYL | CYCLOPENTADIENYL | — |
| 1-266 | Zr | 4 | 2 | 2 | 1 | O | O | $C_2H_4$ | CYCLOPENTADIENYL | CYCLOPENTADIENYL | — |
| 1-267 | Ti | 4 | 4 | 0 | 0 | S | — | — | — | — | — |
| 1-268 | Ti | 4 | 4 | 0 | 0 | O | — | — | — | — | — |
| 1-269 | Ti | 4 | 2 | 2 | 0 | S | — | — | CYCLOPENTADIENYL | CYCLOPENTADIENYL | — |
| 1-270 | Ti | 4 | 2 | 2 | 0 | O | — | — | CYCLOPENTADIENYL | CYCLOPENTADIENYL | — |

TABLE 16-continued

| CMPD. No. | M | n | n−p | m | $X_1$ | $X_2$ | $R_1$ | $Y_1$ | $Y_2$ | $Y_3$ |
|---|---|---|---|---|---|---|---|---|---|---|
| 1-271 | Ti | 4 | 4 | 0 | 1 | S | S | $CH_2$ | — | — | — |
| 1-272 | Ti | 4 | 4 | 0 | 1 | O | S | $CH_2$ | — | — | — |
| 1-273 | Ti | 4 | 4 | 0 | 1 | S | O | $CH_2$ | — | — | — |
| 1-274 | Ti | 4 | 4 | 0 | 1 | O | O | $CH_2$ | — | — | — |
| 1-275 | Ti | 4 | 4 | 0 | 1 | S | S | $C_2H_4$ | — | — | — |

TABLE 17

| CMPD. No. | M | n | n−p | m | $X_1$ | $X_2$ | $R_1$ | $Y_1$ | $Y_2$ | $Y_3$ |
|---|---|---|---|---|---|---|---|---|---|---|
| 1-276 | Ti | 4 | 4 | 0 | 1 | O | S | $C_2H_4$ | — | — | — |
| 1-277 | Ti | 4 | 4 | 0 | 1 | S | O | $C_2H_4$ | — | — | — |
| 1-278 | Ti | 4 | 4 | 0 | 1 | O | O | $C_2H_4$ | — | — | — |
| 1-279 | Ti | 4 | 2 | 2 | 1 | S | S | $CH_2$ | CYCLOPENTADIENYL | CYCLOPENTADIENYL | — |
| 1-280 | Ti | 4 | 2 | 2 | 1 | O | S | $CH_2$ | CYCLOPENTADIENYL | CYCLOPENTADIENYL | — |
| 1-281 | Ti | 4 | 2 | 2 | 1 | S | O | $CH_2$ | CYCLOPENTADIENYL | CYCLOPENTADIENYL | — |
| 1-282 | Ti | 4 | 2 | 2 | 1 | O | O | $CH_2$ | CYCLOPENTADIENYL | CYCLOPENTADIENYL | — |
| 1-283 | Ti | 4 | 2 | 2 | 1 | S | S | $C_2H_4$ | CYCLOPENTADIENYL | CYCLOPENTADIENYL | — |
| 1-284 | Ti | 4 | 2 | 2 | 1 | O | S | $C_2H_4$ | CYCLOPENTADIENYL | CYCLOPENTADIENYL | — |
| 1-285 | Ti | 4 | 2 | 2 | 1 | S | O | $C_2H_4$ | CYCLOPENTADIENYL | CYCLOPENTADIENYL | — |
| 1-286 | Ti | 4 | 2 | 2 | 1 | O | O | $C_2H_4$ | CYCLOPENTADIENYL | CYCLOPENTADIENYL | — |
| 1-287 | Pb | 4 | 4 | 0 | 0 | S | — | — | — | — | — |
| 1-288 | Pb | 4 | 4 | 0 | 0 | O | — | — | — | — | — |
| 1-289 | Al | 3 | 3 | 0 | 0 | S | — | — | — | — | — |
| 1-290 | Al | 3 | 3 | 0 | 0 | O | — | — | — | — | — |
| 1-291 | Al | 3 | 2 | 1 | 0 | S | — | — | $SCH_3$ | — | — |
| 1-292 | Al | 3 | 2 | 1 | 0 | O | — | — | $SCH_3$ | — | — |
| 1-293 | Al | 3 | 2 | 1 | 0 | S | — | — | $SC_2H_5$ | — | — |
| 1-294 | Al | 3 | 2 | 1 | 0 | O | — | — | $SC_2H_5$ | — | — |
| 1-295 | Al | 3 | 2 | 1 | 0 | S | — | — | $SC_6H_5$ | — | — |
| 1-296 | Al | 3 | 2 | 1 | 0 | O | — | — | $SC_6H_5$ | — | — |
| 1-297 | Al | 3 | 1 | 2 | 0 | S | — | — | $SC_2H_4S$ | — | — |
| 1-298 | Al | 3 | 1 | 2 | 0 | O | — | — | $SC_2H_4S$ | — | — |
| 1-299 | Al | 3 | 1 | 2 | 0 | S | — | — | $SC_2H_4SC_2H_4S$ | — | — |
| 1-300 | Al | 3 | 1 | 2 | 0 | O | — | — | $SC_2H_4SC_2H_4S$ | — | — |

Furthermore, specific examples of the compound represented by General Formula (1) include the compounds shown in the following Table 18. The compounds in Table 18 are all the compounds represented by General Formula (5).

TABLE 18

| CMPD. No. | M | n | n−p | m | $X_1$ | $X_2$ | $R_1$ | $Y_1$ | $Y_2$ | $Y_3$ |
|---|---|---|---|---|---|---|---|---|---|---|
| 1-301 | Sn | 4 | 3 | 1 | 0 | S | — | — | $S-C_3H_7$ | — | — |
| 1-302 | Sn | 4 | 3 | 1 | 0 | S | — | — | $S-(iso-C_3H_7)$ | — | — |
| 1-303 | Sn | 4 | 2 | 2 | 0 | S | — | — | $SCH_3$ | $SCH_3$ | — |
| 1-304 | Sn | 4 | 2 | 2 | 0 | S | — | — | $SC_2H_5$ | $SC_2H_5$ | — |
| 1-305 | Sn | 4 | 2 | 2 | 0 | S | — | — | $S—C_3H_7$ | $S—C_3H_7$ | — |
| 1-306 | Sn | 4 | 2 | 2 | 0 | S | — | — | $S-(iso-C_3H_7)$ | $S-(iso-C_3H_7)$ | — |
| 1-307 | Sn | 4 | 2 | 2 | 0 | S | — | — | $SCH_3$ | $SC_2H_5$ | — |
| 1-308 | Sn | 4 | 2 | 2 | 0 | S | — | — | $SCH_3$ | $S—C_3H_7$ | — |
| 1-309 | Sn | 4 | 2 | 2 | 0 | S | — | — | $SCH_3$ | $S-(iso-C_3H_7)$ | — |
| 1-310 | Sn | 4 | 2 | 2 | 0 | S | — | — | $SC_2H_5$ | $S—C_3H_7$ | — |
| 1-311 | Sn | 4 | 2 | 2 | 0 | S | — | — | $SC_2H_5$ | $S-(iso-C_3H_7)$ | — |
| 1-312 | Sn | 4 | 2 | 2 | 0 | S | — | — | $S-C_3H_7$ | $S-(iso-C_3H_7)$ | — |
| 1-313 | Sn | 4 | 2 | 2 | 0 | S | — | — | $SCH_2S$ | — | — |

Among the compounds shown in Tables 1 to 18, specifically, the compound represented by General Formula (1) wherein m is 0 is used.

Furthermore, more specifically, the compound wherein m is 0, and $X_1$ is a sulfur atom is used. As such the compound, for example, there are compounds of CMPD. Nos. 1-1, 1-35, 1-37, 1-39, 1-41, 1-43, 1-45, 1-47, 1-49, 1-51, 1-53, 1-55, 1-57, 1-59, 1-61, 1-63, 1-65, 1-67, 1-69, 1-71, 1-73, 1-75, 1-141, 1-175, 1-177, 1-179, 1-181, 1-183, 1-185, 1-187, 1-189, 1-191, 1-193, 1-227, 1-229, 1-231, 1-233, 1-235, 1-237, 1-239, 1-241, 1-243, 1-245, 1-247, 1-249, 1-267, 1-269, 1-287, 1-289, 1-291, 1-293, 1-295, 1-297, 1-299, and 1-301 through 1-313 among the compounds shown in Tables 1 to 18.

Furthermore, preferred examples of the compounds shown in Tables 1 to 18 include the compounds of General Formula (1) with n=p, more preferably, the compounds of General Formula (1), wherein n=p, m=0, and $X_1$ is a sulfur atom. As such the compounds, for example, there are compounds of CMPD. Nos. 1-1, 1-141, 1-193, 1-245, 1-247, 1-267, 1-287, and 1-289 among the compounds shown in Tables 1 to 17. Furthermore, among these, more preferred are those in which the metal atom M is any element selected from Groups 4, 12, 13, 14 and 15 elements in a long form of the Periodic Table, and even more preferred are those in which the metal atom M is a Sn atom.

Furthermore, other preferred examples among the compounds shown in Tables 1 to 18 include the compound represented by General Formula (5). As such the compounds, there are compounds of CMPD. Nos. 1-65, 67, 71 and 73 among the compounds shown in Table 4, and compounds of CMPD. Nos. 1-301 through 1-313 among the compounds shown in Table 18.

Furthermore, examples of the compound of General Formula (1) wherein n–p is 2 or greater, that is, the compound represented by General Formula (1), containing 2 or more Y's in the molecule further include the compounds represented by the following Formula. In the following compound, three Y's are different groups from each other.

[Chemical Formula 7]

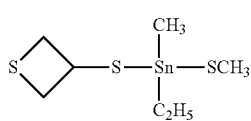

Next, the method for preparing the compound represented by General Formula (1) will be described.

The compound represented by General Formula (1) is typically prepared by reaction of a halide of the metal atom M represented by the following General Formula (2) with a thiol compound or hydroxy compound having a thietane group represented by the following General Formula (3).

[Chemical Formula 8]

 (2)

(in General Formula (2), M, n, p, and Y are each the same as M, n, p, and Y, respectively, in General Formula (1), and Z represents a halogen atom).

[Chemical Formula 9]

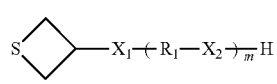 (3)

(in General Formula (3), $X_1$, $X_2$, $R_1$, and m are each the same as $X_1$, $X_2$, $R_1$ and m, respectively, in General Formula (1)).

Furthermore, the compound represented by General Formula (5) can be also prepared in accordance with the method for preparing the compound represented by General Formula (1).

For example, the compound is prepared by reaction of a halide represented by the following General Formula (6) with a thiol compound or hydroxy compound having a thietane group represented by General Formula (3).

[Chemical Formula 10]

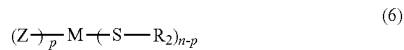 (6)

(in General Formula (6), M, p, n, and $R_2$ are each the same as M, p, n, and $R_2$ r, respectively, in General Formula (5), and Z represents a halogen atom).

Furthermore, the compound is prepared by reacting the halide represented by the following General Formula (6) with n=p, with the thiol compound or hydroxy compound having a thietane group represented by General Formula (3), and at the same time with the thiol compound represented by the following Chemical Formula (7).

 (7)

(in General Formula (7), $R_2$ is the same as $R_2$ in General Formula (5)).

Furthermore, the compound is also prepared by reaction of the compound, which has been obtained by preliminary reaction of the halide represented by the following General Formula (6) with n=p, with the thiol compound or hydroxy compound having a thietane group represented by General Formula (3), with a thiol compound represented by General Formula (7).

The compounds represented by General Formulae (2), (6), and (7) are available as raw materials in the industry, or as laboratory reagents.

Furthermore, the compound represented by General Formula (3) is a known compound, and prepared, for example, in accordance with the method as described in Patent Document 3 (Japanese Patent Laid-Open No. 2003-327583).

The reaction of the halide of the metal atom M represented by General Formula (2) with the thiol compound or hydroxy compound having a thietane group represented by General Formula (3) may be carried out without or with a solvent, which is inert to the reaction.

The solvents are not particularly limited as long as they are inert to the reaction. Examples thereof include hydrocarbon solvents such as petroleum ether, hexane, benzene, toluene, xylene, and mesitylene;

ether solvents such as diethyl ether, tetrahydrofuran, and diethylene glycol dimethyl ether;

ketone solvents such as acetone, methyl ethyl ketone, and methyl isobutyl ketone;

ester solvents such as ethyl acetate, butyl acetate, and amyl acetate;

chlorine-containing solvents such as methylene chloride, chloroform, chlorobenzene, and dichlorobenzene;

polar aprotic solvents such as N,N-dimethylformamide, N,N-dimethylacetamide, N,N-dimethylimidazolidinone, and dimethyl sulfoxide;

sulfur-containing solvents such as tetrahydrothiophene, thiophene, sulfolane, trimethylenesulfide, diethylsulfide, di-n-propylsulfide, di-t-butylsulfide, 3-mercaptothiethane, and bis(2-mercaptoethyl)sulfide; and water.

The reaction temperature for the compounds represented by General Formulae (2) and (3) is not particularly limited, but it is usually in the range of −78° C. to 200° C., preferably from −78° C. to 100° C.

The reaction time varies depending on the reaction temperature, but it is usually from several minutes to 100 hours.

For the reaction of the compounds represented by above General Formulae (2) and (3), the use amount of the compound represented by General Formula (2) and the compound represented by General Formula (3) is not particularly limited, but the amount of the compound represented by General Formula (3) is usually from 0.01 to 100 mole, preferably from 0.1 to 50 moles, more preferably from 0.5 to 20 moles, based on 1 mole of the halogen atom contained in the compound represented by General Formula (2).

When carrying out the reaction with the compounds represented by General Formulae (2) and (3), it is preferable to use a basic compound as a capturing agent of the produced hydrogen halide for effectively carrying out the reaction.

Examples of the basic compound include inorganic bases such as sodium hydroxide, potassium hydroxide, lithium hydroxide, sodium carbonate, potassium carbonate, lithium carbonate, sodium bicarbonate, potassium bicarbonate, lithium bicarbonate, magnesium hydroxide, and calcium hydroxide; and organic bases such as pyridine, triethylamine, dimethylaniline, diethylaniline, and 1,8-diazabicyclo[5,4,0]-7-undecene.

Next, specific examples of the thiol compound will be described.

As used in the present invention, the thiol compound refers a compound containing one or more thiol groups (SH groups) in the molecule. As the thiol compound, for example, the compounds having any structure that is compatible with the compound represented by General Formula (1) can be used.

As the thiol compounds, examples of a monofunctional thiol compound include aliphatic mercaptan compounds such as methyl mercaptan, ethyl mercaptan, propyl mercaptan, butyl mercaptan, octyl mercaptan, dodecyl mercaptan, tert-dodecyl mercaptan, hexadecyl mercaptan, octadecyl mercaptan, cyclohexyl mercaptan, benzyl mercaptan, ethylphenyl mercaptan, 2-mercaptomethyl-1,3-dithiolane, 2-mercaptomethyl-1,4-dithiane, 1-mercapto-2,3-epithiopropane, 1-mercaptomethylthio-2,3-epithiopropane, 1-mercaptoethylthio-2,3-epithiopropane, 3-mercaptothietane, 2-mercaptothietane, 3-mercaptomethylthiothietane, 2-mercaptomethylthiothietane, 3-mercaptoethylthiothietane, and 2-mercaptoethylthiothietane; aromatic mercaptan compounds such as thiophenol, and mercaptotoluene; and compounds each containing a hydroxyl group in addition to a mercapto group, such as 2-mercaptoethanol, and 3-mercapto-1,2-propanediol.

Furthermore, examples of polyfunctional thiol(polythiol) compounds include aliphatic polythiol compounds such as 1,1-methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxy butane-1,2-dithiol, 2-methylcyclohexane-2,3-dithiol, 1,1-bis(mercaptomethyl)cyclohexane, thiomalic acid bis(2-mercaptoethylester), 2,3-dimercapto-1-propanol(2-mercaptoacetate), 2,3-dimercapto-1-propanol(3-mercaptopropionate), diethyleneglycol bis(2-mercaptoacetate), diethyleneglycol bis(3-mercaptopropionate), 1,2-dimercaptopropylmethylether, 2,3-dimercaptopropylmethylether, 2,2-bis(mercaptomethyl)-1,3-propanedithiol, bis(2-mercaptoethyl)ether, ethyleneglycol bis(2-mercaptoacetate), ethyleneglycol bis(3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), tetrakis(mercaptomethyl)methane, and 1,1,1,1-tetrakis(mercaptomethyl)methane;

aromatic polythiol compounds, such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenyl propane-2,2-dithiol, phenylmethane-1,1-dithiol, and 2,4-di(p-mercaptophenyl)pentane;

aromatic polythiol compounds each containing a sulfur atom in addition to a mercapto group, such as 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, and 1,3,5-tris(mercaptoethylthio)benzene, and nuclear alkylated products thereof;

aliphatic polythiol compounds each containing a sulfur group in addition to a mercapto group, such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, 1,2-bis[(2-mercaptoethyl)thio]-3-mercaptopropane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, bis(1,3-dimercaptopropyl)sulfide, 2,5-dimercapto-1,4-dithiane, 2,5-bis(mercaptomethyl)-1,4-dithiane, 2,5-dimercaptomethyl-2,5-dimethyl-1,4-dithiane, bis(mercaptomethyl)disulfide, bis(mercaptoethyl)disulfide, bis(mercaptopropyl)disulfide, and 4-mercaptomethyl-1,8-dimercapto-3,6-dithiaoctane, and an ester thereof with thioglycolic acid and mercaptopropionic acid;

aliphatic polythiol compounds each containing an ester bond with a sulfur group in addition to a mercapto group, such as hydroxymethylsulfidebis(2-mercaptoacetate), hydroxymethylsulfide bis(3-mercaptopropionate), hydroxyethylsulfide bis(2-mercaptoacetate), hydroxyethylsulfidebis(3-mercaptopropionate), hydroxypropylsulfidebis(2-mercaptoacetate), hydroxypropylsulfidebis(3-mercaptopropionate), hydroxymethyldisulfidebis(2-mercaptoacetate), hydroxymethyldisulfidebis(3-mercaptopropionate), hydroxyethyldisulfidebis(2-mercaptoacetate), hydroxyethyldisulfidebis(3-mercaptopropionate), hydroxypropyldisulfidebis(2-mercaptoacetate), hydroxypropyldisulfidebis(3-mercaptopropionate), 2-mercaptoethylether bis(2-mercaptoacetate), 2-mercaptoethylether bis(3-mercaptopropionate), 1,4-dithiane-2,5-diol bis(2- mercaptoacetate), 1,4-dithiane-2,5-diol bis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropylester), thiodipropionic acid bis(2,3-dimercaptopropylester), dithioglycolic acid bis(2,3-dimercaptopropylester), and dithiodipropionic acid bis(2,3-dimercaptopropylester);

heterocyclic compounds each containing a sulfur atom in addition to a mercapto group, such as 3,4-thiophenedithiol, and 2,5-dimercapto-1,3,4-thiadiazole;

compounds each containing hydroxyl group in addition to a mercapto group, such as glycerin di(mercaptoacetate), 1-hydroxy-4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1-propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritoltris(thioglycolate), dipentaerythritolpentakis(3-mercaptopropionate), hydroxymethyltris(mercaptoethylthiomethyl)methane, and 1-hydroxy ethylthio-3-mercaptoethylthio benzene;

compounds each having a dithioaectal or dithioketal skeleton, such as 1,1,3,3-tetrakis(mercaptomethylthio)propane, 1,1,2,2-tetrakis(mercaptomethylthio)ethane, 4,6-bis(mercaptomethylthio)-1,3-dithiacyclohexane, 1,1,5,5-tetrakis(mercaptomethylthio)-3-thiapentane, 1,1,6,6-tetrakis(mercaptomethylthio)-3,4-dithiahexane, 2,2-bis(mercaptomethylthio)ethane thiol, 2-(4,5-dimercapto-2-thiapentyl)-1,3-dithiacyclopentane, 2,2-bis(mercaptomethyl)-1,3-dithiacyclopentane, 2,5-bis(4,4-bis(mercaptomethylthio)-2-thiabutyl)-1,4-dithiane, 2,2-bis(mercaptomethylthio)-1,3-propanedithiol, 3-mercaptomethylthio-1,7-dimercapto-2,6-dithiaheptane, 3,6-bis(mercaptomethylthio)-1,9-dimercapto-2,5,8-trithianonane, 4,6-bis(mercaptomethylthio)-1,9-dimercapto-2,5,8-trithianonane, 3-mercaptomethylthio-1,6-dimercapto-2,5-dithiahexane, 2-(2,2-bis(mercaptomethylthio)ethyl)-1,3-dithietane, 1,1,9,9-tetrakis(mercaptomethylthio)-5-(3,3-bis(mercaptomethylthio)-1-thiapropyl) 3,7-dithianonane, tris(2,2-bis(mercaptomethylthio)ethyl)methane, tris(4,4-bis(mercaptomethylthio)-2-thiabutyl)methane, tetrakis(2,2-bis(mercaptomethylthio)ethyl)methane, tetrakis(4,4-bis(mercaptomethylthio)-2-thiabutyl)methane, 3,5,9,11-tetrakis(mercaptomethylthio)-1,13-dimercapto-2,6,8,12-tetrathiamidecane, 3,5,9,11,15,17-hexakis(mercaptomethylthio)-1,19-dimercapto-2,6,8,12,14,18-hexathianonadecane, 9-(2,2-bis(mercaptomethylthio)ethyl)-3,5,13,15-tetrakis(mercapto methylthio)-1,17-dimercapto-2,6,8,10,12,16-hexathiaheptadecane, 3,4,8,9-tetrakis(mercaptomethylthio)-1,11-dimercapto-2,5,7,10-tetrathiaundecane, 3,4,8,9,13,14-hexakis(mercaptomethylthio)-1,16-dimercapto-2,5,7,10,12,15-hexathiahexadecane, 8-{bis(mercaptomethylthio)methyl}-3,4,12,13-tetrakis(mercaptomethylthio)-1,15-dimercapto-2,5,7,9,11,14-hexathiapentadecane, 4,6-bis{3,5-bis(mercaptomethylthio)-7-mercapto-2,6-dithiaheptylthio}-1,3-dithiane, 4-{3,5-bis(mercaptomethylthio)-7-mercapto-2,6-dithiaheptylthio}-6-mercaptomethylthio-1,3-dithiane, 1,1-bis{4-(6-mercaptomethylthio)-1,3-dithianylthio}-3,3-bis(mercaptomethylthio)propane, 1,3-bis{4-(6-mercaptomethylthio)-1,3-dithianylthio}-1,3-bis(mercaptomethylthio)propane, 1-{4-(6-mercaptomethylthio)-1,3-dithianylthio}-3-{2,2-bis(mercaptomethylthio)ethyl}-7,9-bis(mercaptomethylthio)-2,4,6,10-tetrathiaundecane, 1-{4-(6-mercaptomethylthio)-1,3-dithianylthio}-3-{2-(1,3-dithietanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-dithietanyl)}methyl-2,4-dithiapentane, 4,6-bis[3-{2-(1,3-dithietanyl)}methyl-5-mercapto-2,4-dithiapentylthio]-1,3-dithiane, 4,6-bis{4-(6-mercaptomethylthio)-1,3-dithianylthio}-1,3-dithiane, 4-{4-(6-mercaptomethylthio)-1,3-dithianylthio}-6-{4-(6-mercaptomethylthio)-1,3-dithianylthio}-1,3-dithiane, 3-{2-(1,3-dithietanyl)}methyl-7,9-bis(mercaptomethylthio)-1,11-dimercapto-2,4,6,10-tetrathiaundecane, 9-{2-(1,3-dithietanyl)}methyl-3,5,13,15-tetrakis(mercaptomethylthio)-1,17-dimercapto-2,6,8,10,12,16-hexathiaheptadecane, 3-{2-(1,3-dithietanyl)}methyl-7,9,13,15-tetrakis(mercaptomethylthio)-1,17-dimercapto-2,4,6,10,12,16-hexathiaheptadecane, 3,7-bis{2-(1,3-dithietanyl)}methyl-1,9-dimercapto-2,4,6,8-tetrathianonane, 4-{3,4,8,9-tetrakis(mercaptomethylthio)-11-mercapto-2,5,7,10-tetrathiaundecyl}-5-mercaptomethylthio-1,3-dithiolane, 4,5-bis{3,4-bis(mercaptomethylthio)-6-mercapto-2,5-dithiahexylthio}-1,3-dithiolane, 4-{3,4-bis(mercaptomethylthio)-6-mercapto-2,5-dithiahexylthio}-5-mercaptomethylthio-1,3-dithiolane, 4-{3-bis(mercaptomethylthio)methyl-5,6-bis(mercaptomethylthio)-8-mercapto-2,4,7-trithiaoctyl}-5-mercaptomethylthio-1,3-dithiolane, 2-[bis{3,4-bis(mercaptomethylthio)-6-mercapto-2,5-dithiahexylthio}methyl]-1,3-dithietane, 2-{3,4-bis(mercaptomethylthio)-6-mercapto-2,5-dithiahexylthio}mercaptomethylthiomethyl-1,3-dithietane, 2-{3,4,8,9-tetrakis(mercaptomethylthio)-11-mercapto-2,5,7,10-tetrathiaundecylthio}mercaptomethylthiomethyl-1,3-dithietane, 2-{3-bis(mercaptomethylthio)methyl-5,6-bis(mercaptomethylthio)-8-mercapto-2,4,7-trithiaoctyl}mercaptomethylthiomethyl-1,3-dithietane, 4,5-bis[1-{2-(1,3-dithietanyl)}-3-mercapto-2-thiapropylthio]-1,3-dithiolane, 4-[1-{2-(1,3-dithietanyl)}-3-mercapto-2-thiapropylthio]-5-{1,2-bis(mercaptomethylthio)-4-mercapto-3-thiabutylthio}-1,3-dithiolane, 2-[bis{4-(5-mercaptomethylthio-1,3-dithiolanyl)thio}]methyl-1,3-dithietane, and 4-{4-(5-mercaptomethylthio-1,3-dithiolanyl)thio}-5-[1-{2-(1,3-dithietanyl)}-3-mercapto-2-thiapropylthio]-1,3-dithiolane, and an oligomer thereof;

compounds each having an orthotrithio formic acid ester skeleton, such as tris(mercaptomethylthio)methane, tris(mercaptoethylthio)methane, 1,1,5,5-tetrakis(mercaptomethylthio)-2,4-dithiapentane, bis[4,4-bis(mercaptomethylthio)-1,3-dithiabutyl](mercaptomethylthio)methane, tris[4,4-bis(mercaptomethylthio)-1,3-dithiabutyl]methane, 2,4,6-tris(mercaptomethylthio)-1,3,5-trithiacyclohexane, 2,4-bis(mercaptomethylthio)-1,3,5-trithiacyclohexane, 1,1,3,3-tetrakis(mercaptomethylthio)-2-thiapropane, bis(mercaptomethyl)methylthio-1,3,5-trithiacyclohexane, tris[(4-mercaptomethyl-2,5-dithiacyclohexyl 1-yl)methylthio]methane, 2,4-bis(mercaptomethylthio)-1,3-dithiacyclopentane, 2-mercaptoethylthio-4-mercaptomethyl-1,3-dithiacyclopentane, 2-(2,3-dimercaptopropylthio)-1,3-dithiacyclopentane, 4-mercaptomethyl-2-(2,3-dimercaptopropylthio)-1,3-dithiacyclopentane, 4-mercaptomethyl-2-(1,3-dimercapto-2-propylthio)-1,3-dithiacyclopentane, tris[2,2-bis(mercaptomethylthio)-1-thia ethyl]methane, tris[3,3-bis(mercaptomethylthio)-2-thiapropyl]methane, tris[4,4-bis(mercaptomethylthio)-3-thia butyl]methane, 2,4,6-tris[3,3-bis(mercaptomethylthio)-2-thiapropyl]-1,3,5- trithiacyclohexane, and tetrakis[3,3-bis(mercaptomethylthio)-2-thiapropyl]methane, and an oligomer thereof; and compounds each having an orthotetrathiocarbonic acid ester skeleton, such as 3,3'-di(mercaptomethylthio)-1,5-dimercapto-2,4-dithiapentane, 2,2'-di(mercaptomethylthio)-1,3-dithiacyclopentane, 2,7-di(mercaptomethyl)-1,4,5,9-tetrathiaspiro[4,4]nonane, 3,9-dimercapto-1,5,7,11-tetrathiaspiro[5,5]undecane, and an oligomer thereof, but not limited to these exemplary compounds. These exemplary compounds are used alone, or in a mixture of two or more kinds thereof.

Among these thiol compounds, from the viewpoint of the optical properties, in particular Abbe's numbers, of the obtained resin, aliphatic thiol compounds are preferably selected rather than aromatic thiol compounds. Further, from the viewpoint of optical properties, in particular, requirements in refractive indices, a compound containing a sulfur atom, such as a sulfide bond and/or a disulfide bond, in addition to a thiol group is more preferably selected. From the viewpoint of heat resistance of the obtained resin, and improvement in a 3-dimensional crosslinkability, at least one selected from the compounds each having a polymerizable group such as an epithio group and a thietanyl group, or three or more thiol groups is more preferably selected.

From the above-described viewpoints, examples of preferable thiols include 3-mercaptothietane, 1-mercapto-2,3-epithiopropane, 1-mercaptomethylthio-2,3-epithiopropane, 1-mercaptoethylthio-2,3-epithiopropane, 3-mercaptothietane, 2-mercaptothietane, 3-mercaptomethylthiothietane, 2-mercaptomethylthiothietane, 3-mercaptoethylthiothietane, 2-mercaptoethylthiothietane, 2,5-bis(mercaptomethyl)-1,4-dithiane, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptomethylthio)ethyl)-1,3-dithietane.

More preferred examples of thiols include 3-mercaptothietane, 4-mercaptomethyl-1,8-dimercapto-3,6-dithiaoctane, 2,5-bis(mercaptomethyl)-1,4-dithiane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1,1-tetrakis(mercaptomethyl)methane, 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptomethylthio)ethyl)-1,3-dithietane. Furthermore, if a divalent thiol compound is selected, it is preferable to use a mixture of a thiol compound containing a polymerizable group and/or a trivalent or higher thiol compound.

More specifically, the thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane.

Furthermore, preferable combinations of the thiol compound and the compound represented by General Formula (1) include, for example, the followings.

(i) A combination in which the compound represented by General Formula (1) is the compound represented by General Formula (13), and further, the thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

(ii) a combination in which, for the compound represented by General Formula (1), n=p, m=0, and $X_1$ is a sulfur atom, and further, the thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane; and (iii) a combination in which, for the compound represented by General Formula (1), said metal atom is a Sn atom, and further, the thiol compound is at least one selected from the group consisting of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane.

As for the amount of the thiol compound used, based on 100 parts by weight of the total weight of the compound represented by General Formula (1) and the thiol compound, if the amount of the thiol compound used is too low, improvement in color and mechanical strength is unfavorably reduced in some cases. Furthermore, if the amount of the thiol compound used is too high, based on 100 parts by weight of the total weight of the compound represented by General Formula (1) and the thiol compound, reduction in the heat resistance is unfavorably significant, in some cases.

Thus, it is preferable that the thiol compound is used in an amount of 1 to 50 part(s) by weight based on 100 parts by weight of the total weight of the compound represented by General Formula (1) and the thiol compound. It is further more preferable that the thiol compound is used in an amount of 1 to 25 part(s) by weight based on 100 parts by weight of the total weight of the compound represented by General Formula (1) and the thiol compound.

Since the polymerizable composition of the present invention contains the compound represented by General Formula (1) and the thiol compound, the obtained resin can have improved mechanical properties and color, for example.

Furthermore, as the polymerizable composition of the present invention, the compound represented by General Formula (1) may be used singly, or a plurality of the different compounds represented by General Formula (1) may be used together.

Furthermore, the polymerizable composition of the present invention contains the compound represented by General Formula (1) and the thiol compound as essential components, and further, it may contain sulfur as a monomer. Further addition of sulfur as a monomer to the polymerizable composition composed of the compound represented by General Formula (1) and the thiol compound is one preferable embodiment that facilitates further high refractive indices. Here, if necessary, a polymerization catalyst can be further contained. Furthermore, the compound may be represented by General Formula (1), wherein m=0, and $X_1$ is a sulfur atom.

Sulfur as a monomer, used in the polymerizable composition according to the invention, refers to inorganic sulfur, and if used for the resin composition in the present invention or a transparent resin employing the composition, the purity is preferably 98% or more, more preferably 99% or more, and even more preferably 99.5% or more. In order to increase the purity, a method for removing volatile components is preferably used in some cases.

Furthermore, the form of sulfur as a monomer is in any form, for example, that can be dissolved in the compound represented by General Formula (1), and preferably in the form of powders, and more preferably in the form of fine powders.

In the present invention, if the polymerizable composition containing the compound represented by General Formula (1) and the thiol compound is used, for example, to provide a resin having a higher refractive index, sulfur as a monomer may be added to the polymerizable composition.

As for the amount of sulfur added to the polymerizable composition, from the viewpoint of a high refractive index, based on 100 parts by weight of the total weight of the compound represented by General Formula (1), the thiol compound, and sulfur, if the amount of sulfur added as a monomer is too low, the effect of improvement in the refractive indices is unfavorably low in some cases. Furthermore, if the amount of sulfur added as a monomer is too high based on 100 parts by weight of the total weight of the compound represented by General Formula (1), the thiol compound, and sulfur, fogging unfavorably occurs in some cases.

Thus, from the viewpoint as above, the amount of sulfur added as a monomer, based on 100 parts by weight of the total weight of the compound represented by General Formula (1), the thiol compound, and sulfur, is preferably 5 to 50 parts by weight. The amount of sulfur added as a monomer, based on 100 parts by weight of the total weight of the compound represented by General Formula (1), is more preferably 5 to 25 parts by weight.

One of preferable methods for mixing the compound represented by General Formula (1) of the present invention and sulfur as a monomer is, for example, a method in which sulfur as a monomer is added to a mixture of the compound represented by General Formula (1) and the thiol compound, and then dissolved under stirring, and if necessary, the temperature is increased. Furthermore, the method as described below, for example, in which sulfur as a monomer is added to other polymerizable compounds or polymerization catalysts, and then dissolved; simultaneously mixed under stirring in one vessel; stepwise added, and mixed; or some components are separately added and then mixed together in the same vessel.

The polymerizable composition of the present invention includes the compound represented by General Formula (1), the thiol compound, and the compound having a carbon-carbon double bond, and if necessary, a polymerization catalyst. Furthermore, the compound may be represented by General Formula (1), wherein m=0, and $X_1$ is a sulfur atom.

The compound having a carbon-carbon double bond used in the present invention is a compound containing one or more carbon-carbon double bonds in the molecule. The compound having a carbon-carbon double bond can be, for example, a compound having any structure that is compatible with the compound represented by General Formula (1), and it is preferably a compound having two or more carbon-carbon double bonds.

Specific examples of the compound having a carbon-carbon double bond include (meth)acrylate compounds such as benzyl acrylate, benzyl methacrylate, butoxy ethyl acrylate, butoxymethyl methacrylate, cyclohexyl acrylate, cyclohexyl methacrylate, 2-hydroxyethyl acrylate, 2-hydroxymethyl methacrylate, glycidyl acrylate, glycidyl methacrylate, phenoxyethyl acrylate, phenoxyethyl methacrylate, phenyl methacrylate, ethyleneglycol diacrylate, ethyleneglycol dimethacrylate, diethyleneglycol diacrylate, diethyleneglycol dimethacrylate, triethyleneglycol diacrylate, triethyleneglycoldimethacrylate, tetraethyleneglycol diacrylate, tetraethyleneglycoldimethacrylate, polyethyleneglycol diacrylate, polyethyleneglycoldimethacrylate, neopentyl glycol diacrylate, neopentylglycol dimethacrylate, ethyleneglycol bisglycidylacrylate, ethyleneglycol bisglycidylmethacrylate, bisphenol A diacrylate, bisphenol A dimethacrylate, 2,2-bis(4-acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, bisphenol F diacrylate, bisphenol F dimethacrylate, 1,1-bis(4-acryloxyethoxyphenyl)methane, 1,1-bis(4-methacryloxyethoxyphenyl)methane, 1,1-bis(4-acryloxydiethoxyphenyl)methane, 1,1-bis(4-methacryloxydiethoxyphenyl)methane, dimethyloltricyclodecane diacrylate, trimethylolpropane triacrylate, trimethylolpropane trimethacrylate, glycerol diacrylate, glycerol dimethacrylate, pentaerythritol triacrylate, pentaerythritol tetraacrylate, pentaerythritol tetramethacrylate, methylthioacrylate, methylthiomethacrylate, phenylthioacrylate, benzylthiomethacrylate, xylenedithiol diacrylate, xylenedithiol dimethacrylate, mercaptoethyl sulfide diacrylate, and mercaptoethylsulfide dimethacrylate;

allyl compounds such as allyl glycidyl ether, diallyl phthalate, diallyl terephthalate, diallyl isophthalate, diallyl carbonate, diethyleneglycol-bisallyl carbonate, and triallyl isocyanurate;

vinyl compounds such as styrene, chlorostyrene, methylstyrene, bromostyrene, dibromostyrene, divinylbenzene, 3,9-divinyl-spiro-bi(m-dioxane), divinylsulfide, and divinyldisulfide;

diisopropenylbenzene; and the like, but not limited to these exemplary compounds. Further, these may be used alone or in combination of two or more thereof. As the compound having a carbon-carbon double bond, triallyl isocyanurate may be preferably used.

The amount of the compound having a carbon-carbon double bond added depends on the structure of the compound used and the structure or amount of the thiol compound used, but it is preferably 25% by weight or less based on the total amount of the polymerizable composition, from the viewpoint of the refractive index of the obtained resin. It is more preferably 23% by weight or less, and even more preferably 20% by weight or less. From the viewpoint of the color of the obtained resin, it is preferably 2.5% by weight or more.

Furthermore, as for the ratio of the thiol compound used and the compound having a carbon-carbon double bond used, the ratio of the functional groups (that is, SH groups/carbon-carbon double bonds) that is the ratio of the thiol groups in the thiol compound and the carbon-carbon double bonds in the compound having a carbon-carbon double bond is preferably 0.7 or more from the viewpoint of the color of the resin. It is more preferably from 0.9 to 5, and even more preferably from 0.9 to 3. If the ratio of the functional groups is too low, the obtained resin unfavorably has reduction in transparency in some cases, whereas if the ratio is too high, the obtained resin unfavorably has reduction in heat resistance in some cases.

If the polymerizable composition further includes the compound having a carbon-carbon double bond, the content of the compound represented by General Formula (1) in the total weight of the polymerizable compounds contained in the polymerizable composition of the present invention is not particularly limited, but it is usually 10% by weight or more.

As the content of the compound represented by General Formula (1) is increased, there is a tendency that materials having higher refractive indices are obtained. Thus, the content is preferably 30% by weight or more, more preferably 50% by weight or more, and even more preferably 70% by weight or more.

However, if the content of the compound represented by General Formula (1) is too high, it relatively reduces the content of the thiol compound and the compound having a carbon-carbon double bond. From the viewpoint of improving the color of the resin and suppressing the reduction in mechanical strength, the content of the compound represented by General Formula (1) in the polymerizable composition is preferably 95% by weight or less.

Furthermore, if the polymerizable composition further includes the compound having a carbon-carbon double bond, the amount of the thiol compound used depends on the structure of the compound used and the structure or amount of the compound having a carbon-carbon double bond. However, since the compound represented by General Formula (1) provides a resin having a high refractive index, generally addition of a thiol compound leads to reduction in the refractive index of the obtained resin. Thus, from the viewpoint of the refractive index of the obtained resin, it is contained in an amount of preferably 35% by weight or less based on the total amount of the polymerizable composition of the present invention, more preferably 30% by weight or less, and even more preferably 25% by weight or less. From the viewpoint of the color of the obtained resin, the amount is preferably 2.5% by weight or more.

The polymerizable composition of the present invention includes the compound represented by General Formula (1), the thiol compound, and a compound including an iso(thio) cyanate compound, and if necessary, a polymerization catalyst. Furthermore, the compound may be represented by General Formula (1), wherein m=0, and $X_1$ is a sulfur atom.

The iso(thio)cyanate compound used in the present invention is a compound containing one or more iso(thio)cyanate groups (NCO groups and/or NCS groups) in the molecule. The iso(thio)cyanate compound more specifically represents one that is compatible with the compound represented by General Formula (1), and it is preferably a compound having two or more iso(thio)cyanate groups.

Specific examples of the isocyanate compound include aliphatic polyisocyanate compounds such as hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylenetriisocyanate, 1,8-diisocyanato 4-isocyanatomethyloctane, bis(isocyanatoethyl) carbonate, bis(isocyanatoethyl)ether, lisine diisocyanatomethylester, lisine triisocyanate, m-xylene diisocyanate, p-xylene diisocyanate, bis(isocyanatoethyl)benzene, bis(isocyanatopropyl) benzene, α,α,α',α'-tetramethyl xylene diisocyanate, bis(isocyanatobutyl)benzene, bis(isocyanatomethyl)naphthalene, bis(isocyanatomethyl)diphenyl ether, bis(isocyanatoethyl) phthalate, mesitylene triisocyanate, and 2,6-di(isocyanatomethyl)furan;

alicyclic polyisocyanate compounds such as isophorone diisocyanate, bis(isocyanatomethyl)cyclohexane, dicyclohexyl methane diisocyanate, cyclohexane diisocyanate, methyl cyclohexane diisocyanate, dicyclohexyl dimethyl methane diisocyanate, 2,2-dimethyl dicyclohexyl methane diisocyanate, 2,5-bis(isocyanatomethyl)bicyclo[2,2,1]-heptane, 2,6-bis(isocyanatomethyl)bicyclo[2,2,1]-heptane, 3,8-bis(isocyanatomethyl)tricyclodecane, 3,9-bis(isocyanatomethyl)tricyclodecane, 4,8-bis(isocyanatomethyl) tricyclodecane, 4,9-bis(isocyanatomethyl)tricyclodecane, and 1,1'-methylenebis(4-isocyanatocyclohexane);

aromatic polyisocyanate compounds such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzenetriisocyanate, benzenetriisocyanate, biphenyldiisocyanate, toluidine diisocyanate, 4,4-diphenyl methane diisocyanate, 3,3-dimethyl diphenyl methane-4,4-diisocyanate, bibenzyl-4,4-diisocyanate, bis(isocyanatophenyl)ethylene, 3,3-dimethoxybiphenyl-4,4-diisocyanate, phenylisocyanatoethylisocyanate, hexahydrobenzene diisocyanate, and hexahydrodiphenyl methane-4,4-diisocyanate;

sulfur-containing aliphatic polyisocyanate compounds such as bis(isocyanatomethyl)sulfide, bis(isocyanatoethyl) sulfide, bis(isocyanatopropyl)sulfide, bis(isocyanatohexyl) sulfide, bis(isocyanatomethyl)sulfone, bis(isocyanatomethyl)disulfide, bis(isocyanatoethyl)disulfide, bis(isocyanatopropyl)disulfide, bis(isocyanatomethylthio) methane, bis(isocyanatoethylthio)methane, bis(isocyanatoethylthio)ethane, bis(isocyanatomethylthio) ethane, and 1,5-diisocyanato-2-isocyanatomethyl-3-thiapentane;

aromatic sulfide-based polyisocyanate compounds such as diphenyl sulfide-2,4-diisocyanate, diphenyl sulfide-4,4-diisocyanate, 3,3-dimethoxy-4,4-diisocyanatodibenzylthioether, bis(4-isocyanatomethylbenzene)sulfide, and 4,4-methoxybenzene thioethyleneglycol-3,3-diisocyanate;

aromatic disulfide-based isocyanate compounds such as diphenyldisulfide-4,4-diisocyanate, 2,2-dimethyldiphenyldisulfide-5,5-diisocyanate, 3,3-dimethyldiphenyldisulfide-5,5-diisocyanate, 3,3-dimethyldiphenyldisulfide 6,6-diisocyanate, 4,4-dimethyldiphenyldisulfide-5,5-diisocyanate, 3,3-dimethoxydiphenyldisulfide-4,4-diisocyanate, and 4,4-dimethoxydiphenyldisulfide 3,3-diisocyanate; and sulfur-containing heterocyclic compounds such as 2,5-diisocyanatothiophene, and 2,5-bis(isocyanatomethyl) thiophene.

Other examples of the isocyanate compound include 2,5-diisocyanatotetrahydrothiophene, 2,5-bis(isocyanatomethyl) tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane, but not limited to these exemplary compounds.

Also, there may be used a halogen substitute such as a chlorine substitute or a bromine substitute, an alkyl substitute, an alkoxy substitute, a nitro substitute, polyhydric alcohol prepolymer-type modified products, carbodiimide-modified products, urea-modified products, burette-modified products, or dimerization or trimerization reaction products, of those compounds.

Specific examples of the isothiocyanate compound include monofunctional isothiocyanate compounds (compounds each containing one isothiocyanate group), such as methyl isothiocyanate, ethyl isothiocyanate, n-propylthioisocyanate, isopropyl isothiocyanate, n-butyl isothiocyanate, sec-butyl isothiocyanate, tert-butyl isothiocyanate, pentyl isothiocyanate, hexyl isothiocyanate, heptyl isothiocyanate, octyl isothiocyanate, decyl isothiocyanate, lauryl isothiocyanate, myristyl isothiocyanate, octadecyl isothiocyanate, 3-pentyl isothiocyanate, 2-ethylhexyl isothiocyanate, 2,3-dimethylcyclohexyl isothiocyanate, 2-methoxyphenyl isothiocyanate, 4-methoxyphenyl isothiocyanate, α-methylbenzyl isothiocyanate, phenylethyl isothiocyanate, phenyl isothiocyanate, o-, m-, or p-tolyl isothiocyanate, cyclohexyl isothiocyanate, benzyl isothiocyanate, and isothiocyanatemethylbicycloheptane;

aliphatic polyisothiocyanate compounds such as 1,6-diisothiocyanatohexane, and p-phenyleneisopropylidenediisothiocyanate;

alicyclic polyisothiocyanate compounds such as cyclohexanediisothiocyanate, and diisothiocyanatomethylbicycloheptane;

aromatic polyisothiocyanate compounds such as 1,2-diisothiocyanatobenzene, 1,3-diisothiocyanatobenzene, 1,4-diisothiocyanatobenzene, 2,4-diisothiocyanatotoluene, 2,5-diisothiocyanato-m-xylene, 4,4-diisothiocyanato-1,1-biphenyl, 1,1-methylenebis(4-isothiocyanatobenzene), 1,1-methylenebis(4-isothiocyanato 2-methylbenzene), 1,1-methylenebis(4-isothiocyanato-3-methylbenzene), 1,1-(1,2-ethanediyl)bis(isothiocyanatobenzene), 4,4-diisothiocyanatobenzophenone, 4,4-diisothiocyanato-3,3-dimethylbenzophenone, diphenyl ether-4,4-diisothiocyanate, and diphenylamine-4,4-diisothiocyanate; and carbonyl polyisothiocyanate compounds such as 1,3-benzenedicarbonyl diisothiocyanate, 1,4-benzenedicarbonyldiisothiocyanate, and (2,2-pyridine)-4,4-dicarbonyldiisothiocyanate, but not limited to these exemplary compounds.

Furthermore, specific examples of the isothiocyanate compound having one or more sulfur atoms in addition to an isothiocyanato group include sulfur-containing aliphatic polyisothiocyanate compounds such as thiobis(3-isothiocyanatopropane), thiobis(2-isothiocyanatoethane), and dithiobis(2-isothiocyanatoethane);

sulfur-containing aromatic polyisothiocyanate compounds such as 1-isothiocyanato-4-[(2-isothiocyanato)sulfonyl]benzene, thiobis(4-isothiocyanatobenzene), sulfonylbis(4-isothiocyanatobenzene), and dithiobis(4-isothiocyanatobenzene);

sulfur-containing heterocyclic polyisothiocyanate compounds such as 2,5-diisothiocyanatothiophene, and 2,5-diisothiocyanato-1,4-dithiane, but not limited to these exemplary compounds.

Also, there may be used a halogen substitute such as a chlorine substitute or a bromine substitute, an alkyl substitute, an alkoxy substitute, a nitro substitute, polyhydric alcohol prepolymer-type modified products, carbodiimide-modified products, urea-modified products, burette-modified products, or dimerization or trimerization reaction products, of those compounds.

Furthermore, isothiocyanate compounds having isocyanate groups can be included. Specific examples thereof include aliphatic or alicyclic compounds such as 1-isocyanato-6-isothiocyanatohexane, and 1-isocyanato-4-isothiocyanatocyclohexane;

aromatic compounds such as 1-isocyanato-4-isothiocyanatobenzene, and 4-methyl-3-isocyanato-1-isothiocyanatobenzene;

heterocyclic compounds such as 2-isocyanato-4,6-diisothiocyanato-1,3,5-triazine; and compounds each containing a sulfur atom in addition to an isothiocyanato group, such as 4-isocyanato-4'-isothiocyanatodiphenyl sulfide, and 2-isocyanato-2'-isothiocyanatodiethyl disulfide, but not limited to these exemplary compounds.

Also, there may be used a halogen substitute such as a chlorine substitute or a bromine substitute, an alkyl substitute, an alkoxy substitute, a nitro substitute, polyhydric alcohol prepolymer-type modified products, carbodiimide-modified products, urea-modified products, burette-modified products, or dimerization or trimerization reaction products.

Among these compounds, from the viewpoint of the strength of the obtained resin, the compound that is preferably at least one selected from the group consisting of 2,5-bis(isocyanatomethyl)bicyclo[2.2.1]heptane, 2,6-bis(isocyanatomethyl)bicyclo[2.2.1]heptane, bis(isocyanatomethyl) cyclohexane, cyclohexane diisocyanate, isophorone diisocyanate, 1,1'-methylenebis(4-isocyanatocyclohexane), m-xylenediisocyanate, and 2,5-bis(isocyanatomethyl)-1,4-dithiane, and the compound is more preferably 2,5-bis(isocyanatomethyl)bicyclo[2.2.1]heptane, and 2,6-bis(isocyanatomethyl)bicyclo[2.2.1]heptane.

The amount of the iso(thio)cyanate compound added of the present invention depends on the structure of the compound used and the structure or amount of the thiol compound, but it is preferably 25% by weight or less based on the total amount of the polymerizable composition of the invention, from the viewpoint of the refractive index of the obtained resin. It is more preferably 23% by weight or less, and even more preferably 20% by weight or less. From the viewpoint of the color of the obtained resin, it is preferably 2.5% by weight or more.

Furthermore, as for the ratio of the thiol compound used and the iso(thio)cyanate compound, the ratio of the functional groups (that is, SH groups/(NCO groups+NCS groups)) that is the ratio of the thiol groups in the thiol compound and the iso(thio)cyanate groups in the iso(thio)cyanate compound is preferably 0.7 or more from the viewpoint of the color of the resin. It is more preferably from 0.9 to 5, and even more preferably from 0.9 to 3. If the ratio of the functional groups is too low, the obtained resin unfavorably has the reduced mechanical strength in some cases, whereas if the ratio is too high, the obtained resin unfavorably has the reduced heat resistance in some cases.

If the polymerizable composition further includes the iso(thio)cyanate compound, the content of the compound represented by General Formula (1) in the total weight of the polymerizable compounds contained in the polymerizable composition of the present invention is not particularly limited, but it is usually 10% by weight or more.

As the content of the compound represented by General Formula (1) is increased, there is a tendency that materials having higher refractive indice are obtained. Thus, the content is preferably 30% by weight or more, more preferably 50% by weight or more, and even more preferably 70% by weight or more.

However, if the content of the compound represented by General Formula (1) is too high, it relatively reduces the content of the thiol compound and the iso(thio)cyanate compound. Thus, from the viewpoints for improving the color of the resin and suppressing the reduction in mechanical strength, the content of the compound represented by General Formula (1) in the polymerizable composition is preferably 95% by weight or less.

Furthermore, if the polymerizable composition further includes the iso(thio)cyanate compound, the amount of the thiol compound used depends on the structure of the compound used and the structure or amount of the iso(thio)cyanate compound. However, since the compound represented by General Formula (1) provides a resin having a high refractive index, generally addition of a thiol compound leads to reduction in the refractive index of the obtained resin. Thus, considering the refractive index of the obtained resin, it is contained in an amount of preferably 35% by weight or less based on the total amount of the polymerizable composition of the present invention, more preferably 30% by weight or less, and even more preferably 25% by weight or less. From the viewpoint of the color and the mechanical strength of the obtained resin, the amount is preferably 2.5% by weight or more.

The polymerizable composition of the present invention includes the compound represented by General Formula (1), the thiol compound, and a compound including an epoxy compound and/or an episulfide compound, and if necessary, a polymerization catalyst. Furthermore, the compound may be represented by General Formula (1), wherein m=0, and $X_1$ is a sulfur atom.

The epoxy compound and the episulfide compound contain one or more epoxy groups and episulfide groups in the molecule, respectively. As each of the epoxy compound and the episulfide compound, any one having a structure that is compatible with the compound represented by General Formula (1) can be used, and they are preferably compounds each containing two or more epoxy groups and/or episulfide groups in total.

Specifically, examples of the epoxy compound include phenolic epoxy compounds obtained by condensation of an epihalohydrin compound with a polyphenol compound such as bisphenol A/glycidyl ether, and bisphenol F/glycidyl ether;

alcoholic epoxy compounds obtained by condensation of an epihalohydrin compound with a polyalcohol compound such as hydrogenated bisphenol A/glycidyl ether, hydrogenated bisphenol F/glycidyl ether, and cyclohexanedimethanol;

glycidyl ester epoxy compounds obtained by condensation of an epihalohydrin compound with a polyorganic acid compound such as 3,4-epoxycyclohexylmethyl-3',4'-epoxycyclohexane carboxylate, and diglycidyl 1,2-hexahydrophthalate; and amine epoxy compounds obtained by condensation of an epihalohydrin compound with a primary/secondary amine; as well as aliphatic polyepoxy compounds such as vinylcyclohexene diepoxide which includes 4-vinyl-1-cyclohexanedipoxide and the like.

Specific examples of the sulfide group-containing epoxy compound and the ether group-containing epoxy compound include chained aliphatic 2,3-epoxypropylthio compounds such as bis(2,3-epoxypropyl)sulfide, bis(2,3-epoxypropyl) disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methyl propane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomethyl)propane, 2,2-bis(2,3-epoxypropylthiomethyl)-1-(2,3-epoxypropylthio)butane, 1,5-bis(2,3-epoxypropylthio)-2-(2,3-epoxypropylthiomethy)-3-thiapentane, 1,5-bis(2,3-epoxypropylthio)-2,4-bis(2,3-epoxypropythiomethyl)-3-thiapentane, 1-(2,3-epoxypropylthio)-2,2-bis(2,3-epoxypropylthiomethy)-4-thiahexane, 1,5,6-tris(2,3-epoxypropylthio)-4-(2,3-epoxypropythiomethyl)-3-thiahexane, 1,8-bis(2,3-epoxypropylthio)-4-(2,3-epoxypropylthiomethyl)-3,6-dithiaoctane, 1,8-bis(2,3-epoxypropylthio)-4,5-bis(2,3-epoxypropylthiomethyl)-3,6-dithiaoctane, 1,8-bis(2,3-epoxypropylthio)-4,4-bis(2,3-epoxypropylthiomethyl)-3,6-dithiaoctane, 1,8-bis(2,3-epoxypropylthio)-2,5-bis(2,3-epoxypropylthiomethyl)-3,6-dithiaoctane, 1,8-bis(2,3-epoxypropylthio)-2,4,5-tris(2,3-epoxypropylthiomethyl)-3,6-dithiaoctane, 1,1,1-tris[[2-(2,3-epoxypropylthio)ethyl]thiomethyl]-2-(2,3-epoxypropylthio)ethane, 1,1,2,2-tetrakis[[2-(2,3-epoxypropylthio)ethyl]thiomethyl]ethane, 1,11-bis(2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, and 1,11-bis(2,3-epoxypropylthio)-5,7-bis(2,3-epoxypropylthiomethyl)-3,6,9-trithiaundecane;

alicyclic 2,3-epoxypropylthio compounds such as 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[[2-(2,3-epoxypropylthio)ethyl]thiomethyl]-1,4-dithiane, and 2,5-bis(2,3-epoxypropylthiomethyl)-2,5-dimethyl-1,4-dithiane;

aromatic 2,3-epoxypropylthio compounds such as 1,2-bis(2,3-epoxypropylthio)benzene, 1,3-bis(2,3-epoxypropylthio)benzene, 1,4-bis(2,3-epoxypropylthio)benzene, 1,2-bis(2,3-epoxypropylthiomethyl)benzene, 1,3-bis(2,3-epoxypropylthiomethyl)benzene, 1,4-bis(2,3-epoxypropylthiomethyl)benzene, bis[4-(2,3-epoxypropylthio)phenyl]methane, 2,2-bis[4-(2,3-epoxypropylthio)phenyl]propane, bis[4-(2,3-epoxypropylthio)phenyl]sulfide, bis[4-(2,3-epoxypropylthio)phenyl]sulfone, and 4,4'-bis(2,3-epoxypropylthio)biphenyl;

monofunctional epoxy compounds (compounds having one epoxy group) such as ethylene oxide, propylene oxide, glycidol, and epichlorohydrin;

chained aliphatic 2,3-epoxypropyloxy compounds such as bis(2,3-epoxypropyl)ether, bis(2,3-epoxypropyloxy)methane, 1,2-bis(2,3-epoxypropyloxy)ethane, 1,2-bis(2,3-epoxypropyloxy)propane, 1,3-bis(2,3-epoxypropyloxy)propane, 1,3-bis(2,3-epoxypropyloxy)-2-methyl propane, 1,4-bis(2,3-epoxypropyloxy)butane, 1,4-bis(2,3-epoxypropyloxy)-2-methylbutane, 1,3-bis(2,3-epoxypropyloxy)butane, 1,5-bis(2,3-epoxypropyloxy)pentane, 1,5-bis(2,3-epoxypropyloxy)-2-methylpentane, 1,5-bis(2,3-epoxypropyloxy)-3-thiapentane, 1,6-bis(2,3-epoxypropyloxy)hexane, 1,6-bis(2,3-epoxypropyloxy)-2-methylhexane, 3,8-bis(2,3-epoxypropyloxy)-3,6-dithiaoctane, 1,2,3-tris(2,3-epoxypropyloxy)propane, 2,2-bis(2,3-epoxypropyloxy)-1,3-bis(2,3-epoxypropyloxy methyl)propane, 2,2-bis(2,3-epoxypropyloxy methyl)-1-(2,3-epoxypropyloxy)butane, 1,5-bis(2,3-epoxypropyloxy)-2-(2,3-epoxypropyloxy methyl)-3-thiapentane, 1,5-bis(2,3-epoxypropyloxy)-2,4-bis(2,3-epoxypropyloxy methyl)-3-thiapentane, 1-(2,3-epoxypropyloxy)-2,2-bis(2,3-epoxypropyloxy methyl)-4-thiahexane, 1,5,6-tris(2,3-epoxypropyloxy)-4-(2,3-epoxypropyloxy methyl)-3-thiahexane, 1,8-bis(2,3-epoxypropyloxy)-4-(2,3-epoxypropyloxy methyl)-3,6-dithiaoctane, 1,8-bis(2,3-epoxypropyloxy)-4,5-bis(2,3-epoxypropyloxy methyl)-3,6-dithiaoctane, 1,8-bis(2,3-epoxypropyloxy)-4,4-bis(2,3-epoxypropyloxy methyl)-3,6-dithiaoctane, 1,8-bis(2,3-epoxypropyloxy)-2,5-bis(2,3-epoxypropyloxy methyl)-3,6-dithiaoctane, 1,8-bis(2,3-epoxypropyloxy)-2,4,5-tris(2,3-epoxypropyloxy methyl)-3,6-dithiaoctane, 1,1,1-tris[[2-(2,3-epoxypropyloxy)ethyl]thiomethyl]-2-(2,3-epoxypropyloxy)ethane, 1,1,2,2-tetrakis[[2-(2,3-epoxypropyloxy)ethyl]thiomethyl]ethane, 1,11-bis(2,3-epoxypropyloxy)-4,8-bis(2,3-epoxypropyloxy methyl)-3,6,9-trithiaundecane, 1,11-bis(2,3-epoxypropyloxy)-4,7-bis(2,3-epoxypropyloxy methyl)-3,6,9-trithiaundecane, and 1,11-bis(2,3-epoxypropyloxy)-5,7-bis(2,3-epoxypropyloxymethyl)-3,6,9-trithiaundecane;

alicyclic 2,3-epoxypropyloxy compounds such as 1,3-bis(2,3-epoxypropyloxy)cyclohexane, 1,4-bis(2,3-epoxypropyloxy)cyclohexane, 1,3-bis(2,3-epoxypropyloxy methyl)cyclohexane, 1,4-bis(2,3-epoxypropyloxy methyl)cyclohexane, 2,5-bis(2,3-epoxypropyloxy methyl)-1,4- dithiane, 2,5-bis[[2-(2,3-epoxypropyloxy)ethyl]thiomethyl]-1,4-dithiane, and 2,5-bis(2,3-epoxypropyloxy methyl)-2,5-dimethyl-1,4-dithiane; and aromatic 2,3-epoxypropyloxy compounds such as 1,2-bis(2,3-epoxypropyloxy)benzene, 1,3-bis(2,3-epoxypropyloxy)benzene, 1,4-bis(2,3-epoxypropyloxy)benzene, 1,2-bis(2,3-epoxypropyloxy methyl)benzene, 1,3-bis(2,3-epoxypropyloxy methyl)benzene, 1,4-bis(2,3-epoxypropyloxy methyl)benzene, bis[4-(2,3-epoxypropyloxy)phenyl]methane, 2,2-bis[4-(2,3-epoxypropyloxy)phenyl]propane, bis[4-(2,3-epoxypropyloxy)phenyl]sulfide, bis[4-(2,3-epoxypropyloxy)phenyl]sulfone, and 4,4'-bis(2,3-epoxypropyloxy)biphenyl, but not limited to these exemplary compounds.

Among these exemplified epoxy compounds, preferred examples thereof include bis(2,3-epoxypropyl)disulfide, 4-vinyl-1-cyclohexanediepoxide, and phenolic epoxy compounds obtained by condensation of an epihalohydrin compound with a polyphenol compound such as and bisphenol A/bisphenol F/glycidyl ether;

alcoholic epoxy compounds obtained by condensation of an epihalohydrin compound with a polyalcohol compound such as hydrogenated bisphenol A/bisphenol F/glycidyl ether;

glycidyl ester epoxy compounds prepared by condensation of an epihalohydrin compound with a polyorganic acid compound such as 3,4-epoxycyclohexylmethyl-3',4'-epoxycyclohexane carboxylate, and diglycidyl 1,2-hexahydrophthalate; and amine epoxy compounds prepared by condensation of an epihalohydrin compound with a primary or secondary amine. Furthermore, examples include aliphatic polyfunctional epoxy compounds such as vinylcyclohexene diepoxide, more preferably bis(2,3-epoxypropyl)disulfide, cyclohexanedimethanol diglycidyl ether, bisphenol A/glycidyl ether, and bisphenol F/glycidyl ether, and even more preferably cyclohexanedimethanol diglycidyl ether and bisphenol F/glycidyl ether.

Specific examples of the episulfide compound include epithioethylthio compounds such as bis(1,2-epithioethyl)sulfide, bis(1,2-epithioethyl)disulfide, bis(epithioethylthio)methane, bis(epithioethylthio)benzene, bis[4-(epithioethylthio)phenyl]sulfide, and bis[4-(epithioethylthio)phenyl]methane;

chained aliphatic 2,3-epithiopropylthio compounds such as bis(2,3-epithiopropyl)sulfide, bis(2,3-epithiopropyl)disulfide, bis(2,3-epithiopropythio)methane, 1,2-bis(2,3-epithiopropylthio)ethane, 1,2-bis(2,3-epithiopropylthio)propane, 1,3-bis(2,3-epithiopropylthio)propane, 1,3-bis(2,3-epithiopropylthio)-2-methyl propane, 1,4-bis(2,3-epithiopropylthio)butane, 1,4-bis(2,3-epithiopropylthio)-2-methylbutane, 1,3-bis(2,3-epithiopropylthio)butane, 1,5-bis(2,3-epithiopropylthio)pentane, 1,5-bis(2,3-epithiopropylthio)-2-methylpentane, 1,5-bis(2,3-epithiopropylthio)-3-thiapentane, 1,6-bis(2,3-epithiopropylthio)hexane, 1,6-bis(2,3-epithiopropylthio)-2-methylhexane, 3,8-bis(2,3-epithiopropylthio)-3,6-dithiaoctane, 1,2,3-tris(2,3-epithiopropylthio)propane, 2,2-bis(2,3-epithiopropylthio)-1,3-bis(2,3-epithiopropylthiomethyl)propane, 2,2-bis(2,3-epithiopropylthiomethyl)-1-(2,3-epithiopropylthio)butane, 1,5-bis(2,3-epithiopropylthio)-2-(2,3-epithiopropylthiomethyl)-3-thiapentane, 1,5-bis(2,3-epithiopropylthio)-2,4-bis(2,3-epithiopropylthiomethyl)-3-thiapentane, 1-(2,3-epithiopropylthio)-2,2-bis(2,3-epithiopropylthiomethyl)-4-thiahexane, 1,5,6-tris(2,3-epithiopropylthio)-4-(2,3-epithiopropylthiomethyl)-3-thiahexane, 1,8-bis(2,3-epithiopropylthio)-4-(2,3-epithiopropylthiomethyl)-3,6-dithiaoctane, 1,8-bis(2,3-epithiopropylthio)-4,5-bis(2,3-epithiopropylthiomethyl)-3,6-dithiaoctane, 1,8-bis(2,3-epithiopropylthio)-4,4-bis(2,3-epithiopropylthiomethyl)-3,6-dithiaoctane, 1,8-bis(2,3-epithiopropylthio)-2,5-bis(2,3-epithiopropylthiomethyl)-3,6-dithiaoctane, 1,8-bis(2,3-epithiopropylthio)-2,4,5-tris(2,3-epithiopropylthiomethyl)-3,6-dithiaoctane, 1,1,1-tris[[2-(2,3-epithiopropylthio)ethyl]thiomethyl]-2-(2,3-epithiopropylthio)ethane, 1,1,2,2-tetrakis[[2-(2,3-epithiopropylthio)ethyl]thiomethyl]ethane, 1,11-bis(2,3-epithiopropylthio)-4,8-bis(2,3-epithiopropylthiomethyl)-3,6,9-trithiaundecane, 1,11-bis(2,3-epithiopropylthio)-4,7-bis(2,3-epithiopropylthiomethyl)-3,6,9-trithiaundecane, and 1,11-bis(2,3-epithiopropylthio)-5,7-bis(2,3-epithiopropylthiomethyl)-3,6,9-trithiaundecane;

alicyclic 2,3-epithiopropylthio compounds such as 1,3-bis(2,3-epithiopropylthio)cyclohexane, 1,4-bis(2,3-epithiopropylthio)cyclohexane, 1,3-bis(2,3-epithiopropylthiomethyl)cyclohexane, 1,4-bis(2,3-epithiopropylthiomethyl)cyclohexane, 2,5-bis(2,3-epithiopropylthiomethyl)-1,4-dithiane, 2,5-bis[[2-(2,3-epithiopropylthio)ethyl]thiomethyl]-1,4-dithiane, and 2,5-bis(2,3-epithiopropylthiomethyl)-2,5-dimethyl-1,4-dithiane;

aromatic 2,3-epithiopropylthio compounds such as 1,2-bis(2,3-epithiopropylthio)benzene, 1,3-bis(2,3-epithiopropylthio)benzene, 1,4-bis(2,3-epithiopropylthio)benzene, 1,2-bis(2,3-epithiopropylthiomethyl)benzene, 1,3-bis(2,3-epithiopropylthiomethyl)benzene, 1,4-bis(2,3-epithiopropylthiomethyl)benzene, bis[4-(2,3-epithiopropylthio)phenyl]methane, 2,2-bis[4-(2,3-epithiopropylthio)phenyl]propane, bis[4-(2,3-epithiopropylthio)phenyl]sulfide, bis[4-(2,3-epithiopropylthio)phenyl]sulfone, and 4,4'-bis(2,3-epithiopropylthio)biphenyl;

monofunctional episulfide compounds (compounds each containing one episulfide group) such as ethylene sulfide, propylene sulfide, mercaptopropylene sulfide, and mercaptobutenesulfide, epithiochlorohydrin;

chained aliphatic 2,3-epithiopropyloxy compounds such as bis(2,3-epithiopropyl)ether, bis(2,3-epithiopropyloxy)methane, 1,2-bis(2,3-epithiopropyloxy)ethane, 1,2-bis(2,3-epithiopropyloxy)propane, 1,3-bis(2,3-epithiopropyloxy)propane, 1,3-bis(2,3-epithiopropyloxy)-2-methyl propane, 1,4-bis(2,3-epithiopropyloxy)butane, 1,4-bis(2,3-epithiopropyloxy)-2-methylbutane, 1,3-bis(2,3-epithiopropyloxy)butane, 1,5-bis(2,3-epithiopropyloxy)pentane, 1,5-bis(2,3-epithiopropyloxy)-2-methylpentane, 1,5-bis(2,3-epithiopropyloxy)-3-thiapentane, 1,6-bis(2,3-epithiopropyloxy)hexane, 1,6-bis(2,3-epithiopropyloxy)-2-methylhexane, 3,8-bis(2,3-epithiopropyloxy)-3,6-dithiaoctane, 1,2,3-tris(2,3-epithiopropyloxy)propane, 2,2-bis(2,3-epithiopropyloxy)-1,3-bis(2,3-epithioprop)propane, 2,2-bis(2,3-epithiopropyloxymethyl)-1-(2,3-epithiopropyloxy)butane, 1,5-bis(2,3-epithiopropyloxy)-2-(2,3-epithiopropyloxymethyl)-3-thiapentane, 1,5-bis(2,3-epithiopropyloxy)-2,4-bis(2,3-epithioprop)-3-thiapentane, 1-(2,3-epithiopropyloxy)-2,2-bis(2,3-epithiopropyloxymethyl)-4-thiahexane, 1,5,6-tris(2,3-epithiopropyloxy)-4-(2,3-epithiopropyloxymethyl)-3-thiahexane, 1,8-bis(2,3-epithiopropyloxy)-4-(2,3-epithiopropyloxymethyl)-3,6-dithiaoctane, 1,8-bis(2,3-epithiopropyloxy)-4,5-bis(2,3-epithiopropyloxymethyl)-3,6-dithiaoctane, 1,8-bis(2,3-epithiopropyloxy)-4,4-bis(2,3-epithiopropyloxymethyl)-3,6-dithiaoctane, 1,8-bis(2,3-epithiopropyloxy)-2,5-bis(2,3-epithiopropyloxymethyl)-3,6-dithiaoctane, 1,8-bis(2,3-epithiopropyloxy)-2,4,5-tris(2,3-epithiopropyloxymethyl)-3,6-dithiaoctane, 1,1,1-tris[[2-(2,3-epithiopropyloxy)ethyl]

thiomethyl]-2-(2,3-epithio propyloxy)ethane, 1,1,2,2-tetrakis[[2-(2,3-epithiopropyloxy)ethyl]thiomethyl]ethane, 1,11-bis(2,3-epithiopropyloxy)-4,8-bis(2,3-epithiopropyloxymethyl-3,6,9-trithiaundecane, 1,11-bis(2,3-epithiopropyloxy)-4,7-bis(2,3-epithiopropyloxymethyl)-3,6,9-trithiaundecane, and 1,11-bis(2,3-epithiopropyloxy)-5,7-bis(2,3-epithiopropyloxymethyl)-3,6,9-trithiaundecane;

cyclic aliphatic 2,3-epithiopropyloxy compounds such as 1,3-bis(2,3-epithiopropyloxy)cyclohexane, 1,4-bis(2,3-epithiopropyloxy)cyclohexane, 1,3-bis(2,3-epithiopropyloxymethyl)cyclohexane, 1,4-bis(2,3-epithiopropyloxymethyl)cyclohexane, 2,5-bis(2,3-epithiopropyloxymethyl)-1,4-dithiane, 2,5-bis[[2-(2,3-epithiopropyloxy)ethyl]thiomethyl]-1,4-dithiane, and 2,5-bis(2,3-epithiopropyloxymethyl)-2,5-dimethyl-1,4-dithiane; and aromatic 2,3-epithiopropyloxy compounds such as 1,2-bis(2,3-epithiopropyloxy)benzene, 1,3-bis(2,3-epithiopropyloxy)benzene, 1,4-bis(2,3-epithiopropyloxy)benzene, 1,2-bis(2,3-epithiopropyloxymethyl)benzene, 1,3-bis(2,3-epithiopropyloxymethyl)benzene, 1,4-bis(2,3-epithiopropyloxymethyl)benzene, bis[4-(2,3-epithiopropyloxy)phenyl]methane, 2,2-bis[4-(2,3-epithiopropyloxy)phenyl]propane, bis[4-(2,3-epithiopropyloxy)phenyl]sulfide, bis[4-(2,3-epithiopropyloxy)phenyl]sulfone, and 4,4'-bis(2,3-epithiopropyloxy)biphenyl, but not limited to these the exemplified compounds.

Among these exemplified compounds, examples of preferred compounds include bis(1,2-epithioethyl)sulfide, bis(1,2-epithioethyl)disulfide, bis(2,3-epithiopropyl)sulfide, bis(2,3-epithiopropylthio)methane and bis(2,3-epithiopropyl)disulfide, and examples of more preferable compound include bis(1,2-epithioethyl)sulfide, bis(1,2-epithioethyl)disulfide, bis(2,3-epithiopropyl)sulfide, and bis(2,3-epithiopropyl)disulfide. Furthermore, examples of even more preferable compound include bis(2,3-epithiopropyl)sulfide and bis(2,3-epithiopropyl)disulfide.

The used amount of the epoxy compound and/or the episulfide compound varies depending on the structure of the compound to be used and the structure or used amount of the thiol compound, but it is preferably 25% by weight or less based on the total amount of the polymerizable composition of the invention, from the viewpoint of a refractive index of the resin to be obtained. It is more preferably 23% by weight or less, and even more preferably 20% by weight or less. From the viewpoint of color and mechanical strength of the resin to be obtained, it is preferably 2.5% by weight or more.

The epoxy compound and/or the episulfide compound can be used singly or in combination thereof, and the ratio thereof is not particularly limited. Furthermore, a plurality of the same epoxy compounds or the different epoxy compounds, or the same episulfide compounds or the different episulfide compounds may also be used in combination. However, in order to obtain a resin having a high refractive index, it is preferable to use an episulfide compound.

As for the ratio of the thiol compound used and the episulfide compound used, the ratio of the functional groups (SH groups/(epoxy groups+episulfide groups)) that is the ratio of the thiol groups in the thiol compound and the epoxy groups and/or episulfide groups in the epoxy compound and/or the episulfide compound is preferably 0.7 or more from the viewpoint of resin color. It is more preferably from 0.9 to 5, and even more preferably from 0.9 to 3. If the ratio of the functional groups is too low, the obtained resin may be unfavorable due to the reduced transparency, whereas if the ratio is too high, the obtained resin may also be unfavorable due to the reduced heat resistance.

If the polymerizable composition further includes the epoxy compound and/or the episulfide compound, the content of the compound represented by General Formula (1) in the total weight of the polymerizable compounds contained in the polymerizable composition of the present invention is not particularly limited, but it is usually 10% by weight or more.

As the content of the compound represented by General Formula (1) is increased, there is a tendency that materials having higher refractive indice are obtained. Thus, the content is preferably 30% by weight or more, more preferably 50% by weight or more, and even more preferably 70% by weight or more.

However, if the content of the compound represented by General Formula (1) is too high, it relatively reduces the content of the thiol compound and the epoxy compound and/or the episulfide compound. From the viewpoint of improving the color of the resin and suppressing the reduction in mechanical strength, the content of the compound represented by General Formula (1) in the polymerizable composition is preferably 95% by weight or less.

Furthermore, if the polymerizable composition further includes the epoxy compound and/or the episulfide compound, the amount of the thiol compound used depends on the structure of the compound used and the structure or amount of the epoxy compound and/or the episulfide compound. However, since the compound represented by General Formula (1) provides a resin having a high refractive index, generally addition of a thiol compound leads to reduction in the refractive index of the obtained resin. Thus, from the viewpoint of the refractive index of the obtained resin, it is contained in an amount of preferably 35% by weight or less based on the total amount of the polymerizable composition of the present invention, more preferably 30% by weight or less, and even more preferably 25% by weight or less. From the viewpoint of the color and the mechanical strength of the obtained resin, the amount is preferably 2.5% by weight or more.

The polymerizable composition of the present invention includes the compound represented by General Formula (1), the thiol compound, and a compound including a thietane compound containing no metal, and if necessary, a polymerization catalyst. Furthermore, the compound may be represented by General Formula (1), wherein m=0, and $X_1$ is a sulfur atom.

The thietane compound containing no metal used in the present invention is a compound containing no metal in the molecule. The thietane compound containing no metal more specifically represents the compound represented by the following General Formula (8), having one or more thietanyl groups in the molecule, and it can be any one having a structure that is compatible with the compound represented by General Formula (1).

[Chemical Formula 11]

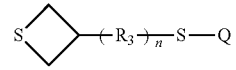

(8)

(in General Formula (8), Q represents a reactive terminal group, a straight, branched or cyclic alkyl group having 1 to 10 carbon atom(s) that has a reactive terminal group, or its thia derivative, an aryl group, or an aralkyl group, $R_3$ represents a substituted or unsubstituted bivalent hydrocarbon group having 1 to 10 carbon atom(s), which may be thianated, and n represents an integer of 0 to 3).

Hereinbelow, the compound represented by General Formula (8) will be described.

In General Formula (8), Q represents a straight, branched or cyclic alkyl group having 1 to 10 carbon atom(s) that has a reactive terminal group, or its thia derivative, an aryl group, or an aralkyl group.

In General Formula (8), $R_3$ represents a substituted or unsubstituted bivalent hydrocarbon group having 1 to 10 carbon atom(s), which may be thianated.

In General Formula (8), n represents an integer of 0 to 3. Furthermore, if n is 2 or greater, a plurality of $R_3$'s each independently represents a substituted or unsubstituted bivalent hydrocarbon group having 1 to 10 carbon atom(s), which may be thianated.

Specific examples of the compound represented by General Formula (8) include sulfur-containing cyclic sulfide or disulfide compounds such as bis(3-thietanyl)sulfide, and bis(3-thietanylthiomethyl)sulfide, bis(3-thietanyl)disulfide;

chained aliphatic 3-thietanylthio compounds such as 1,1-bis(3-thietanylthio)methane, 1,2-bis(3-thietanylthio)ethane, 1,2-bis(3-thietanylthio)propane, 1,3-bis(3-thietanylthio)propane, 1,2,3-tris(3-thietanylthio)propane, 1,3-bis(3-thietanylthio)-2-methyl propane, 1,4-bis(3-thietanylthio)butane, 1,4-bis(3-thietanylthio)-2-methylbutane, 1,3-bis(3-thietanylthio)butane, 1,5-bis(3-thietanylthio)pentane, 1,5-bis(3-thietanylthio)-2-methylpentane, 1,5-bis(3-thietanylthio)-3-thiapentane, 1,6-bis(3-thietanylthio)hexane, 1,6-bis(3-thietanylthio)-2-methylhexane, 3,8-bis(3-thietanylthio)-3,6-dithiaoctane, 1,2,3-tris(3-thietanylthio)propane, 2,2-bis(3-thietanylthio)-1,3-bis(3-thietanylthiomethyl)propane, 2,2-bis(3-thietanylthio)-1-(3-thietanylthiomethyl)butane, 1,5-bis(3-thietanylthio)-2-(3-thietanylthiomethyl)-3-thiapentane, 1,5-bis(3-thietanylthio)-2,4-bis(3-thietanylthiomethyl)-3-thiapentane, 1-(3-thietanylthio)-2,2-bis(3-thietanylthiomethyl)-4-thiahexane, 1,5,6-tris(3-thietanylthio)-4-(3-thietanylthiomethyl)-3-thiahexane, 1,8-bis(3-thietanylthio)-4-(3-thietanylthiomethyl)-3,6-dithiaoctane, 1,8-bis(3-thietanylthio)-4,5-bis(3-thietanylthiomethyl)-3,6-dithiaoctane, 1,8-bis(3-thietanylthio)-4,4-bis(3-thietanylthiomethyl)-3,6-dithiaoctane, 1,8-bis(3-thietanylthio)-2,5-bis(3-thietanylthiomethyl)-3,6-dithiaoctane, 1,8-bis(3-thietanylthio)-2,4,5-tris(3-thietanylthiomethyl)-3,6-dithiaoctane, 1,1,1-tris[[2-(3-thietanylthio)ethyl]thiomethyl]-2-(3-thietanylthio) ethane, 1,1,2,2-tetrakis[[2-(3-thietanylthio)ethyl]thiomethyl]ethane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 1,1,3,3-tetrakis(3-thietanylthiomethylthio)propane, 1,1,2,2-tetrakis(3-thietanylthiomethylthio)ethane, and 3-(3-thietanylthiomethyl)-1,5-di(3-thietanylthio)-2,4-dithiapentane;

alicyclic 3-thietanylthio compounds such as 1,3-bis(3-thietanylthio)cyclohexane, 1,4-bis(3-thietanylthio)cyclohexane, 1,3-bis(3-thietanylthiomethyl)cyclohexane, 1,4-bis(3-thietanylthiomethyl)cyclohexane, 2,5-bis(3-thietanylthiomethyl)-1,4-dithiane, 4,6-bis(3-thietanylthiomethyl)-1,3-dithiane, 4,5-bis(3-thietanylthiomethyl)-1,3-dithiolane, 2,4-bis(3-thietanylthiomethyl)-1,3-dithietane, 2,5-bis[[2-(3-thietanylthio)ethyl]thiomethyl]-1,4-dithiane, 2,5-bis(3-thietanylthiomethyl)-2,5-dimethyl-1,4-dithiane, and 2,2-bis(3-thietanylthiomethyl)-1,3-dithiolane; and aromatic 3-thietanylthio compounds such as 1,2-bis(3-thietanylthio)benzene, 1,3-bis(3-thietanylthio)benzene, 1,4-bis(3-thietanylthio)benzene, 1,2-bis(3-thietanylthiomethyl)benzene, 1,3-bis(3-thietanylthiomethyl)benzene, 1,4-bis(3-thietanylthiomethyl)benzene, bis[4-(3-thietanylthio)phenyl]methane, 2,2-bis[4-(3-thietanylthio)phenyl]propane, bis[4-(3-thietanylthio)phenyl]sulfide, bis[4-(3-thietanylthio)phenyl]sulfone, and 4,4'-bis(3-thietanylthio)biphenyl.

Furthermore, examples of the asymmetric compound include 1,3-bis(3-thietanylthio)propane-1-one, and 1,3-bis(3-thietanylthio)-2-methyl propane-1-one, but not limited these exemplified compounds.

Among the exemplified compounds, examples of the preferable compounds include bis(3-thietanyl)sulfide, bis(3-thietanylthiomethyl)sulfide, bis(3-thietanyl)disulfide, 1,1-bis(3-thietanylthio)methane, 1,2-bis(3-thietanylthio)ethane, 1,2,3-tris(3-thietanylthio)propane, 1,8-bis(3-thietanylthio)-4-(3-thietanylthiomethyl)-3,6-dithiaoctane, 1,11-bis(3-thietanylthio)-4,8-bis(3-thietanylthiomethyl)-3,6,9-trithiaundecane, 1,11-bis(3-thietanylthio)-4,7-bis(3-thietanylthiomethyl)-3,6,9-trithiaundecane, 1,11-bis(3-thietanylthio)-5,7-bis(3-thietanylthiomethyl)-3,6,9-trithiaundecane, 2,5-bis(3-thietanylthiomethyl)-1,4-dithiane, 2,5-bis[[2-(3-thietanylthio)ethyl]thiomethyl]-1,4-dithiane, 2,5-bis(3-thietanylthiomethyl)-2,5-dimethyl-1,4-dithiane, 4,5-bis(3-thietanylthiomethyl)-1,3-dithiolane, 2,4-bis(3-thietanylthiomethyl)-1,3-dithietane, and 2,2-bis(3-thietanylthiomethyl)-1,3-dithiolane; examples of more preferable compounds include bis(3-thietanyl)sulfide, bis(3-thietanylthiomethyl)sulfide, bis(3-thietanyl)disulfide, 1,1-bis(3-thietanylthio)methane, and 2,2-bis(3-thietanylthiomethyl)-1,3-dithiolane; and examples of even more preferable compounds include bis(3-thietanyl)disulfide.

The amount of the thietane compound containing no metal used depends on the structure of the compound used and the structure or amount of the thiol compound used, but it is preferably 25% by weight or less based on the total amount of the polymerizable composition, from the viewpoint of the refractive index of the obtained resin. It is more preferably 23% by weight or less, and even more preferably 20% by weight or less. From the viewpoint of the color and the mechanical strength of the obtained resin, it is preferably 2.5% by weight or more.

As the thietane compound containing no metal, the thietane compounds containing no metal may be used singly, or a plurality of the different the thietane compounds containing no metal may also be used together. However, the amount ratio is not particularly limited.

As for the ratio of the thiol compound used and the thietane compound containing no metal used, the ratio of the functional groups (SH groups/thietanyl groups), that is the ratio of the thiol groups in the thiol compound and the thietanyl groups in the thietane compound containing no metal, is preferably 0.7 or more from the viewpoint of the color of the resin. It is more preferably from 0.9 to 5, and even more preferably from 0.9 to 3. If the ratio of the functional groups is too low, the obtained resin unfavorably has the reduced transparency in some cases, whereas if the ratio is too high, the obtained resin unfavorably has the reduced heat resistance in some cases.

If the polymerizable composition further includes the thietane compound containing no metal, the content of the compound represented by General Formula (1) in the total weight of the polymerizable compounds contained in the polymerizable composition of the present invention is not particularly limited, but it is usually 10% by weight or more.

As the content of the compound represented by General Formula (1) is increased, there is a tendency that materials having higher refractive indice are obtained. Thus, the content is preferably 30% by weight or more, more preferably 50% by weight or more, and even more preferably 70% by weight or more.

However, if the content of the compound represented by General Formula (1) is too high, it relatively reduces the content of the thiol compound and the thietane compound containing no metal. From the viewpoint of improving the color of the resin and suppressing the reduction in mechanical strength, the content of the compound represented by General Formula (1) in the polymerizable composition is preferably 95% by weight or less.

Furthermore, if the polymerizable composition further includes the thietane compound containing no metal, the amount of the thiol compound used depends on the structure of the compound used and the structure or amount of the thietane compound containing no metal. However, since the compound represented by General Formula (1) provides a resin having a high refractive index, generally addition of a thiol compound leads to reduction in the refractive index of the obtained resin. Thus, from the viewpoint of the refractive index of the obtained resin, it is contained in an amount of preferably 35% by weight or less based on the total amount of the polymerizable composition of the present invention, more preferably 30% by weight or less, and even more preferably 25% by weight or less. From the viewpoint of the color of the obtained resin, the amount is preferably 2.5% by weight or more.

Furthermore, the polymerizable composition of the present invention may include one or two or more kinds of said components. For example, the polymerizable composition may include at least one of the compound having a carbon-carbon double bond, the iso(thio)cyanate compound, the epoxy compound and/or the episulfide compound, and the thietane compound containing no metal atom in the molecular structure, and sulfur as a monomer. In this case, the polymerizable composition can be polymerized to provide the obtained resin with a higher refractive index.

As for the amount of sulfur added, from the viewpoint of a high refractive index, if the amount of sulfur added is too low, the effect of improvement in the refractive indices is unfavorably low in some cases. Furthermore, if the amount of sulfur added as a monomer is too high fogging unfavorably occurs in some cases. Thus, the amount of sulfur added based on the total amount of the polymerizable composition of the present invention is preferably 5 to 50 parts by weight, and preferably 5 to 25 parts by weight.

Furthermore, from the viewpoint of better balance among the refractive index, the mechanical properties, and the color of the polymerizable composition of the present invention, the molar ratio of the thiol groups in the polymerizable composition may be 1 or more, based on the total the iso(thio)cyanate groups, the epoxy groups, the episulfide groups, the carbon-carbon double bonds, and the thietanyl groups in the thietane compound containing no metal atom. That is, the molar ratio expressed by SH groups/(NCO groups and/or NCS groups+epoxy groups+episulfide groups+carbon-carbon double bonds+thietanyl groups) may be 1 or more.

The polymerizable composition of the present invention includes the compound represented by General Formula (1) and the thiol compound as essential components, and further, it may contain a polymerization catalyst as described later.

In the present invention, since the compound represented by General Formula (1) includes a compound that does not require particularly a polymerization catalyst, and auto-catalytically proceeds polymerization reaction, the polymerization catalyst may be used, if desired.

In this case, as the compound represented by General Formula (1), the compound represented by General Formula (1) may be used singly, or a plurality of the different compounds may be used together.

The content of the compound represented by General Formula (1) in the total weight of the polymerizable compounds contained in the polymerizable composition of the present invention is not particularly limited, but it is usually 10% by weight or more, and from the viewpoint of the high refractive index, it is preferably 30% by weight or more, more preferably 50% by weight or more, and even more preferably 70% by weight or more.

Furthermore, the components other than the compound represented by General Formula (1) often decrease the refractive index of the resin obtained by using the polymerizable composition, and as a result, in order to obtain a resin having a high refractive index, it is preferable that the content of the compound represented by General Formula (1) in the total weight of the polymerizable compounds is 50% by weight or more.

The polymerization catalyst that is used, if necessary, in the present invention, can be cured usually by using a method as in the polymerization of a known thietane group-containing compound. The kind and amount of the polymerization catalyst, or the like to obtain a cured resin, and the kind and ratio of the monomers depend on the structure of the compound constituting the polymerizable composition. But, while not clearly defined, the kinds of the polymerization catalyst include amines, phosphines, organic acids and salts, esters, anhydrides thereof, inorganic acids, quaternary ammonium salts, quaternary phosphonium salts, tertiary sulfonium salts, secondary iodonium salts, Lewis acids, radical polymerization catalysts, and cationic polymerization catalysts are conventionally used.

Specific examples of the polymerization catalyst include aliphatic and aromatic tertiary amines such as triethylamine, tri-n-butylamine, tri-n-hexylamine, N,N-diisopropylethylamine, triethylenediamine, triphenylamine, N,N-dimethylethanolamine, N,N-diethylethanolamine, N,N-dibutylethanolamine, triethanolamine, N-ethyldiethanolamine, N,N-dimethylbenzylamine, N,N-diethylbenzylamine, tribenzylamine, N-methyldibenzylamine, N,N-dimethylcyclohexylamine, N,N-diethylcyclohexylamine, N,N-dimethylbutylamine, N-methyldicyclohexylamine, N,N-dicyclohexylmethylamine, N-methylmorpholine, N-isopropylmorpholine, pyridine, quinoline, N,N-dimethylaniline, N,N-diethylaniline, $\alpha$-, $\beta$- or $\gamma$-picoline, 2,2'-bipyridyl, 1,4-dimethylpiperazine, dicyandiamide, tetramethylethylenediamine, hexamethylenetetramine, 1,8-diazabicyclo(5,4,0)-7-undecene, and 2,4,6-tris(N,N-dimethylaminomethyl)phenol;

phosphines such as trimethylphosphine, triethylphosphine, tri-n-propylphosphine, triisopropylphosphine, tri-n-butylphosphine, triphenylphosphine, tribenzylphosphine, 1,2-bis(diphenylphosphino)ethane, and 1,2-bis(dimethylphosphino)ethane;

trihalogenoacetic acids, and esters, anhydrides and salts thereof, such as trifluoroacetic acid, trichloroacetic acid, trifluoroacetic anhydride, ethyl trifluoroacetate, and sodium trifluoroacetate;

p-toluenesulfonic acid;

methanesulfonic acid; trihalogenomethanesulfonic acids, and esters, anhydrides and salts thereof, such as trifluoromethanesulfonic acid, trifluoromethanesulfonic anhydride, ethyl trifluoromethanesulfonate, and sodium trifluoromethanesulfonate;

inorganic acids such as hydrochloric acid, sulfuric acid, and nitric acid;

quaternary ammonium salts such as tetramethylammonium chloride, tetrabutylammonium chloride, and tetrabutylammonium bromide;

quaternary phosphonium salts such as tetramethylphosphonium chloride, tetrabutylphosphonium chloride, and tetrabutylphosphonium bromide;

tertiary sulfonium salts, such as trimethylsulfonium bromide, and tributylsulfonium bromide;

secondary iodonium salts such as diphenyliodonium bromide;

dimethyltin dichloride, dibutyltin dichloride, dibutyltin dilaurate, dibutyltin diacetate, tetrachlorotin, dibutyltin oxide, diacetoxytetrabutyldistannoxane, zinc chloride, acetylacetone zinc, aluminum chloride, aluminum fluoride, triphenyl aluminum, acetylacetone aluminum, isopropoxide aluminum, tetrachlorotitanium and complexes thereof, tetraiodotitanium, titanium alkoxides such as dichlorotitanium diisopropoxide, and titanium isopropoxide; calcium acetate;

Lewis acids such as boron trihalides and complexes thereof, such as boron trifluoride, boron trifluoride complexes such as boron trihalide compounds such as boron trifluoride, boron trifluoride diethyl ether complex, boron trifluoride piperidine complex, boron trifluoride ethyleneamine complex, boron trifluoride acetic acid complex, boron trifluoride phosphoric acid complex, boron trifluoride t-butyl methyl ether complex, boron trifluoride dibutyl ether complex, boron trifluoride THF complex, boron trifluoride methyl sulfide complex, boron trifluoride phenol complex, and boron trichloride complexes;

radial polymerization catalysts such as 2,2'-azobis(2-cyclopropylpropionitrile), 2,2'-azobis(4-methoxy-2,4-dimethylvaleronitrile), 2,2'-azobis(2,4-dimethylvaleronitrile), t-butylperoxy-2-ethylhexanoate, n-butyl-4,4'-bis(t-butylperoxy)valerate, and t-butylperoxybenzoate and;

cationic polymerization catalysts such as diphenyliodonium hexafluorophosphate, diphenyliodonium hexafluoroarsenate, diphenyliodonium hexafluoroantimony, triphenylsulfonium tetrafluoroborate, triphenylsulfonium hexafluorophosphate, triphenylsulfonium hexafluoroarsenate, and (tolylcumyl)iodonium tetrakis(pentafluorophenyl)borate. However, the polymerization catalysts are not limited to these the exemplary compounds.

The polymerization catalyst may be used alone or in a mixture of two or more kinds thereof. A mixture of at least two types of polymerization catalysts having different reactivities is preferably used for improving the monomer handleability, and the optical physical properties, hue, transparency, and optical strain (striation) of the resultant resin in some cases.

Among the above compounds exemplified as the polymerization catalyst, preferred examples include organotin compounds such as dimethyltin dichloride, dibutyltin dichloride, dibutyltin dilaurate, dibutyltin diacetate, tetrachlorotin, dibutyltin oxide, and diacetoxytetrabutylstannoxane;

trihalogenoacetic acids, and esters, anhydrides and salts thereof, such as trifluoroacetic acid, trichloroacetic acid, trifluoroacetic anhydride, and ethyl trifluoroacetate, sodium trifluoroacetate;

p-toluenesulfonic acid, methanesulfonic acid, trihalogenomethanesulfonic acids, and esters, anhydrides and salts thereof, such as trifluoromethanesulfonic acid, trifluoromethanesulfonic anhydride, ethyl trifluoromethanesulfonate, and sodium trifluoromethanesulfonate;

Lewis acids such as boron trihalides and complexes thereof, such as boron trifluoride, boron trifluoride complexes such as boron trifluoride, boron trifluoride diethyl ether complex, boron trifluoride piperidine complex, boron trifluoride ethylamine complex, boron trifluoride acetic acid complex, boron trifluoride phosphoric acid complex, boron trifluoride t-butyl methyl ether complex, boron trifluoride dibutyl ether complex, boron trifluoride THF complex, boron trifluoride methyl sulfide complex, and boron trifluoride phenol complex, and boron trichloride and complexes thereof, and preferably dimethyltin dichloride, trifluoromethane, and esters, anhydrides and salts thereof, and various borotrifluoride complexes; and radical polymerization catalysts such as 2,2'-azobis(2-cyclopropylpropionitrile), 2,2'-azobis(4-methoxy-2,4-dimethylvaleronitrile), 2,2'-azobis(2,4-dimethylvaleronitrile), t-butylperoxy-2-ethyl hexanoate, n-butyl-4,4'-bis(t-butylperoxy)valerate, and t-butyl peroxybenzoate.

The polymerization catalyst of the polymerizable composition according to the present invention is added in a proportion of 0.0001 to 10% by weight, preferably 0.001 to 10% by weight, more preferably 0.01% by weight to 5% by weight, and most preferably 0.01% by weight to 1% by weight, based on the total amount of the polymerizable composition.

With the amount of the polymerization catalyst added in this range, a sufficiently cured resin can be produced, and a pot life can be maintained. Also, the obtained resin has good transparency and optical physical properties in some cases.

The polymerization catalyst may be added directly to the polymerizable compositions or some of the compounds thereof, or may be dissolved or dispersed in another compound and then added. In some cases, the polymerization catalyst is preferably dissolved or dispersed in another compound and then added, for obtaining good results in some cases. Furthermore, the polymerization catalyst is preferably added under a nitrogen atmosphere or a dry gas atmosphere for obtaining good results in some cases. In order to improve the performance of the resultant resin, the amount of the unreactive groups remaining in the resin is preferably 0.5% by weight or less, and more preferably 0.4% by weight or less, based on the total weight of the resin.

The polymerizable composition of the present invention may include other polymerizable compounds, in addition to the compound represented by General Formula (1), within the range not interfering with the desired effects of the present invention.

Examples of the polymerizable compound include various polymerizable monomers or polymerizable oligomers, known in the art. Examples thereof include a (meth)acrylic acid ester compound, a vinyl compound, an epoxy compound, an episulfide compounds, an oxetane compound, a thietane compound and the like.

The amount of the other polymerizable compounds occupied in the total weight of the polymerizable compounds contained in the polymerizable composition of the present invention is not particularly limited. But usually the refractive index becomes low by adding the other polymerizable compounds, it is usually not more than 90% by weight, preferably not more than 70% by weight, more preferably not more than 50% by weight, and further preferably not more than 30% by weight. Furthermore, if the polymerizable composition of the present invention includes other polymerizable compounds, the content of the other polymerizable compounds is not particularly limited in their lower limits.

As essential requirements for the polymerizable composition according to the present invention, the polymerizable composition includes the compound represented by General Formula (1) and the thiol compound.

For the purpose of following improvement of the resin obtained by curing the polymerizable composition or following improvement of handling ability thereof, it may be preferable to subject the polymerizable composition of the invention to means and operations that are generally used upon synthesizing organic compounds, such as purification or washing, thermal insulation, cold storage, filtration or depressurization treatment, or to add known compounds or the like as stabilizers or resin modifying agents. The improvement of the resin or the improvement of handling ability thereof includes further adjustment of the optical properties of the resin such as refractive index or Abbe number; the adjustment of various properties of the resin such as color, light resistance or weather resistance, heat resistance, impact resistance, hardness, specific gravity, linear expansion coefficient, polymerization shrinkage ratio, water absorbability, hygroscopicity, chemical resistance and viscoelasticity; the adjustment of transmittance or transparency; and the adjustment of the viscosity and handling ability of other storage or transportation method of the polymerizable composition. Examples of compounds added for improving stability such as long-term preservation stability, polymerization stability and thermal stability include a polymerization retardant, a polymerization inhibitor, a deoxidant, and an antioxidant.

Purification of the polymerizable composition is a means for improving the transparency of the resin produced by curing, or increasing the purity of the resin to improving the hue thereof. As a method for purifying the polymerizable composition containing the compound having the structure represented by Formula (1) of the present invention, any known method, for example, distillation, recrystallization, column chromatography (a silica gel method, an activated carbon method, an ion-exchange resin method, or the like), extraction, or the like, may be performed with any timing as long as the transparency and hue of the resin obtained by curing the purified composition are improved.

As a method for washing the polymerizable composition, a method for improving the transparency and hue of the resin obtained by curing may be used with timing when or after the synthesized polymerizable composition is taken out. In this method, the composition is washed with a polar and/or non-polar solvent to remove or reduce a resin transparency inhibitor, for example, an inorganic salt used for synthesizing the polymerizable composition or secondarily produced in synthesizing the composition, such as an ammonium salt, thiourea, or the like. Although the solvent used depends upon the polymerizable composition to be cleaned and the polarity of a solution containing the polymerizable composition, and is not limited, a solvent which can dissolve a component to be removed, and which is incompatible with the polymerizable composition to be cleaned and the solution containing the polymerizable composition is preferably used. The solvent may be used singly, or a mixture of at least two solvents may be used. Although the amount of a component to be removed depends upon the purpose and application, the amount is preferably as low as possible. The amount is preferably 5000 ppm or less, and more preferably 1000 ppm or less.

As a hot insulation, cold insulation or filtration method for the polymerizable composition, a method for improving the transparency and hue of the resin obtained by curing is generally used with timing when or after the synthesized polymerizable composition is taken out. In the hot insulation method, for example, when the polymerizable composition is crystallized to deteriorate handleability during storage, the polymerizable composition is melted by heating within a range causing no deterioration in the performance of the polymerizable composition and the resin obtained by curing the polymerizable composition. Although the heating temperature range and heat melting method depend upon the compound constituting the polymerizable composition to be handled and are not limited, the heating temperature is generally in a range of the solidification point+50° C., and preferably the solidification point+20° C. In this method, the composition may be melted by mechanically stirring with a stirring device or bubbling with an inert gas for moving an internal liquid. The cold insulation method is generally performed for improving the preservation stability of the polymerizable composition. However, when the composition has a high melting point and consideration must be given to the storage temperature in order to improve handleability after crystallization. Although the cold insulation temperature depends upon the structure and preservation stability of the compound constituting the polymerizable composition to be handled and is not limited, the polymerizable composition containing a compound having the structure represented by Formula (1) is typically required to be stored at a temperature no higher than a temperature that maintains stability of the polymerizable composition containing the compound represented by General Formula (1).

Furthermore, in the case where the polymerizable composition according to the present invention is a polymerizable composition used for optical applications, it is required to have high transparency, and thus typically it is preferable that the polymerizable composition is filtered with a filter having a small pore size. Although the pore size of the filter used is usually 0.05 to 10 μm, the pore size is preferably 0.05 to 5 μm, and more preferably 0.1 to 5 μm, from the viewpoint of operationality and performance. In many cases, filtration of the polymerizable composition containing the sulfur-containing cyclic compound of the present invention produces good results without exception. Although a low filtration temperature near the solidification temperature produces more desirable results in some cases, filtration is preferably performed at a temperature causing no trouble in the filtration work when solidification proceeds during filtration.

The reduced-pressure treatment is a means for removing a solvent, dissolved gas and odor which deteriorate the performance of the resin generally produced by curing the polymerizable composition. Since a dissolved solvent generally decreases the refractive index of the resultant resin and deteriorates the heat resistance thereof, the dissolved solvent must be removed as much as possible. Although the allowable amount of the dissolved solvent depends upon the structure of the compound constituting the polymerizable composition to be handled and the structure of the dissolved solvent and is not limited, the allowable amount is usually 1% or less, and preferably 5000 ppm or less. The dissolved gas inhibits polymerization or causes the problem of mixing bubbles in the resultant resin, and is thus preferably removed. Particularly, a moisture gas such as water vapor or the like is preferably removed by bubbling with a dry gas. The amount of the dissolved gas depends upon the structure of the compound constituting the polymerizable composition, the physical properties, structure and type of the dissolved gas.

Examples of the method for preparing the polymerizable composition of the present invention typically include a method including using a compound represented by General Formula (1) and a thiol compound, and other components such as sulfur as a monomer, and if necessary, using the above-described various known polymerizable compounds in combination, and then if necessary, adding the polymerization catalyst, mixing, and dissolving.

In curing and molding the polymerizable composition of the present invention, a known molding method may be used according to purposes, and various additives in addition to the above-described additives, such as a stabilizer, a resin modifier, a chain extender, a crosslinking agent, a photostabilizer including a HALS-type photostabilizer or the like, an ultraviolet light absorber including a benzotriazole ultraviolet light absorber or the like, an antioxidant including a hindered phenol antioxidant or the like, a coloring inhibitor, a dye or bluing agent including an anthraquinone disperse dye or the like, a filler, an external mold releasing agent including a silicone-based external mold releasing agent, or an internal mold releasing agent including a surfactant such as acidic phosphate, quaternary ammonium salt or quaternary phosphonium salt, and an adhesion improving agent may be used. Here, the internal mold releasing agent includes those that exhibit releasing effect among various additives as described above.

Although the amount of each of the additives which can be added depends upon the type, structure and effect of each additive and is not limited, the adding amount is usually in the range of 0.001% by weight to 10% by weight, and preferably 0.01 to 5% by weight, based on the total weight of the polymerizable composition. The amount of the dye added is preferably in the range of 1 ppb to 100 ppm, not in the above-described range. Within these ranges, a sufficiently cured resin can be produced, and the obtained resin has good transparency and optical physical properties in some cases.

Next, the resin according to the present invention will be described.

The resin and the optical part composed of such a resin according to the present invention are obtained by polymerization of said polymerizable composition. Furthermore, the method for preparing the resin according to the present invention involves a process for polymerization of the polymerizable composition according to the present invention. Such polymerization is suitably carried out according to various methods known in the art, used when producing plastic lenses. A typical method includes a casting polymerization.

Namely, the polymerizable composition of the present invention produced by the above method is degassed under a reduced pressure or filtered off, as required, and then the polymerizable composition is poured into a mold, and heated as required for carrying out polymerization. In this case, it is preferable to carry out polymerization by slowly heating from a low temperature to a high temperature.

The mold as described above is composed of, for example, two pieces of mirror surface-ground molds via a gasket made of polyethylene, an ethylene vinyl acetate copolymer, and polyvinyl chloride. Typical examples of the mold include, though not restricted to, combined molds such as glass and glass, glass and plastic plate, and glass and metal plate. The mold may comprise two pieces of molds fixed by a tape such as a polyester adhesive tape or the like. In addition, a known method such as the mold release process may be performed for the mold, as needed.

When carrying out casting polymerization, the polymerization temperature is affected by the polymerization conditions such as the kind of the polymerization initiator, and the like, and is not particularly limited. But, it is usually from −50° C. to 200° C., preferably from −20° C. to 170° C., and more preferably from 0 to 150° C.

The polymerization temperature affects the polymerization time, but it is usually from 0.01 to 200 hours and preferably from 0.05 to 100 hours. Polymerization can also be carried out in combination of several temperatures by conducting low temperature, temperature elevation, and temperature dropping as required.

Furthermore, the polymerizable composition of the present invention can be polymerized by applying the active energy line such as an electron beam, ultraviolet light, visible light or the like. At this time, a radical polymerization catalyst or a cationic polymerization catalyst for initiating polymerization by the active energy line is used, as required.

If the heat resistance of the obtained resin is too low, some problems, such as thermal deformation, in the use as glass lens in daily life occur in some cases. On the other hand, if the heat resistance of the obtained resin is too high, some problems such as resin intingibility of the resin occur in some cases. In consideration of tingibility, the heat resistance of the obtained resin preferably has a glass transition temperature (Tg) of 100° C. to 150° C.

Here, Tg is a temperature that is measured by a TMA (Thermal Mechanical Analysis) penetration method, from the cross-points in a TMA curve, which corresponds a heat distortion beginning temperature.

After the thus-obtained resin and the optical lens composed of the resin are cured, they may be subjected to an annealing process as required. Furthermore, for purposes of anti-reflection, high hardness grant, wear resistance improvement, anti-fogging property grant or fashionability grant, various known physical or chemical processes such as surface polishing, antistatic treatment, hard coat treatment, non-reflective coat treatment, anti-reflective treatment, tinting treatment, and photochromic treatment (for example, photochromic lens process), may be performed as needed.

Furthermore, for the optical lens including the obtained resin and the optical lens including the resin, if necessary, coating layers may be formed on either or both of the surfaces and used. Hereinbelow, the optical lens will be described by way of an example. Examples of the coating layer include a primer layer, a hard coat layer, an anti-reflection layer, an anti-fogging coat film layer, and an anti-fouling layer, a water-repellent layer. These coating layers may be used alone, respectively, or a plurality of coating layers may be formed into a multi-layer to be used. In the case of providing coating layers on both sides, the coating layers provided on each side may either be the same with or different from each other.

For those coating layers, there may be employed in combination known additive agents for the purpose of improving properties of lenses. In particular, an UV absorber for the purpose of protecting lenses or eyes from UV light, an IR absorber for the purpose of protecting eyes from infrared rays, a light stabilizer or antioxidant for the purpose of improving the weatherability of lenses, dye or pigment for the purpose of increasing fashionability of lenses, photochromic dye or photochromic pigment, an antistatic agent, and other known additives for improving the properties of lenses, respectively. Various leveling agents for improving the coatability may also be used for the layer which to be coated by application.

The primer layer is usually formed between after mentioned the hard coat layer and lenses. The primer layer is typically a coating layer provided for the purpose of improving the adhesiveness between the hard coat layer and lenses, and there may be a case where the impact resistance is also improved.

For the primer layer, any material can be used as long as it provides high adhesivity to the obtained optical lens, and usually employed are an urethane-based resin, an epoxy-based resin, a polyester-based resin, a melanin-based resin, a primer composition mainly including polyvinylacetal. For the purpose of adjusting the viscosity of the composition, an appropriate solvent can be used, which does not affect the lens, in the primer composition. Of course, the solvent may not be used.

The primer composition can be formed by either of an application process or a dry process. If the application process is used, a spin coat, a dip coat, or the like is applied on the lens by means of a known application process, and then solidified to form a primer layer. If the dry process is used, the primer layer is formed by means of a CVD process, a vacuum deposition process, or the like. In order to improve the adhesion when the primer layer is formed, if necessary, the surfaces of the lens may be subject to preliminary treatments such as alkali treatment, plasma treatment, and ultraviolet light treatment.

The hard coat layer is a coating layer provided for the purpose of giving functions such as an anti-scratching property, abrasion resistance, humidity resistance, hot-water resistance, heat resistance, and weather resistance, to the lens surface.

For the hard coat layer, an organosilicon compound having curing property, and a hard coat composition having at least one particulate oxide of element selected from the group consisting of Si, Al, Sn, Sb, Ta, Ce, La, Fe, Zn, W, Zr, In, and Ti and/or at least one particulate constituted of a composite oxide of two or more elements selected from the group consisting of those elements, are generally used. The fine particles composed of the oxide fine particles and/or the composite oxide may be used singly, or in combination of two or more kinds thereof in the hard coat composition. The hard coat composition preferably includes, in addition to said components, at least one selected from amines, amino acids, metal acetyl acetate complexes, organic acid salts, pechloric acids, pechloric acid salts, acids, metal chlorides, and polyfunctional epoxy compounds. For the hard coat composition, an appropriate solvent can be used, which does not affect the lens. Of course, the solvent may not be used.

The hard coat layer is usually formed by applying a hard coat composition using a known process such as spin coat, and dip coat, and then curing it. Examples of the curing process include a thermal curing process, a curing process using an energy ray such as an ultraviolet light and a visible light. In order to inhibit generation of the interference fringe, the refractive index of the hard coat layer is preferably in the range of the refractive index of the lens±0.1.

The antireflection layer is usually formed on said hard coat layer, if necessary. There are an inorganic type and an organic type for the antireflection layer, and the inorganic type is provided by the use of inorganic oxide such as $SiO_2$ and $TiO_2$ in accordance with the dry method such as a vacuum evaporation technique, a sputtering method, an ion plating method, an ion beam assist method, and a CVD method. The organic type is provided by the use of a composition which includes an organosilicon compound and a silica particle having internal cavity, in accordance with the wet method.

The anti-reflection layer may be a mono-layer or a multi-layer, and if it is used as a mono-layer, it is preferable that its refractive index is lower than that of the hard coat layer by at least 0.1 or more. In order to exhibit the anti-reflection function more effectively, a multi-layer is preferable as the anti-reflection layer. In this case, a layer having a low refractive index and a layer having a high refractive index are stacked alternately. Also, in this case, the difference in the refractive indices of the layer having a low refractive index and the layer having a high refractive index ex is preferably 0.1 or more. Examples of the layer having a high refractive index include $ZnO$, $TiO_2$, $CeO_2$, $Sb_2O_5$, $SnO_2$, $ZrO_2$, and $Ta_2O_5$ layer, and the film having a refractive index include a $SiO_2$ layer.

If necessary, an antifogging coat layer, an anti-staining layer, and a water-repellent layer may be further formed on the antireflection layer. As the means for forming the antifogging coat layer, the anti-staining layer, and the water-repellent layer, methods and materials for the treatment thereof, or the like are not particularly limited as long as it is within the scope of not adversely affecting the antireflection properties, and there may be employed a generally known antifogging coat treatment method, anti-staining treatment method, water-repellent treatment method, and materials.

For example, examples of the methods for anti-fogging coat and anti-fouling treatment include a method of covering a surface with a surfactant, a method of adding a hydrophilic layer on a surface to give absorptivity, a method of covering a surface with a fine unevenness to increase absorptivity, a method of using the activity of a photo-catalyst to give absorptivity, and a method of performing an ultra-water-repellency treatment to prevent attachment of water drops.

Furthermore, examples of the water-repellency treatment method include a method of forming a water-repellent treatment layer by deposition or sputtering with a fluorine-containing silane compound, or the like, and a method of dissolving a fluorine-containing silane compound in a solvent, and then performing coating to form a water-repellency treated layer.

In addition, the obtained resin, and optical lens composed of the resin may be tinted for a use with the use of a dye appropriate for the purpose so as to provide fashionability or photochromic property. Hereinbelow, the tinting of optical lens will be described by way of an example.

Tinting of the optical lens can be carried out in accordance with a generally known tinting method, and is carried out generally by the following methods:

(a) a method of immersing a lens in a dye liquid;

(b) a method of subjecting coating with the use of a coating agent containing a dye, or providing a coating layer which can be tinted and tinting the provided coating layer;

(c) a method of polymerizing monomer raw materials in which materials which can be tinted are contained;

(d) a method of heating a sublimation dye to allow sublimation;

or the like.

The method (a) is a method including immersing a lens material finished on a predetermined optical surface in a dye liquid in which the dye to be used is dissolved or uniformly dispersed (tinting process), and solidifying the dye on the lens by heating (annealing process after tinting), if necessary.

There are no particular limitations on the dye used in the tinting process and generally known dye can be used, but an oil-soluble dye or a disperse dye is usually used. The solvent used in the tinting process is not particularly limited as long as it is the solvent in which the dye to be used can be dissolved or uniformly dispersed therein.

In the tinting process, a surfactant for dispersing the dye in a dye liquid or a carrier which encourages tinting may also be employed, if necessary.

In the tinting process, a colorant and a surfactant that is added, if necessary, are dispersed in water, or a mixture of water and an organic solvent, to prepare a tinting bath. An optical lens is immersed in the tinting bath to perform tinting at a predetermined temperature for a predetermined time. The tinting temperature and time vary depending on the color density, but they are usually 120° C. or lower and several minutes to several decades, respectively. Tinting is performed at a concentration of the tinting bath of around 0.01 to 10% by weight. Furthermore, if it is difficult to tint, the tinting is performed under pressure. The annealing process, that is performed, if necessary, after tinting, is a process in which the tinted lens greige is subject to heat treatment. The heat treatment is, for example, an infrared heating treatment at an atmosphere, or a resistant heating treatment, thereby allowing a predetermined retention in an oven, after removing water remaining on the surface of the tinted lens greige in the tinting process with a solvent, or the like, or removing the solvent by blowing air. The annealing process after tinting prevents the tinted lens greige from decoloration (decoloration-preventing treatment), as well as remove the moisture penetrated into the inside of the lens greige upon tinting.

The method (b) is not for directly tinting a plastic lens material, and it is the method either including a process of coating a plastic lens with an organic coating liquid in which a dye is dispersed or dissolved and subjecting to a curing treatment to form a tinted coating layer on a lens surface, or a process of forming a coating layer which can be tinted on a plastic lens surface, and then performing the method (a), that is, immersing the plastic lens in a dye liquid, and subjecting to heating to be tinted.

The method (c) is a method including preliminarily dissolving a dye in monomer raw materials for a plastic lens and thereafter carrying out a polymerization. The dye to be used is not particularly limited as long as it can be uniformly dissolved or dispersed to the extent of not deteriorating the optical properties, in monomer raw materials.

As the method (d), there may be employed the following (d1) to (d3):

(d1) a method which includes sublimating a solid sublimation dye and tinting a plastic lens;

(d2) a method which includes facing a plastic lens to a substrate to which a solution containing a sublimation dye is applied in a non-contacting manner, and heating the substrate and the lens to allow tinting; or (d3) a method which includes transferring a colored layer containing a sublimation dye and a transfer layer comprising an adhesive layer to a plastic lens, and thereafter heating to allow tinting.

The resin of the invention and the optical lenses composed of the resin may be tinted in accordance with any of those methods. The dye to be used is not particularly limited as long as it is a dye having a sublimating property.

Also, the cured resin obtained by polymerization of the polymerizable composition of the present invention, and the optical members have high transparency, good heat resistance, and mechanical strength, while attaining a much higher refractive index (nd) exceeding 1.7.

Examples of the optical parts according to the present invention include various plastic lens such as such as a spectacle lens for vision correction, a lens for cameras, a fresnel lens for liquid crystal projectors, a lenticular lens, and a contact lens;

a sealing material for light emitting diodes (LED);
an optical waveguide;
an optical adhesive used for the junction of an optical lens or an optical waveguide;
an anti-reflection film to be used for optical lenses;
transparent coating or transparent substrate used for liquid crystal display members such as a substrate, a light guiding plate, a film, and a sheet.

As such, the resin obtained by polymerization of the polymerizable compound of the present invention has good transparency, and good heat resistance and mechanical strength, while attaining a very high refractive index (nd) exceeding 1.7, and is useful as a resin for optical parts such as, for example, plastic lens. Also, the polymerizable composition of the present invention is useful for a monomer raw material composition for a transparent resin having a high refractive index.

The embodiments of the present invention are described as above, but these are presented only for the illustrative purpose, and thus other modified constitutions can be employed.

For example, in the polymerizable composition of the present invention, as a metal thietane compound, the compound represented by General Formula (1) may be a compound represented by the following General Formula (9).

[Chemical Formula 12]

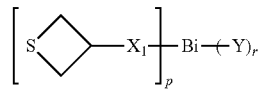

(9)

(in General Formula (9), p, $X_1$, and Y are each the same as p, $X_1$, and Y, respectively, in General Formula (1). r represents an integer of 0 to 4. p+r=5 or 3).

In General Formula (9), from the viewpoint of the improved refractive index of the resin, $X_1$ is preferably a sulfur atom.

In General Formula (9), p is an integer of the valence of Bi or less, and the valence of Bi is 3 or 5. That is, p is an integer of 1 to 5.

r is an integer of 0 to 4.

p+r is the valence of Bi, that is, 5 or 3. From the viewpoint of increased number of functional groups involving in the polymerization with the polymerizable compound in the polymerizable composition, p+r is preferably 5.

Furthermore, in General Formula (9), specifically, p is 3, and specifically, $X_1$ is a sulfur atom, p=3, and r=0. Here, the compound represented by General Formula (9) would be a compound represented by the following Formula.

[Chemical Formula 13]

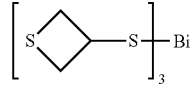

In General Formula (9), in case of r=1, Y represents an inorganic or organic residue. Further, in a case where r is an integer of 2 or greater, a plurality of Y's each independently represents an inorganic or organic residue. The plurality of Y may be the same group, or all or a part thereof may be different. Also, a plurality of Y's may be bonded to each other to form a ring containing a Bi atom.

If Y does not form a ring, specific examples of Y include an alkyl group having 1 to 3 carbon atom(s), such as a methyl group, an ethyl group, a propyl group, and an isopropyl group.

On the other hand, if Y forms a ring, examples of the alkyl chain forming a ring include an alkylene group having 1 to 3 carbon atom(s), such as a methylene group, an ethylene group, and a propylene group. Examples of the ring containing Bi specifically include 4- to 6-membered rings.

More specifically, if Y does not form a ring, Y is a methyl group, and if Y forms a ring, the alkyl chain forming a ring is an ethylene group.

The thietane compound represented by General Formula (9) is typically prepared in accordance with the method for preparing the compound represented by General Formula (1), in which a halide of Bi represented by the following General Formula (10) is reacted with a hydroxy compound containing a thietane group the following General Formula (11) or a thiol compound.

[Chemical Formula 14]

(10)

(in General Formula (10), p, r, and Y are the same as p, r, and Y in General Formula (9), and W represents a halogen atom).

[Chemical Formula 15]

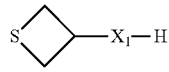
(11)

(in General Formula (11), $X_1$ is the same as $X_1$ in General Formula (9)).

The present invention also includes the following embodiments.

(1-1) A polymerizable composition comprising a compound represented by General Formula (1'):

[Chemical Formula 16]

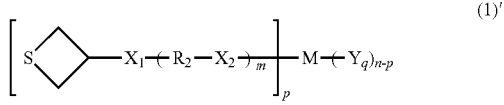
(1)'

(wherein M represents a metal atom, $X_1$ and $X_2$ each independently represents a sulfur atom or an oxygen atom, $R_1$ represents a divalent organic group, m represents an integer of 0 or 1 or greater, p represents an integer of 1 to n, q represents an integer of 1 to (n−p), n represents a valence of a metal atom M, Yq's each independently represents an inorganic or organic residue, and if q is 2 or greater, Yq's may be bonded to each other to form a ring structure with the intermediary of a metal atom M),
and a thiol compound;

(1-2) the polymerizable composition as set forth in (1-1), wherein the content of the thiol compound is 1 to 50% by weight;

(1-3) the polymerizable composition as set forth in (1-1) or (1-2), further containing sulfur;

(1-4) the polymerizable composition as set forth in (1-3), wherein the content of the thiol compound is 1 to 50% by weight, and the content of sulfur is 5 to 50% by weight;

(1-5) the polymerizable composition as set forth in any one of (1-1) to (1-4), wherein the metal atom is a Sn atom, a Si atom, a Zr atom, a Ge atom, a Ti atom, a Zn atom, an Al atom, a Fe atom, a Cu atom, a Pt atom, a Pb atom, an Au atom, or an Ag atom;

(1-6) the polymerizable composition as set forth in any one of (1-1) to (1-4), wherein the metal atom is a Sn atom, a Si atom, a Zr atom, a Ti atom, a Ge atom, an Al atom, a Pb atom, or a Zn atom;

(1-7) a resin obtained by polymerization of the polymerizable composition as set forth in any one of (1-1) to (1-6); and (1-8) optical part(s) composed of the resin as set forth in (1-7).

(2-1) A polymerizable composition including the compound represented by General Formula (1)', the thiol compound, and a compound having a carbon-carbon double bond;

(2-2) the polymerizable composition as set forth in (2-1), wherein the content of the compound represented by General Formula (1)' is 50% by weight or more;

(2-3) the polymerizable composition as set forth in (2-1) or (2-2), wherein the ratio of the functional groups (that is, SH groups/carbon-carbon double bonds) that is the ratio of the thiol groups in the thiol compound and the carbon-carbon double bonds in the compound having a carbon-carbon double bond is 1 or more;

(2-4) the polymerizable composition as set forth in any one of (2-1) to (2-3), wherein the metal atom is a Sn atom, a Si atom, a Zr atom, a Ge atom, a Ti atom, a Zn atom, an Al atom, a Fe atom, a Cu atom, a Pt atom, a Pb atom, an Au atom, or an Ag atom;

(2-5) the polymerizable composition as set forth in any one of (2-1) to (2-3), wherein the metal atom is a Sn atom, a Si atom, a Zr atom, a Ti atom, a Ge atom, an Al atom, a Pb atom, or a Zn atom;

(2-6) a resin obtained by polymerization of the polymerizable composition as set forth in any one of (2-1) to (2-5); and (2-7) an optical part (member) composed of the resin as set forth in (2-6).

(3-1) A polymerizable composition including the compound represented by General Formula (1)', the thiol compound, and an iso(thio)cyanate compound;

(3-2) the polymerizable composition as set forth in (3-1), wherein the content of the compound represented by General Formula (1)' is 50% by weight or more;

(3-3) the polymerizable composition as set forth in (3-1) or (3-2), wherein the ratio of the functional groups (that is, SH groups/(NCO groups+NCS groups)) that is the ratio of the thiol groups in the thiol compound and the iso(thio)cyanate groups in the iso(thio)cyanate compound is 1 or more;

(3-4) the polymerizable composition as set forth in any one of (3-1) to (3-3), wherein the metal atom is a Sn atom, a Si atom, a Zr atom, a Ge atom, a Ti atom, a Zn atom, an Al atom, a Fe atom, a Cu atom, a Pt atom, a Pb atom, an Au atom, or an Ag atom;

(3-5) the polymerizable composition as set forth in any one of (3-1) to (3-3), wherein the metal atom is a Sn atom, a Si atom, a Zr atom, a Ti atom, a Ge atom, an Al atom, a Pb atom, or a Zn atom;

(3-6) a resin obtained by polymerization of the polymerizable composition as set forth in any one of (3-1) to (3-5); and (3-7) an optical part (member) composed of the resin as set forth in (3-6).

(4-1) A polymerizable composition including the compound represented by General Formula (1)', the thiol compound, and an epoxy compound and/or an episulfide compound;

(4-2) the polymerizable composition as set forth in (4-1), wherein the content of the compound represented by General Formula (1)' is 50% by weight or more;

(4-3) the polymerizable composition as set forth in (4-1) or (4-2), wherein the ratio of the functional groups (SH groups/(epoxy groups+episulfide groups)) that is the ratio of the thiol groups in the thiol compound and the epoxy groups and/or episulfide groups in the epoxy compound and/or the episulfide compound is 1 or more;

(4-4) the polymerizable composition as set forth in any one of (4-1) to (4-3), wherein in the compound represented by General Formula (1)', m is 0;

(4-5) the polymerizable composition as set forth in any one of (4-1) to (4-3), wherein in the compound represented by General Formula (1)', m=0, and $X_1$ is a sulfur atom;

(4-6) the polymerizable composition as set forth in any one of (4-1) to (4-3), wherein in the compound represented by General Formula (1)', n=p, m=0, and $X_1$ is a sulfur atom;

(4-7) the polymerizable composition as set forth in any one of (4-1) to (4-6), wherein in the compound represented by General Formula (1)', the metal atom M is a Group 2B, 3B, 4A, or 4B element in a Periodic Table;

(4-8) the polymerizable composition as set forth in any one of (4-1) to (4-6), wherein in the compound represented by General Formula (1)', the metal atom M is a Sn atom;

(4-9) the polymerizable composition as set forth in any one of (4-1) to (4-8), wherein the thiol compound is any one of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

(4-10) the polymerizable composition as set forth in any one of (4-1) to (4-9), wherein the epoxy compound is any one of cyclohexanedimethanol diglycidyl ether, and bisphenol F/glycidyl ether;

(4-11) the polymerizable composition as set forth in any one of (4-1) to (4-9), wherein the episulfide compound is either bis(2,3-epithiopropyl)sulfide or bis(2,3-epithiopropyl)disulfide;

(4-12) a method for preparing a resin, including casting polymerization of the polymerizable composition as set forth in any one of (4-1) to (4-11);

(4-13) a resin obtained by polymerization of the polymerizable composition as set forth in any one of (4-1) to (4-11); and (4-14) an optical part composed of the resin as set forth in (4-13).

(5-1) A polymerizable composition including the compound represented by General Formula (1)', the thiol compound, and a thietane compound containing no metal represented by General Formula (8):

[Chemical Formula 17]

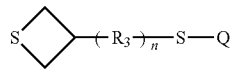

(8)

(wherein Q represents a reactive terminal group, a straight, branched or cyclic alkyl group having 1 to 10 carbon atom(s) that has a reactive terminal group, or its thia derivative, an aryl group, or an aralkyl group, $R_3$ represents a substituted or unsubstituted bivalent hydrocarbon group having 1 to 10 carbon atom(s), which may be thianated, and n represents an integer of 0 to 3);

(5-2) the polymerizable composition as set forth in (5-1), wherein the content of the compound represented by General Formula (1)' is 50% by weight or more;

(5-3) the polymerizable composition as set forth in (5-1) or (5-2), wherein the ratio of the functional groups (SH groups/thietanyl groups) that is the ratio of the thiol groups in the thiol compound and the thietanyl groups in the thietane compound containing no metal is 1 or more;

(5-4) the polymerizable composition as set forth in any one of (5-1) to (5-3), wherein in the compound represented by General Formula (1)', m is 0;

(5-5) the polymerizable composition as set forth in any one of (5-1) to (5-3), wherein in the compound represented by General Formula (1)', m=0, and $X_1$ is a sulfur atom;

(5-6) the polymerizable composition as set forth in any one of (5-1) to (5-3), wherein in the compound represented by General Formula (1)', n=p, m=0, and $X_1$ is a sulfur atom;

(5-7) the polymerizable composition as set forth in any one of (5-1) to (5-6), wherein in the compound represented by General Formula (1)', the metal atom M is a Group 2B, 3B, 4A, or 4B element in a Periodic Table;

(5-8) the polymerizable composition as set forth in any one of (5-1) to (5-6), wherein in the compound represented by General Formula (1)', the metal atom M is a Sn atom;

(5-9) the polymerizable composition as set forth in any one of (5-1) to (5-8), wherein the thiol compound is any one of 3-mercaptothietane, 4-mercaptomethyl-1,8-dimercapto-3,6-dithiaoctane, 4,8-dimercaptomethyl-1,11-dimercapto-3,6,9-trithiaundecane, and 2,5-bis(mercaptomethyl)-1,4-dithiane;

(5-10) the polymerizable composition as set forth in any one of (5-1) to (5-9), wherein the thietane compound containing no metal represented by General Formula (8) is bis(3-thietanyl)disulfide;

(5-11) (a method for preparing a resin, including casting polymerization of the polymerizable composition as set forth in any one of (5-1) to (5-10);

(5-12) a resin obtained by polymerization of the polymerizable composition as set forth in any one of (5-1) to (5-10); and (5-13) an optical part composed of the resin as set forth in (5-12).

EXAMPLES

Hereinafter, the present invention will be explained in more detail with reference to Preparation Examples and Examples, but is not limited thereto.

Furthermore, in the following Examples, the glass transition temperature (Tg) is a temperature that is measured by TaMA penetration method, and determined from a cross-points in a TMA curve, which corresponds a heat distortion beginning temperature.

Reference Preparative Example 1

3-Thietanol was synthesized in accordance with the method as described in Patent Document 3 (Japanese Patent Laid-Open No. 2003-327583).

Further, 3-mercaptothietane was synthesized using the obtained 3-thietanol. That is, 190 g of thiourea, 253 g of a 35% hydrochloric acid solution and 250 g of water were introduced into a reactor equipped with a stirrer and a thermometer, and stirred, while 156 g of 3-thietanol was added dropwise to the reaction solution over 1 hour. The resulting solution was stirred and reacted at 30° C. for 24 hours, and then 177 g of 24% ammonia water was added dropwise thereto over 1 hour. The solution was further reacted at 30° C. for 15 hours, and then allowed to stand for taking out an organic layer (lower layer) to obtain 134 g of a crude composition. The resulting crude composition was distilled off under a reduced pressure to collect a fraction with a boiling point of 40° C./106 Pa to obtain 3-mercaptothietane, as the desired product of a colorless transparent liquid.

Reference Preparative Example 2

Preparation of Compound Represented by Compound (CMPD). No. 1-1 in Table 1

11.15 g (0.105 mole) of 3-mercaptothietane was introduced to 50 g of pure water. Subsequently, 41.2 g (0.103 mole) of a 10% NaOH aqueous solution was introduced dropwise at room temperature over 40 minutes. Then, the reaction solution was subjected to a temperature elevation to 30° C. and 65.2 g (corresponding to 0.025 mole of tin tetrachloride) of an aqueous solution of 10% tin tetrachloride was added dropwise at the same temperature over 4 hours. After the dropwise addition was completed, the solution was further stirred at the same temperature for 2 hours. 100 ml of chloroform was added to the reaction mixture, and the organic layer and the water layer were separated. The organic layer was washed with 100 ml of pure water twice, and then dried over anhydrous sodium sulfate. The solvent was distilled off from the extract to obtain 13.40 g (yield: 99%) of a compound represented by the Compound No. 1-1 in Table 1.

[Chemical Formula 18]

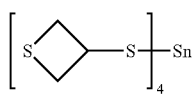

(CMPD·No.1-1)

(Preparation of Polymerizable Composition, and Preparation of the Article with Resin Curing by Polymerization)

The physical properties of the resin or the optical part (lens) prepared in the following Examples and Comparative Examples were tested in accordance with the following methods.

Appearance: Transparency and presence or absence of optical strain were investigated with naked eyes, and with microscopy.

Refractive Index (ne): Refractive index was measured with the use of a Pulfrich refractometer at 20° C.

Heat Resistance Glass transition temperature (Tg) was measured by a TMA penetration method. The case where Tg was 80° C. or higher evaluated as "o", and the case where Tg was lower than 80° C. evaluated as "x".

Strength: A steel ball was dropped on a lens having a central thickness of 1.3 mm. Specifically, 8 g of the steel ball was dropped on a lens from a height of 127 cm. The lens that was not scattered was evaluated as "o", and the lens that was scattered or penetrated with the steel ball was evaluated as "x".

Color: Yellow index (YI) of a flat plate having a thickness of 2 mm was measured in accordance with ASTM D1925 using a Gretagmacbeth spectrophotometer CE-7000 A.

Example 1-1

95 parts by weight of the compound represented by CMPD. No. 1-1 in Table 1, that had been prepared in Reference Preparative Example 2, and 5 parts by weight of 3-mercaptothietane (thiol compound A) as a thiol compound were charged into a glass beaker at 40° C. The mixture was filtered through a Teflon (trade name) filter without addition of a polymerization catalyst, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 60° C. to 120° C.

The molded piece of the obtained resin had good transparency and good appearance with no strain. The evaluation results of the obtained resin are presented in Table 19.

Examples 1-2 to 1-11

The same operation as in Example 1-1 was carried out, except that the formulation of the polymerizable composition was changed into the composition as shown in Table 19. The composition and the evaluation results of the obtained resin are presented in Table 19.

Comparative Example 1-1

100 parts by weight of the compound represented by CMPD. No. 1-1 in Table 1, that had been prepared in Reference Preparative Example 2, was charged into a glass beaker at 60° C., filtered through a Teflon (trade name) filter without addition of a polymerization catalyst, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 70° C. to 120° C.

The molded piece of the obtained resin had good transparency and good appearance with no strain, but was yellowed. The evaluation results of the obtained resin are presented in Table 19.

TABLE 19

| | Composition (parts by weight) | | | Evaluation Items | | | | |
|---|---|---|---|---|---|---|---|---|
| | Compound represented by General Formula (1) | Thiol compound | Sulfur | Refractive index (ne) | Heat resistance | Strength | Color | Appearance |
| Example 1-1 | No1-1 (95) | A (5) | | 1.792 | o | o | 12 | Transparent, no strain |
| Example 1-2 | No1-1 (95) | B (5) | | 1.788 | o | o | 10 | Transparent, no strain |
| Example 1-3 | No1-1 (95) | C (5) | | 1.787 | o | o | 11 | Transparent, no strain |
| Example 1-4 | No1-1 (90) | A (10) | | 1.786 | o | o | 8 | Transparent, no strain |
| Example 1-5 | No1-1 (90) | B (10) | | 1.783 | o | o | 6 | Transparent, no strain |
| Example 1-6 | No1-1 (90) | D (10) | | 1.785 | o | o | 8 | Transparent, no strain |

TABLE 19-continued

| | Composition (parts by weight) | | | Evaluation Items | | | | |
|---|---|---|---|---|---|---|---|---|
| | Compound represented by General Formula (1) | Thiol compound | Sulfur | Refractive index (ne) | Heat resistance | Strength | Color | Appearance |
| Example 1-7 | No1-1 (90) | A (5) B (5) | | 1.783 | ○ | ○ | 7 | Transparent, no strain |
| Example 1-8 | No1-1 (90) | A (5) C (5) | | 1.783 | ○ | ○ | 8 | Transparent, no strain |
| Example 1-9 | No1-1 (85) | A (5) B (10) | | 1.776 | ○ | ○ | 5 | Transparent, no strain |
| Example 1-10 | No1-1 (85) | A (10) B (5) | | 1.776 | ○ | ○ | 4 | Transparent, no strain |
| Example 1-11 | No1-1 (90) | A (5) | (5) | 1.799 | ○ | ○ | 12 | Transparent, no strain |
| Comparative Example 1-1 | No1-1 (100) | | | 1.797 | ○ | x | 37 | Transparent, no strain |

Furthermore, Table 19 shows the thiol compounds used in each Example using the following abbreviations.
A: 3-Mercaptothietane
B: 4-Mercaptomethyl-1,8-dimercapto-3,6-dithiaoctane
C: 4,8-Dimercaptomethyl-1,11-dimercapto-3,6,9-trithiaundecane
D: 2,5-Bis(mercaptomethyl)-1,4-dithiane The physical properties of the resin and optical parts (lens) prepared in the following Examples and Comparative Examples were tested in accordance with the following methods.

Appearance: Transparency and presence or absence of optical strain were investigated with naked eyes, and with microscopy.

Refractive Index Refractive index was measured with the use of a Pulfrich refractometer at 20° C.

Color: Yellow index (YI) of a flat plate having a thickness of 2 mm was measured in accordance with ASTM D1925 using a Gretagmacbeth spectrophotometer CE-7000 A.

Example 2-1

75 parts by weight of the compound represented by CMPD. No. 1-1 in Table 1, that had been prepared in Reference Preparative Example 2, 13 parts by weight of 4-mercaptomethyl-1,8-dimercapto-3,6-dithiaoctane (thiol compound A) as a thiol compound, 12 parts by weight of triallyl isocyanurate (TAIC) as a compound having a carbon-carbon double bond, and 0.02 part by weight of t-butylperoxy-2-ethylhexanoate (PBO) as a polymerization catalyst were charged into a glass beaker at 40° C. The mixture was filtered through a Teflon (trade name) filter manufactured, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 60° C. to 120° C.

The molded piece of the obtained resin had good transparency and good appearance with no strain. The evaluation results of the obtained resin are presented in Table 20.

Examples 2-2 to 2-4

The same operation as in Example 2-1 was carried out, except that the formulation of the polymerizable composition was changed into the composition as shown in Table 20. The composition and the evaluation results of the obtained resin are presented in Table 20.

Comparative Example 2-1

100 parts by weight of the compound represented by CMPD. No. 1-1 in Table 1, that had been prepared in Reference Preparative Example 2, was charged into a glass beaker at 60° C., filtered through a Teflon (trade name) filter without addition of a polymerization catalyst, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 70° C. to 120° C.

The molded piece of the obtained resin had good transparency and good appearance with no strain, but was yellowed. The composition and the evaluation results of the obtained resin are presented in Table 20.

TABLE 20

| | Composition (parts by weight) | | | | Ratio of functional groups (SH groups/double bonds) | Evaluation Items | | | |
|---|---|---|---|---|---|---|---|---|---|
| | Compound represented by General Formula (1) | Thiol compound | Compound having carbon-carbon bonds | Polymerization catalyst | | Refractive index (ne) | Heat resistance | Color | Appearance |
| Example 2-1 | No1-1 (75) | A (13) | TAIC(12) | PBO(0.01) | 1/1 | 1.758 | ○ | 12 | Transparent, no strain |

TABLE 20-continued

| | Composition (parts by weight) | | | | Evaluation Items | | | |
|---|---|---|---|---|---|---|---|---|
| | Compound represented by General Formula (1) | Thiol compound | Compound having carbon-carbon bonds | Polymerization catalyst | Ratio of functional groups (SH groups/double bonds) | Refractive index (ne) | Heat resistance | Color | Appearance |
| Example 2-2 | No1-1 (75) | A (17) | TAIC(8) | PBO(0.01) | 2/1 | 1.763 | ○ | 9 | Transparent, no strain |
| Example 2-3 | No1-1 (80) | A (14) | TAIC(6) | PBO(0.01) | 2/1 | 1.767 | ○ | 10 | Transparent, no strain |
| Example 2-4 | No1-1 (80) | B (14) | TAIC(6) | PBO(0.01) | 2/1 | 1.768 | ○ | 10 | Transparent, no strain |
| Comparative Example 2-1 | No1-1 (100) | 0 | 0 | 0 | — | 1.797 | ○ | 37 | Transparent, no strain |

Furthermore, in Table 20, the following abbreviations were used.

A: 4-Mercaptomethyl-1,8-dimercapto-3,6-dithiaoctane
B: 4,8-Dimercaptomethyl-1,11-dimercapto-3,6,9-trithiaundecane
TAIC: Triallyl isocyanurate
PBO: t-Butylperoxy-2-ethylhexanoate The physical properties of the resin and the optical parts (lens) prepared in the following Examples and Comparative Examples were tested in accordance with the following methods.

Appearance: Transparency and presence or absence of optical strain were investigated with naked eyes, and with microscopy.

Refractive Index: Refractive index was measured with the use of a Pulfrich refractometer at 20° C.

Strength: A steel ball was dropped on a lens having a central thickness of 1.3 mm. Specifically, 8 g of the steel ball was dropped on a lens from a height of 127 cm. The lens that was not scattered was evaluated as "o", and the lens that was scattered or penetrated with the steel ball was evaluated as "x".

Color: Yellow index (YI) of a flat plate having a thickness of 2 mm was measured in accordance with ASTM D1925 using a Gretagmacbeth spectrophotometer CE-7000 A.

Example 3-1

80 parts by weight of the compound represented by CMPD. No. 1-1 in Table 1, that had been prepared in Reference Preparative Example 2, 12 parts by weight of 3-mercaptothietane (thiol compound A) as a thiol compound, and 8 parts by weight of bis(isocyanatomethyl)bicyclo[2.2.1]heptane (NBDI) as an isocyanate compound were charged into a glass beaker at 40° C. The mixture was filtered through a Teflon (trade name) filter without addition of a polymerization catalyst, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 60° C. to 120° C.

Furthermore, NBDI used in this Example is a mixture of 2,5-bis(isocyanatomethyl)bicyclo[2.2.1]heptane and 2,6-bis(isocyanatomethyl)bicyclo[2.2.1]heptane.

The molded piece of the obtained resin had good transparency and good appearance with no strain. The evaluation results of the obtained resin are presented in Table 21.

Examples 3-2 to 3-8

The same operation as in Example 3-1 was carried out, except that the formulation of the polymerizable composition was changed into the composition as shown in Table 21. The composition and the evaluation results of the obtained resin were presented in Table 21.

Comparative Example 3-1

100 parts by weight of the compound represented by CMPD. No. 1-1 in Table 1, that had been prepared in Reference Preparative Example 2, was charged into a glass beaker at 60° C., filtered through a Teflon (trade name) filter without addition of a polymerization catalyst, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 70° C. to 120° C.

The molded piece of the obtained resin had good transparency and good appearance with no strain, but was yellowed. The evaluation results of the obtained resin are presented in Table 21.

TABLE 21

| | Composition (parts by weight) | | | | Evaluation Items | | | | |
|---|---|---|---|---|---|---|---|---|---|
| | Compound represented by General Formula (1) | thiol compound | isocyanate compound | Ratio of functional groups (SH groups/NCO groups) | Refractive index (ne) | Heat resistance | Strength | Color | Appearance |
| Example 3-1 | No1-1 (80) | A (12) | NBDI (8) | 3/2 | 1.761 | ○ | ○ | 10 | Transparent, no strain |

TABLE 21-continued

| | Composition (parts by weight) | | | | Evaluation Items | | | | |
|---|---|---|---|---|---|---|---|---|---|
| | Compound represented by General Formula (1) | thiol compound | | isocyanate compound | Ratio of functional groups (SH groups/NCO groups) | Refractive index (ne) | Heat resistance | Strength | Color | Appearance |
| Example 3-2 | No1-1 (80) | B (11) | | NBDI (9) | 3/2 | 1.753 | o | o | 8 | Transparent, no strain |
| Example 3-3 | No1-1 (80) | C (12) | | NBDI (8) | 3/2 | 1.759 | o | o | 9 | Transparent, no strain |
| Example 3-4 | No1-1 (90) | A (4) | B (2) | NBDI (4) | 3/2 | 1.775 | o | o | 15 | Transparent, no strain |
| Example 3-5 | No1-1 (90) | A (2) | B (4) | NBDI (4) | 3/2 | 1.776 | o | o | 14 | Transparent, no strain |
| Example 3-6 | No1-1 (80) | A (7) | B (4) | NBDI (9) | 3/2 | 1.755 | o | o | 9 | Transparent, no strain |
| Example 3-7 | No1-1 (75) | A (15) | | NBDI (10) | 3/2 | 1.751 | o | o | 12 | Transparent, no strain |
| Example 3-8 | No1-1 (75) | A (6) | B (9) | NBDI (10) | 3/2 | 1.755 | o | o | 8 | Transparent, no strain |
| Comparative Example 3-1 | No1-1 (100) | | | | | 1.797 | o | x | 37 | Transparent, no strain |

Furthermore, in Table 21, the following abbreviations were used.
A: 3-Mercaptothietane
B: 4-Mercaptomethyl-1,8-dimercapto-3,6-dithiaoctane
C: 2,5-Bis(mercaptomethyl)-1,4-dithiane
NBDI: Bis(isocyanatomethyl)bicyclo[2.2.1]heptane (a mixture of 2,5-bis(isocyanatomethyl)bicyclo[2.2.1]heptane and 2,6-bis(isocyanatomethyl)bicyclo[2.2.1]heptane).

The physical properties of the resin and the optical parts (lens) prepared in the following Examples (Examples 4-1 to 4-8) and Comparative Examples were tested in accordance with the following methods.

Appearance: Transparency and presence or absence of optical strain were investigated with naked eyes, and with microscopy.

Refractive Index Refractive index was measured with the use of a Pulfrich refractometer at 20° C.

Heat Resistance Tg was measured by a TMA penetration method. The case where Tg was 80° C. or higher evaluated as "o", and the case where Tg was lower than 80° C. evaluated as "x".

Strength: A steel ball was dropped on a lens having a central thickness of 1.3 mm. Specifically, 8 g of the steel ball was dropped on a lens from a height of 127 cm. The lens that was not scattered was evaluated as "o", and the lens that was scattered or penetrated with the steel ball was evaluated as "x".

Color: Yellow index (YI) of a flat plate having a thickness of 2 mm was measured in accordance with ASTM D1925 using a Gretagmacbeth spectrophotometer CE-7000 A.

Example 4-1

85 parts by weight of the compound represented by CMPD. No. 1-1 in Table 1, that had been prepared in Reference Preparative Example 2, 6 parts by weight of 4-mercaptomethyl-1,8-dimercapto-3,6-dithiaoctane (thiol compound A) as a thiol compound, and 9 parts by weight of cyclohexanedimethanol diglycidyl ether(CHDMDG) as an epoxy compound were charged into a glass beaker at 40° C. The mixture was filtered through a Teflon (trade name) filter without addition of a polymerization catalyst, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 60° C. to 120° C.

The molded piece of the obtained resin had good transparency and good appearance with no strain. The evaluation results of the obtained resin are presented in Table 22.

Examples 4-2 to 4-8

The same operation as in Example 4-1 was carried out, except that the formulation of the polymerizable composition was changed into the composition as shown in Table 22. The composition and the evaluation results of the obtained resin are presented in Table 22.

Comparative Example 4-1

100 parts by weight of the compound represented by CMPD. No. 1-1 in Table 1, that had been prepared in Reference Preparative Example 2, was charged into a glass beaker at 60° C., filtered through a Teflon (trade name) filter without addition of a polymerization catalyst, and then sufficiently degassed until all bubbling had ceased under a reduced pressure of 1.3 kPa or less. The degassed polymerizable composition was injected into a mold formed by a glass mold and a tape, and placed in a heating oven to perform polymerization for 20 hours. During the polymerization, the inner temperature of the oven was gradually increased from 70° C. to 120° C.

The molded piece of the obtained resin had good transparency and good appearance with no strain, but was yellowed. The evaluation results of the obtained resin are presented in Table 22.

TABLE 22

| | Composition (parts by weight) | | | | Evaluation Items | | | | |
|---|---|---|---|---|---|---|---|---|---|
| | Compound represented by General Formula (1) | Thiol compound | Epoxy compound | Ratio of functional groups (SH groups/epoxy group) | Refractive index (ne) | Heat resistance | Strength | Color | Appearance |
| Example 4-1 | No1-1 (85) | A (6) | CHDMDG(9) | 1/1 | 1.754 | ○ | ○ | 12 | Transparent, no strain |
| Example 4-2 | No1-1 (80) | A (12) | CHDMDG(8) | 2/1 | 1.750 | ○ | ○ | 10 | Transparent, no strain |
| Example 4-3 | No1-1 (80) | A (11) | DGBF(9) | 2/1 | 1.761 | ○ | ○ | 11 | Transparent, no strain |
| Example 4-4 | No1-1 (80) | B (11) | DGBF(9) | 2/1 | 1.760 | ○ | ○ | 11 | Transparent, no strain |
| Example 4-5 | No1-1 (80) | A (10) | DGBA (10) | 2/1 | 1.755 | ○ | ○ | 12 | Transparent, no strain |
| Example 4-6 | No1-1 (80) | B (12) | DGBF(8) | 5/2 | 1.762 | ○ | ○ | 10 | Transparent, no strain |
| Example 4-7 | No1-1 (80) | C(10) | CHDMDG(10) | 2/1 | 1.758 | ○ | ○ | 11 | Transparent, no strain |
| Example 4-8 | No1-1 (80) | A (5), B (5) | DGBF (10) | 2/1 | 1.760 | ○ | ○ | 11 | Transparent, no strain |
| Comparative Example 4-1 | No1-1 (100) | | | | 1.797 | ○ | x | 37 | Transparent, no strain |

Furthermore, in Table 22, the following abbreviations were used.

A: 4-Mercaptomethyl-1,8-dimercapto-3,6-dithiaoctane

B: 4,8-Dimercaptomethyl-1,11-dimercapto-3,6,9-trithiaundecane

C: Mercaptoethyl sulfide

CHDMDG: Cyclohexanedimethanol diglycidyl ether

DGBF: Bisphenol F/diglycidyl ether

DGBA: Bisphenol A/diglycidyl ether

The physical properties (refractive index, Abbe's number), heat resistance, color, and mechanical properties of the resin prepared in the following Examples (Examples 4-9 to 4-11) and Comparative Examples were tested in accordance with the following methods.

Refractive Index (ne) and Abbe's Number (ve): Refractive index and Abbe's number were respectively measured with the use of a Pulfrich refractometer at 20° C.

Heat Resistance: Tg (° C.) by a TMA penetration method (50 g load, pin tip of 0.5 mmϕ, rate of temperature increase of 10° C./min) was determined as the heat resistance.

Color: The YI, a*, and b* values of the resin made into a flat plate having a thickness of 5 mm was measured by using a Colorimeter (CR-200) manufactured by Minolta Co., Ltd.

3-Point bending test: 3-Point bending strength was measured by using Autograph AGS-J manufactured by Shimadzu Corporation.

Example 4-9

75 parts by weight of the compound represented by CMPD. No. 1-1 in Table 1, that had been prepared in Reference Preparative Example 2, 12.5 parts by weight of 3-mercaptothietane (thiol compound A) as a thiol compound, and 12.5 parts by weight of bis(2,3-epithiopropyl)disulfide as an episulfide compound were heated, mixed, and dissolved at 75° C. Then, the mixture was filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 46 hours. During the polymerization, the inner temperature of the oven was gradually increased from 70° C. to 130° C.

The molded piece of the obtained resin had good transparency and good appearance with no strain. The evaluation results of the obtained resin are presented in Table 23.

Examples 4-10 to 4-12

The same operation as in Example 4-9 was carried out, except that the formulation of the polymerizable composition was changed into the composition as shown in Table 23. The composition and the evaluation results of the obtained resin are presented in Table 23.

Comparative Example 4-2

100 parts by weight of the compound represented by CMPD. No. 1-1 in Table 1, that had been prepared in Reference Preparative Example 2, was heated, mixed, dissolved at 85° C., filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 22 hours. During the polymerization, the inner temperature of the oven was gradually increased from 85° C. to 130° C.

The molded piece of the obtained resin had good transparency and good appearance with no strain. The evaluation results of the obtained resin are presented in Table 23.

TABLE 23

| | Composition (parts by weight) | | | | Evaluation Items | | | | | | | | |
|---|---|---|---|---|---|---|---|---|---|---|---|---|---|
| | Compound represented by General Formula (1) | thiol compound | episulfide compound | Ratio of functional groups (SH groups/ episulfide groups) | Optical properties | | Heat resistance | | | Resin color | | 3-Point bending test | |
| | | | | | Refractive index | Abbe's Number | Tg (° C.) | Distortion beginning temperature (° C.) | YI | a* | b* | Strain at max. point (N/mm²) | Max. shift (mm) |
| Example 4-9 | No1-1 (75) | D (12.5) | ETDS(12.5) | 1/1 | 1.775 | 26.9 | 116.9 | 94.2 | 25.5 | −5.59 | 15.72 | 145.3 | 2.48 |
| Example 4-10 | No1-1 (75) | A (12.5) | ETDS(12.5) | 1.2/1 | 1.773 | 27.2 | 90.0 | 71.8 | 19.4 | −3.97 | 11.54 | 151.0 | 2.55 |
| Example 4-11 | No1-1 (75) | B (12.5) | ETDS(12.5) | 1.1/1 | 1.773 | 27.0 | 94.7 | 75.2 | 20.0 | −4.10 | 11.89 | 125.0 | 2.09 |
| Example 4-12 | No1-1 (86) | D (7) | ETDS(7) | 1/1 | 1.785 | 25.7 | 142.7 | 125.1 | 28.7 | −6.16 | 17.86 | 83.2 | 1.30 |
| Comparative Example 4-2 | No1-1 (100) | | | | 1.802 | 24.1 | 171.2 | 155.2 | 77.8 | −15.04 | 61.19 | 33.8 | 0.29 |

Furthermore, in Table 23, the following abbreviations were used.

A: 4-Mercaptomethyl-1,8-dimercapto-3,6-dithiaoctane
B: 4,8-Dimercaptomethyl-1,11-dimercapto-3,6,9-trithiaundecane
D: 3-Mercaptothietane
ETDS: Bis(2,3-epithiopropyl)disulfide The physical properties (refractive index, Abbe's number), heat resistance, color, and mechanical properties of the resin prepared in the following Examples and Comparative Examples were tested in accordance with the following methods.

Refractive Index (ne) and Abbe's Number (ve): Refractive index and Abbe's number were respectively measured with the use of a Pulfrich refractometer at 20° C.

Heat Resistance: Tg (° C.) by a TMA penetration method (50 g load, pin tip of 0.5 mmϕ, rate of temperature increase of 10° C./min) was determined as the heat resistance.

Color: The YI, a*, and b* values of the resin made into a flat plate having a thickness of 5 mm was measured by using a Colorimeter (CR-200) manufactured by Minolta Co., Ltd.

3-Point bending test: 3-Point bending strength was measured by using Autograph AGS-J manufactured by Shimadzu Corporation.

Example 5-1

85 parts by weight of the compound represented by CMPD. No. 1-1 in Table 1, that had been prepared in Reference Preparative Example 2, 7.5 parts by weight of 4-mercaptomethyl-1,8-dimercapto-3,6-dithiaoctane (thiol compound A) as a thiol compound, and 7.5 parts by weight of bis(3-thietanyl)disulfide as a thietane compound containing no metal were heated, mixed, and dissolved at 75° C. Then, the mixture was filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 46 hours. During the polymerization, the inner temperature of the oven was gradually increased from 70° C. to 130° C.

The molded piece of the obtained resin had good transparency and good appearance with no strain. The evaluation results of the obtained resin are presented in Table 24.

Examples 5-2 to 5-3

The same operation as in Example 5-1 was carried out, except that the formulation of the polymerizable composition was changed into the composition as shown in Table 24. The composition and the evaluation results of the obtained resin are presented in Table 24.

Comparative Example 5-1

100 parts by weight of the compound represented by CMPD. No. 1-1 in Table 1, that had been prepared in Reference Preparative Example 2, was heated, mixed, dissolved at 85° C., filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 22 hours. During the polymerization, the inner temperature of the oven was gradually increased from 85° C. to 130° C.

The molded piece of the obtained resin had good transparency and good appearance with no strain. The evaluation results of the obtained resin are presented in Table 24.

TABLE 24

| | Composition (parts by weight) | | | | Evaluation Items | | | | | | | | |
|---|---|---|---|---|---|---|---|---|---|---|---|---|---|
| | | | | Ratio of functional groups (SH groups/ episulfide group) | Optical properties | | | Heat resistance | | | | | 3-Point bending test | |
| | | | | | | | | Distortion | | | | | Strain | |
| | Compound represented by General Formula (1) | thiol compound | thietane compound containing no metal | | refractive index | Abbe's Number | Tg (° C.) | beginning temperature (° C.) | Resin color | | | at max. point (N/mm²) | Max. shift (mm) |
| | | | | | | | | | YI | a* | b* | | |
| Example 5-1 | No1-1 (85) | A (7.5) | TES(7.5) | 1.2/1 | 1.784 | 26.1 | 123.0 | 101.2 | 23.2 | −3.91 | 13.37 | 77.5 | 0.85 |
| Example 5-2 | No1-1 (85) | A (10) | TES(5) | 2.4/1 | 1.782 | 26.2 | 113.2 | 95.3 | 19.4 | −3.16 | 11.01 | 62.2 | 0.78 |
| Example 5-3 | No1-1 (85) | B (7.5) | TES(7.5) | 1.1/1 | 1.785 | 26.1 | 131.6 | 109.9 | 24.8 | −4.47 | 14.51 | 77.6 | 0.87 |
| Comparative Example 5-1 | No1-1 (100) | | | | 1.802 | 24.1 | 171.2 | 155.2 | 77.8 | −15.04 | 61.19 | 33.8 | 0.29 |

Furthermore, in Table 24, the following abbreviations were used.

A: 4-Mercaptomethyl-1,8-dimercapto-3,6-dithiaoctane

B: 4,8-Dimercaptomethyl-1,11-dimercapto-3,6,9-trithiaundecane

TES: Bis(3-thietanyl)disulfide

The physical properties (refractive index, Abbe's number), heat resistance, color, and mechanical properties of the resin prepared in the following Examples and Comparative Examples were tested in accordance with the following methods.

Refractive Index (ne) and Abbe's Number (ve): Refractive index and Abbe's number were respectively measured with the use of a Pulfrich refractometer at 20° C.

Heat Resistance: Tg (° C.) by a TMA penetration method (50 g load, pin tip of 0.5 mmϕ, rate of temperature increase of 10° C./min) was determined as the heat resistance.

Color: The YI, a*, and b* values of the resin made into a flat plate having a thickness of 5 mm was measured by using a Colorimeter (CR-200) manufactured by Minolta Co., Ltd.

3-Point bending test: 3-Point bending strength was measured by using Autograph AGS-J manufactured by Shimadzu Corporation.

Comparative Example 6-1

100 parts by weight of the compound represented by CMPD. No. 1-1 in Table 1, that had been prepared in Reference Preparative Example 2, heated, mixed, dissolved at 85° C., filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 22 hours. During the polymerization, the inner temperature of the oven was gradually increased from 85° C. to 130° C.

The molded piece of the obtained resin had good transparency and good appearance with no strain. The evaluation results of the obtained resin are presented in Table 25.

Example 6-1

85 parts by weight of the compound represented by CMPD. No. 1-1 in Table 1, that had been prepared in Reference Preparative Example 2, and 15 parts by weight of 4-mercaptomethyl-1,8-dimercapto-3,6-dithiaoctane (thiol compound A) as a thiol compound were heated, mixed, and dissolved at 75° C. Then, the mixture was filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 46 hours. During the polymerization, the inner temperature of the oven was gradually increased from 70° C. to 130° C.

The molded piece of the obtained resin had good transparency and good appearance with no strain. The evaluation results of the obtained resin are presented in Table 25.

Examples 6-2 to 6-3

The same operation as in Example 6-1 was carried out, except that the formulation of the polymerizable composition was changed into the composition as shown in Table 25. The composition and the evaluation results of the obtained resin are presented in Table 25.

TABLE 25

| | Composition (parts by weight) | | | | Evaluation Items | | | | | | | | |
| --- | --- | --- | --- | --- | --- | --- | --- | --- | --- | --- | --- | --- | --- |
| | | | | | Optical properties | | | Heat resistance | | | | 3-Point bending test | |
| | Compound | | | | | | | Distortion | | | | | |
| | represented by General Formula (1) | Thiol compound 1 | Thiol compound 2 | catalyst | refractive index | Abbe's Number | Tg (°C.) | beginning temperature (°C.) | Resin color YI | a* | b* | Max. strain (N/mm²) | Max. shift (mm) |
| Comparative Example 6-1 | No1-1 (100) | — | — | — | 1.802 | 24.1 | 171.2 | 155.2 | 77.8 | −15.04 | 61.19 | 33.8 | 0.29 |
| Example 6-1 | No1-1 (85) | A (15) | — | — | 1.777 | 26.4 | 86.2 | 70.9 | 16.2 | −3.03 | 9.28 | 41.8 | 0.60 |
| Example 6-2 | No1-1 (85) | A (5) | B (10) | — | 1.780 | 26.5 | 113.1 | 93.5 | 17.2 | −3.39 | 10.11 | 56.5 | 0.80 |
| Example 6-3 | No1-1 (85) | A (5) | B (10) | DCH | 1.781 | 26.5 | 109.8 | 91.2 | 16.0 | −3.03 | 9.29 | 73.7 | 0.96 |

Furthermore, in Table 25, the following abbreviations were used.

No1-1: Tetrakis(3-thietanylthio)tin
A: 4-Mercaptomethyl-1,8-dimercapto-3,6-dithiaoctane
B: 3-Mercaptothietane
DCH: Dicyclohexylmethylamine

Example 6-4

87.4 parts by weight of the compound represented by CMPD. No. 1-1 in Table 1, that had been prepared in Reference Preparative Example 2, and 8.7 parts by weight of sulfur were heated, and molten at 85° C. Subsequently, 3.9 parts by weight of bis(2-mercaptoethyl)sulfide (thiol compound C) was added to the mixture and mixed at 85° C., and the mixture was filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 22 hours. During the polymerization, the inner temperature of the oven was gradually increased from 70° C. to 130° C.

The molded piece of the obtained resin had good transparency and good appearance with no strain. The evaluation results of the obtained resin are presented in Table 26.

Example 6-5

91 parts by weight of the compound represented by CMPD. No. 1-1 in Table 1, that had been prepared in Reference Preparative Example 2, and 9 parts by weight of sulfur were heated, and molten at 85° C. The mixture was filtered through a PTFA filter, and then sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization for 22 hours. During the polymerization, the inner temperature of the oven was gradually increased from 70° C. to 130° C.

The molded piece of the obtained resin had good transparency and good appearance with no strain. The evaluation results of the obtained resin are presented in Table 26.

TABLE 26

| | Composition (parts by weight) | | | | Evaluation Items | | | | | | | | |
| --- | --- | --- | --- | --- | --- | --- | --- | --- | --- | --- | --- | --- | --- |
| | Compound | | | | Optical properties | | | Heat resistance | | | | 3-Point bending test | |
| | | | | | | | | Distortion | | | | | |
| | represented by General Formula (1) | Sulfur | thiol compound | | refractive index | Abbe's Number | Tg (°C.) | beginning temperature (°C.) | Resin color YI | a* | b* | Max. strain (N/mm²) | Max. shift (mm) |
| Comparative Example 6-1 | No1-1 (100) | — | — | | 1.802 | 24.1 | 171.2 | 155.2 | 77.8 | −15.04 | 61.19 | 33.8 | 0.29 |
| Example 6-4 | No1-1 (87.4) | (8.7) | C(3.9) | | 1.813 | 23.5 | 141.4 | 121.1 | 85.2 | −13.48 | 66.27 | 21.3 | 0.24 |
| Example 6-5 | No1-1 (91) | (9) | — | | 1.822 | 22.3 | 158.1 | 143.9 | 111.2 | 0.11 | 84.02 | — | — |

Furthermore, in Table 26, the following abbreviations were used.
No1-1: Tetrakis(3-thietanylthio)tin
C: Bis(2-mercaptoethyl)sulfide Reference Preparative Example 3

13.7 g (0.13 mole) of 3-mercaptothietane was introduced to 21 g of pure water, and then 16.5 g (0.13 mole) of a 31% NaOH aqueous solution was introduced dropwise at room temperature over 45 minutes. Subsequently, 5.9 g (0.06 mole) of ethandithiol and 36.5 g of pure water were introduced to another reactor, and 16.5 g (0.13 mole) of a 31% NaOH aqueous solution was introduced dropwise at room temperature over 45 minutes. This solution of ethanedithiol sodium and 58.9 g (corresponding to 0.06 mole of tin tetrachloride) of an aqueous solution of 27.5% tin tetrachloride was added dropwise to the previous the aqueous solution of a mercaptothietane sodium salt at the same time over 1.5 hours. After the dropwise addition was completed, the solution was further stirred at the same temperature for 2 hours. The reaction mixture was filtered to separate the solid out, to remove the water layer. The solid was dissolved in 530 g of dichloromethane, washed with 100 g of pure water three times, and filtered with a PTFE filter to remove the insolubles. The solvent was distilled off from the extract to obtain 24.8 g (yield 65%) of a compound represented by bis(thietanylthio)dithiastannolane (Sn(EDT)(MTE)$_2$) (Compound No. 1-71 in Table 4).

Example 6-6

90 parts by weight of bis(thietanylthio)dithiastannolane (Sn(EDT)(MTE)$_2$) that had been prepared in Reference Preparative Example 3, and 10 parts by weight of 4-mercaptomethyl-1,8-dimercapto-3,6-dithiaoctane (thiol compound A) as a thiol compound were mixed at room temperature. The mixture was filtered through a PTFA filter, and then sufficiently degassed at an oven at 50° C., avoiding foaming, under a reduced pressure of 3.9 kPa or less. Subsequently, the degassed polymerizable composition was injected into a mold formed by a glass mold and a tape, and placed in a heating oven to perform polymerization for 18 hours. During the polymerization, the inner temperature of the oven was gradually increased from 70° C. to 100° C.

The molded piece of the obtained resin had good transparency and good appearance with no strain. The evaluation results of the obtained resin are presented in Table 27.

Examples 6-7 to 6-8

The same operation as in Example 6-6 was carried out, except that the formulation of the polymerizable composition was changed into the composition as shown in Table 27. The composition and the evaluation results of the obtained resin are presented in Table 27.

TABLE 27

| | Composition (parts by weight) | | | Evaluation Items | | | | | | | | |
|---|---|---|---|---|---|---|---|---|---|---|---|---|
| | | | | Optical properties | | Heat resistance | | | | | 3-Point bending test | |
| | Compound represented by General Formula (1) | Thiol compound | Episulfide compound | refractive index | Abbe's Number | Tg (° C.) | Distortion beginning temperature (° C.) | Resin color | | | Max. strain (N/mm$^2$) | Max. shift (mm) |
| | | | | | | | | YI | a* | b* | | |
| Comparative Example 6-1 | No1-1 (100) | — | — | 1.802 | 24.1 | 171.2 | 155.2 | 77.8 | −15.04 | 61.19 | 33.8 | 0.29 |
| Example 6-6 | Sn(EDT)(MTE)$_2$(90) | A (10) | — | 1.781 | 25.5 | 40.4 | 33.6 | 34.6 | −2.08 | 17.63 | — | — |
| Example 6-7 | Sn(EDT)(MTE)$_2$(85) | A (15) | — | 1.787 | 26.0 | 38.7 | 33.1 | — | — | — | — | — |
| Example 6-8 | Sn(EDT)(MTE)$_2$(75) | A (12.5) | D (12.5) | 1.785 | 25.4 | 54.4 | 47.0 | 23.0 | −2.81 | 12.80 | 16.9 | 0.09 |

Furthermore, in Table 27, the following abbreviations were used.
A: 3-Mercaptothietane
D: Bis(β-epithiopropyl)disulfide Reference Preparative Example 4

8.0 g (0.075 mole) of 3-mercaptothietane was introduced to 12.0 g of pure water, and then 9.8 g (0.075 mole) of a 30% NaOH aqueous solution was introduced dropwise at room temperature over 45 minutes. Subsequently, 57.9 g (corresponding to 0.025 mole bismuth trichloride) of a 13.6% bismuth trichloride solution in ethanol was inserted dropwise at the same temperature for 1.5 hours. After the dropwise addition was completed, the solution was further stirred at the same temperature for 2 hours. This reaction mixture was filtered to separate the solid out, and the solid was dissolved in 500 g of dichloromethane, and filtered to removed the insolubles. The organic layer was washed with 100 g of pure water twice, and filtered with a PTFE filter to remove the insolubles. The solvent was distilled off from the extract, and hexane was introduced for filtration to obtain 10.6 g (yield 81%) of a compound represented by the following Formula, denoted as tris(mercaptothietanyl)bismuth.

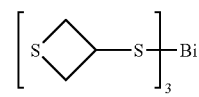

Hereinafter, the identification data of the compounds are shown.
$^1$H-NMR (solvent: DMSOd-6, Internal standard: TMS); σ 3.28 (12H), σ 5.77 (3H).

$^{13}$C-NMR (solvent: DMSOd-6); σ 41.5.
IR (Universal ATR method); 2919, 1410, 1196, 931 cm$^{-1}$.
FDMS; m/e Calculated C$_9$H$_{15}$S$_6$Bi (M$^+$) 524. Found 524.

Example 7-1

75 parts by weight of tris(mercaptothietanyl)bismuth that had been prepared in Reference Preparative Example 4, and 25 parts by weight 3-mercaptothietane as a thiol compound were heated, mixed, and dissolved at 85° C. Then, the mixture was sufficiently degassed until all bubbling had ceased under a reduced pressure of 3.9 kPa or less. Subsequently, the degassed polymerizable composition was injected into a mold formed by a glass mold and a tape, and placed in a heating oven to perform polymerization at 70° C. for 46 hours.

The molded piece of the obtained resin had good transparency and good appearance with no strain.

Also, the refractive index of the obtained resin was measured, and the refractive index ne was found to be 1.855.

The invention claimed is:

1. A polymerizable composition comprising a compound represented by General Formula (1):

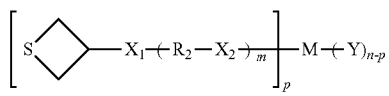

(1)

wherein, in General Formula 1, M represents a metal atom; X$_1$ and X$_2$ each independently represents a sulfur atom or an oxygen atom; R$_1$ represents a divalent organic group; m represents an integer of 0 or 1 or greater; p represents an integer of 1 to n; n represents a valence of a metal atom M; and Y's each independently represents an inorganic or organic residue where when n−p is 2 or greater, Y's may be bonded to each other to form a ring containing a metal atom M,
a thiol compound and
a bis(2,3-epithiopropyl)disulfide,
wherein said thiol compound is at least one selected from the group consisting of 3-mercaptothietane, 4-mercaptomethyl-1, and 8-dimercapto-3,6-dithiatoctane, wherein the molar ratio of thiol groups in the polymerizable composition is 0.7 or more with respect to the amount of the episulfide groups.

2. The polymerizable composition as set forth in claim 1, wherein in the compound represented by General Formula (1), m is 0.

3. The polymerizable composition as set forth in claim 1, wherein in the compound represented by General Formula (1), m is 0 and X$_1$ is a sulfur atom.

4. The polymerizable composition as set forth in claim 3, wherein the compound represented by General Formula (1) is a compound represented by following General Formula (13):

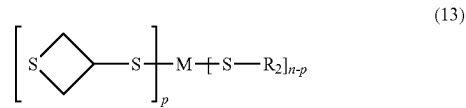

(13)

wherein, in General Formula (13), M is a Group 14 element in a long form of the Periodic Table, n's are each the same as in General Formula (1), and p is an integer of 2 to (n−1), where
if n−p is 1, R$_2$ represents an optionally substituted, linear or branched alkyl group having 1 to 3 carbon atom(s); and
if n−p is 2 or greater, a plurality of R$_2$'s each independently represents an optionally substituted, linear or branched alkyl group having 1 to 3 carbon atom(s); further, a plurality of R$_2$'s may be bonded to each other to form a M-containing ring, in which the alkyl chain forming the ring has 1 to 3 carbon atom(s), and the moiety derived from R$_2$ constituting the ring contains no sulfur atom.

5. The polymerizable composition as set forth in claim 4, wherein in the compound represented by General Formula (13), said metal atom is a Sn atom.

6. The polymerizable composition as set forth in claim 1, wherein in said compound represented by General Formula (1), n=p, m=0, and X$_1$ is a sulfur atom.

7. The polymerizable composition as set forth in claim 6, wherein in said compound represented by General Formula (1), said metal atom is a Sn atom.

8. The polymerizable composition as set forth in claim 1, wherein in said compound represented by General Formula (1), said metal atom is any one of Groups 4, 12, 13, 14 and 15 elements in a long form of the Periodic Table.

9. The polymerizable composition as set forth in claim 8, wherein in said compound represented by General Formula (1), said metal atom is a Sn atom.

10. The polymerizable composition as set forth in claim 1, wherein the content of said compound represented by General Formula (1) is 50% by weight or more.

11. A method for preparing a resin, comprising a step of casting polymerization of the polymerizable composition as set forth in claim 1.

12. A resin obtained by polymerization of the polymerizable composition as set forth in claim 1.

13. An optical part comprising the resin as set forth in claim 12.

* * * * *